United States Patent
Sullivan et al.

(10) Patent No.: US 8,239,922 B2
(45) Date of Patent: *Aug. 7, 2012

(54) REMOTE HVAC CONTROL WITH USER PRIVILEGE SETUP

(75) Inventors: Daniel J. Sullivan, St. Anthony, MN (US); Geoffrey Ho, Minneapolis, MN (US)

(73) Assignee: Honeywell International Inc., Morristown, NJ (US)

( * ) Notice: Subject to any disclaimer, the term of this patent is extended or adjusted under 35 U.S.C. 154(b) by 1215 days.

This patent is subject to a terminal disclaimer.

(21) Appl. No.: 11/845,561

(22) Filed: Aug. 27, 2007

(65) Prior Publication Data

US 2009/0057424 A1    Mar. 5, 2009

(51) Int. Cl.
| | |
|---|---|
| *G06F 7/04* | (2006.01) |
| *G06F 17/30* | (2006.01) |
| *G06F 15/16* | (2006.01) |
| *G06F 15/173* | (2006.01) |
| *G05D 23/00* | (2006.01) |
| *G05B 15/00* | (2006.01) |

(52) U.S. Cl. ............ 726/4; 726/27; 236/51; 236/94; 700/83; 700/276; 709/203; 709/217; 709/225

(58) Field of Classification Search ........... 726/4, 27; 236/51, 94; 700/83, 276; 709/203, 217, 709/225

See application file for complete search history.

(56) References Cited

U.S. PATENT DOCUMENTS

| | | | |
|---|---|---|---|
| 4,918,615 A | 4/1990 | Suzuki et al. | |
| 5,790,977 A | 8/1998 | Ezekiel | |
| 5,956,487 A | 9/1999 | Venkatraman et al. | |
| 5,975,737 A | 11/1999 | Crater et al. | |
| 5,982,362 A | 11/1999 | Crater et al. | |
| 6,061,603 A | 5/2000 | Papadopoulos et al. | |
| 6,067,477 A | 5/2000 | Wewalaarachchi et al. | |
| 6,112,246 A | 8/2000 | Horbal et al. | |
| 6,139,177 A | 10/2000 | Venkatraman et al. | |
| 6,157,943 A | 12/2000 | Meyer | |
| 6,192,282 B1 | 2/2001 | Smith et al. | |
| 6,229,429 B1 | 5/2001 | Horon | |
| 6,259,074 B1 | 7/2001 | Brunner et al. | |

(Continued)

FOREIGN PATENT DOCUMENTS

EP    0434926    8/1995

(Continued)

OTHER PUBLICATIONS

Lennox, "Network Control Panel (NCP)," User's Manual, 18 pages, Nov. 1999.

(Continued)

*Primary Examiner* — Aravind Moorthy

(74) *Attorney, Agent, or Firm* — Seager Tufte & Wickhem LLC

(57) ABSTRACT

An HVAC control system that accommodates and/or facilitates control from a remote location. The HVAC control system may include a web-enabled building control appliance with a controller, a first port and a second port. The controller may implement a web server that is coupled to the first port for serving up one or more web pages on a first network and for receiving a number of responses. The controller may be coupled to the second port so as to communicate with one or more communicating thermostats via a second network. The web server may provide one or more web-pages via the first port that solicit and receive user rights privileges.

28 Claims, 75 Drawing Sheets

U.S. PATENT DOCUMENTS

| | | | |
|---|---|---|---|
| 6,282,454 | B1 | 8/2001 | Papadopoulos et al. |
| 6,334,107 | B1 | 12/2001 | Gale et al. |
| 6,351,693 | B1 | 2/2002 | Monie et al. |
| 6,353,853 | B1 | 3/2002 | Gravlin |
| 6,369,695 | B1 | 4/2002 | Horon |
| 6,405,099 | B1 | 6/2002 | Nagai et al. |
| 6,437,692 | B1 | 8/2002 | Petite et al. |
| 6,484,061 | B2 | 11/2002 | Papadopoulos et al. |
| 6,487,457 | B1 | 11/2002 | Hull et al. |
| 6,580,950 | B1 | 6/2003 | Johnson et al. |
| 6,598,056 | B1 | 7/2003 | Hull et al. |
| 6,619,555 | B2 | 9/2003 | Rosen |
| 6,675,193 | B1 | 1/2004 | Slavin et al. |
| 6,721,607 | B2 | 4/2004 | Brault |
| 6,741,915 | B2 | 5/2004 | Poth |
| 6,904,385 | B1 | 6/2005 | Budike, Jr. |
| 6,934,862 | B2 | 8/2005 | Sharood et al. |
| 6,993,417 | B2 | 1/2006 | Osann, Jr. |
| 7,092,794 | B1 * | 8/2006 | Hill et al. ............ 700/276 |
| 7,110,843 | B2 | 9/2006 | Pagnano et al. |
| 7,183,899 | B2 | 2/2007 | Behnke |
| 7,187,986 | B2 | 3/2007 | Johnson et al. |
| 7,437,755 | B2 * | 10/2008 | Farino et al. ............ 726/5 |
| 2002/0111698 | A1 | 8/2002 | Graziano et al. |
| 2002/0133636 | A1 | 9/2002 | Venkatraman et al. |
| 2002/0152298 | A1 * | 10/2002 | Kikta et al. ............ 709/223 |
| 2003/0103075 | A1 | 6/2003 | Rosselot |
| 2004/0143474 | A1 | 7/2004 | Haeberle et al. |
| 2004/0260411 | A1 | 12/2004 | Cannon |
| 2005/0040250 | A1 | 2/2005 | Wruck |
| 2005/0143863 | A1 | 6/2005 | Ruane et al. |
| 2005/0154494 | A1 * | 7/2005 | Ahmed ............ 700/275 |
| 2006/0058900 | A1 | 3/2006 | Johanson et al. |
| 2006/0105760 | A1 | 5/2006 | Shamoon et al. |
| 2006/0147003 | A1 * | 7/2006 | Archacki et al. ...... 379/102.01 |
| 2006/0283965 | A1 | 12/2006 | Mueller et al. |
| 2007/0058634 | A1 | 3/2007 | Gupta et al. |
| 2007/0097993 | A1 | 5/2007 | Bojahra et al. |
| 2007/0114295 | A1 | 5/2007 | Jenkins |
| 2007/0220907 | A1 | 9/2007 | Ehlers |
| 2007/0294369 | A1 * | 12/2007 | Ginter et al. ............ 709/217 |
| 2008/0011864 | A1 | 1/2008 | Tessier et al. |
| 2008/0209033 | A1 * | 8/2008 | Ginter et al. ............ 709/224 |

FOREIGN PATENT DOCUMENTS

| | | |
|---|---|---|
| WO | 9621264 | 7/1996 |

OTHER PUBLICATIONS http://www2.sims.berkeley.edu/courses/is213/s06/projects/lightson;final.html, "Lights on a Wireless Lighting Control System," 11 pages, printed Mar. 22, 2007.

http://www.commercial.carrier.com/commercial/hvac/productdescription . . . , "Carrier: 33CSCCNWEB-01 CCN Web Internet Connection to the Carrier Comfort Network," 1 page, printed Mar. 11, 2008.

http://www.commercial.carrier.com/commercial/hvac/productdescription . . . , "Carrier: i-Vu CCN," 1 page, printed Mar. 11, 2008.

http://www.docs.hvacpartners.com/idc/groups/public/documents/techlit/gs-controls-ivuccn.rtf, "Products," 5 pages, printed Jul. 3, 2007.

http://www.lightstat.com/products/istat.asp, Lightstat Incorporated, "Internet Programmable Communicating Thermostats," 1 page, printed Mar. 13, 2007.

http://pueblo.lbl.gov/~olken . . . , "Remote Building Monitoring and Operations Home Page," 5 pages, prior to Aug. 27, 2007.

Andover Controls, Network News, vol. 2, No. 2, 8 pages, 1997.

Andover Controls, World, 4 pages, Spring 1997.

CADgraphics, "The CADgraphics User's Guide," 198 pages, 2003.

Carrier Comfort Network CCN Web, Overview and Configuration Manual, 134 pages, Apr. 2006.

Carrier Comfort Network CCN Web, Product Data, 2 pages, Apr. 2006.

Carrier Comfort Network CCN Web, "Web Browser User Interface to the Carrier Comfort Network," 2 pages, 2002.

Carrier, Demo Screen Shots, 15 pages, prior to Aug. 27, 2007.

Carrier, i-Vu CCN, 7 pages, 2007.

Carrier, i-Vu CCN 4.0, Owner's Guide, 20 pages, Jul. 2007.

Carrier, "i-Vu Powerful and Intuitive Front End for Building Control," 2 pages, Aug. 2005.

Carrier, "i-Vu Web-Based Integrated Control System," 3 pages, 2005.

Circon, "i-Browse Web-Based Monitoring and Control for Facility Management," 2 pages, prior to Aug. 27, 2007.

Echelon, "i.Lon SmartServer," 5 pages, 2007.

Echelon, "Energy Control Solutions with the i.Lon SmartServer," 4 pages, 2007.

Echelon, "i.Lon 100e3 Internet Server Models 72101R-300, 72101R-308, 72102R-300, 72103-R300 . . . " 5 pages, copyright 2002-2007.

Echelon, i.Lon 100e3 Internet Server New Features, 15 pages, Sep. 2006.

Honeywell News Release, "Honeywell's New Sysnet Facilities Integration System for Boiler Plant and Combustion Safety Processes," 4 pages, Dec. 15, 1995.

Honeywell, "Introduction of the S7350A Honeywell WebPAD Information Appliance," Home and Building Control Bulletin, 2 pages, Aug. 29, 2000; Picture of WebPad Device with touch screen, 1 Page; and screen shots of WebPad Device, 4 pages.

Honeywell, The RapidZone Solution, Excel 5000 Open System, Application Guide, 52 pages, Jan. 2004.

Honeywell, Excel 15B W7760B Building Manager Release 2.02.00, Installation Instructions, 28 pages, Dec. 2004.

i.Lon, SmartServer, 2 pages, prior to Aug. 27, 2007.

i.Lon 100e3 Internet Server, 1 page, prior to Aug. 27, 2007.

i-stat, Demo Screen Shots, Printed Mar. 13, 2007.

i-stat, The Internet Programmable Thermostat, 2 pages, prior to Aug. 27, 2007.

Johnson Controls, Network Integration Engine (NIE) 3 pages, Nov. 9, 2007.

Johnson Controls, Network Integration Engine (NIE), Product Bulletin, pp. 1-11, Jan. 30, 2008.

Narang, "WEBARC: Control and Monitoring of Building Systems Over the Web," 53 pages, May 1999.

Olken et al., "Object Lessons Learned from a Distributed System for Remote Building Monitoring and Operation," ACM SIGPLAN Notices, vol. 33, No. 10, pp. 284-295, Oct. 1998.

Proliphix, Inc., "Proliphix IP Devices: HTTP API," 28 pages, Jan. 23, 2006.

Proliphix, Inc., Remote Management User Guide, 12 pages, prior to Aug. 27, 2007.

So et al., "Building Automation on the Information Superhighway," ASHRAE (American Society of Heating Refrigerating, and Air Conditioning) Transactions, vol. 104, Part 2, pp. 176-191, 1998.

So et al., "Building Automation Systems on the Internet," Facilities vol. 15, No. 5/6, pp. 125-133, May/Jun. 1997.

Talon, "Raptor Controller," 6 pages, Oct. 2003.

Talon, "Workstation Software," 4 pages, Nov. 2002.

"Energy User News," 4 pages, Mar. 1, 1997.

Andover Controls, "Facility Management Unleashed," 6 pages, 2002.

Facility Robotics Solutions Direct, "Who We Are and What We Do," 2 pages, Sep. 19, 1997.

Facility Robotics Solutions, "Where Can I go to Find Everything I Need to Put Together LonWorks-Based Automation Systems?," 5 pages, prior to Jun. 28, 2007.

Honeywell, "Excel Building Supervisor-Integrated R7044 and FS90 Ver. 2.0," Operator Manual, 70 pages, Apr. 1995.

Trane, "System Programming, Tracer Summit Version 14, BMTW-SVP01D-EN," 623 pages, 2002.

* cited by examiner

REMOTE HVAC CONTROL WITH USER PRIVILEGE SETUP

TECHNICAL FIELD

The present disclosure pertains generally to HVAC systems and more particularly to HVAC control systems that accommodate and/or facilitate control from a remote location.

BACKGROUND

HVAC systems are present in a wide range of residential and commercial buildings. In residential buildings such as houses and townhouses, the HVAC equipment such as heating, cooling and ventilating equipment may be controlled by a single thermostat. Some houses may have zoned HVAC and thus may have several thermostats, with each thermostat controlling a particular zone. In larger residential buildings such as large condominium buildings and/or apartment buildings, the HVAC equipment may be either localized or centralized, and may be controlled by one or more thermostats within each space (apartment or the like).

A wide variety of commercial buildings are known. Some commercial buildings such as small to medium retail centers including strip malls, small to medium office buildings and the like may be heated, cooled and/or ventilated by a number of HVAC units. In some cases, the HVAC units are roof-top units, but this is not required. Some buildings may have a significant number of HVAC units and a significant number of corresponding HVAC controllers such as thermostats. Installation, operation and monitoring of such HVAC systems can be complicated. Thus, a need remains for HVAC control systems that are scalable for a variety of different applications, that are easy to use and that are cost-effective.

SUMMARY

The present disclosure pertains to HVAC control systems that accommodate and/or facilitate control from a remote location. In some instances, an HVAC control system may include a web enabled building control appliance having a controller and a first port that is coupled to the controller and that is adapted to communicate over a first network. The controller may implement a web server that is coupled to the first port for serving up one or more web pages on the first network via the first port. The controller may be coupled to a second port that is adapted to be coupled to and communicate with two or more communicating thermostats via a second network. The web server may provide one or more web-pages via the first port that solicit and receive user rights privileges.

The above summary is not intended to describe each disclosed embodiment or every implementation of the present invention. The Figures and Detailed Description that follow more particularly exemplify these embodiments.

BRIEF DESCRIPTION OF THE FIGURES

The invention may be more completely understood in consideration of the following detailed description of various embodiments of the invention in connection with the accompanying drawings, in which.

Figure 1:
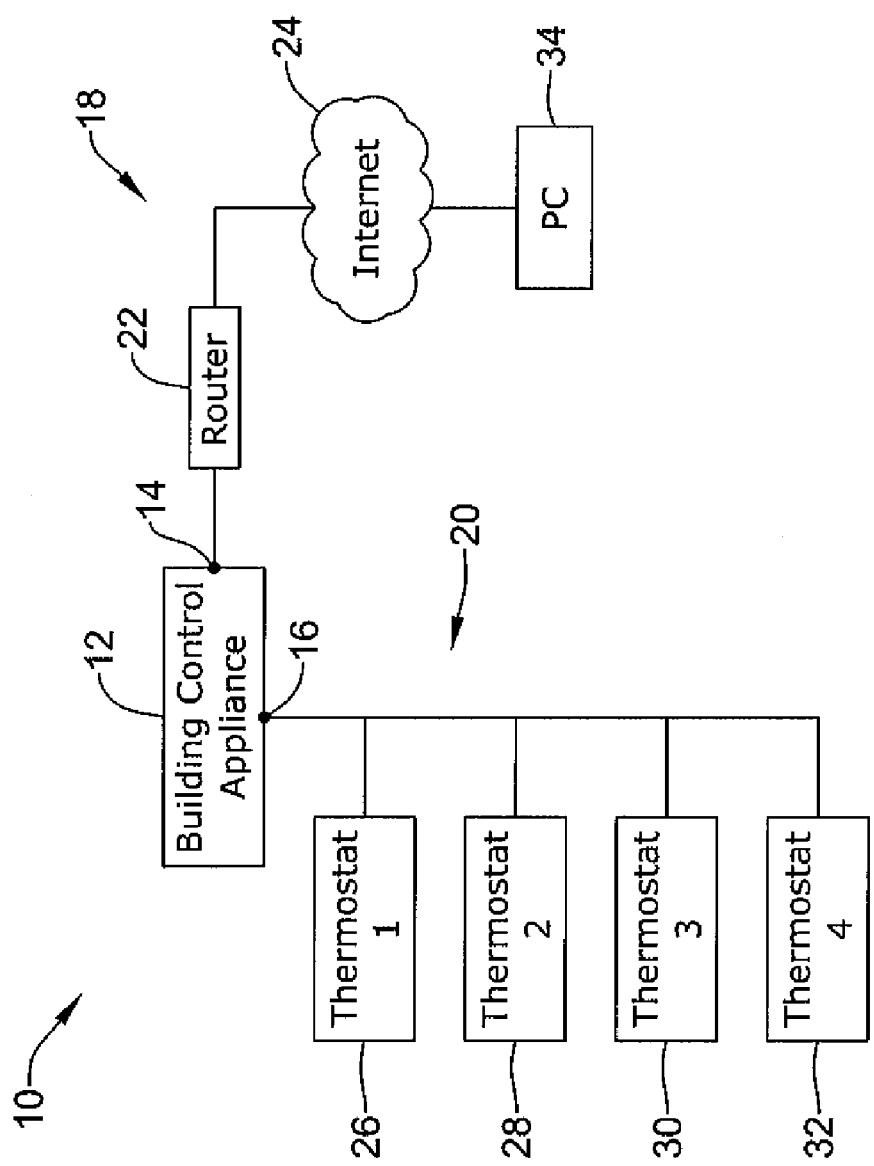
FIG. 1 is a schematic view of an illustrative but non-limiting HVAC control system.

While the invention is amenable to various modifications and alternative forms, specifics thereof have been shown by way of example in the drawings and will be described in detail. It should be understood, however, that the intention is not to limit the invention to the particular illustrative embodiments described. On the contrary, the intention is to cover all modifications, equivalents, and alternatives falling within the spirit and scope of the invention.

DESCRIPTION

The following description should be read with reference to the drawings, in which like elements in different drawings are numbered in like fashion. The description is presented largely in terms of screen shots that describe algorithms and symbolic representations of operations on data bits within a computing device. These screen shots, algorithmic descriptions, and representations are the means used by those skilled in the data processing arts to most effectively convey the substance of their work to others skilled in the art.

An algorithm is here, generally, conceived to be a self-consistent sequence of steps leading to a desired result. These steps are those requiring physical manipulations of physical quantities. Usually, though not necessarily, these quantities take the form of electrical or magnetic signals capable of being stored, transferred, combined, compared, and otherwise manipulated. It proves convenient at times, principally for reasons of common usage, to refer to these signals as bits, values, fields, elements, symbols, characters, terms, numbers, or the like. It should be kept in mind, however, that all of these and similar terms are to be associated with the appropriate physical quantities and are merely convenient labels applied to these quantities.

The present invention also relates to an apparatus for performing the operations. This apparatus may be specially constructed for the required purposes or it may include a general-purpose computer as selectively activated or reconfigured by a computer program stored in the computer. The algorithms presented herein are not inherently related to a particular computer system or other apparatus. In particular, various general purpose computer systems may be used with computer programs written in accordance with the teachings of the present invention, or it may prove more convenient to construct more specialized apparatus to perform the algorithms.

In sum, the illustrative embodiments described herein are preferably implemented for practice by a computing device, e.g., an source code expression is input to the computing device to control operations therein. It is contemplated that a number of source code expressions, generated in one or more of many computing languages, could be utilized to implement several aspects of the illustrative embodiments of the present invention. A variety of computing systems can be used to practice the present invention, and the selection of a particular computing system can be made for many reasons depending on the circumstances.

FIG. 1 is a schematic view of an illustrative HVAC control system 10 that may be configured to permit an individual to view and/or configure various aspects of operation of an HVAC system from a remote location. The illustrative HVAC control system 10 includes a building control appliance 12 having a first port 14 and a second port 16. A first network 18 may be in communication with first port 14 and/or a second network 20 may be in communication with second port 16. As will be discussed, first network 18 may, for example, provide communication between building control appliance 12 and a broader, potentially external network while second network 20 may, for example, provide communication between building control appliance 12 and one or more components of an associated HVAC system.

First network 18 may include one or more elements that permit and/or facilitate communication between building control appliance 12 and another network. In some cases, first network 18 may include a router 22. While router 22 is illustrated as a distinct component, it will be recognized that in some instances router 22 may instead be incorporated into building control appliance 12. Router 22 provides a means of communication between building control appliance 12 and a broader network by connecting, for example, in any appropriate manner to the Internet 24. Router 22 may, for example, connect to Internet 24 via a dial-up connection, a broad-band cable connection, a DSL phone line connection, and/or a fiber-optic connection.

In the illustrative embodiment, second network 20 may provide for communication between building control appliance 12 and one or more components of an HVAC system within a building. For example, second network 20 may be connected to one or more communicating thermostats within the building and thus may permit communication between building control appliance 12 and the one or more thermostats. In the illustrated embodiment, second network 20 is connected to a first thermostat 26, a second thermostat 28, a third thermostat 30 and a fourth thermostat 32. In the illustrative embodiment, the connections between second network 20 and each of first thermostat 26, second thermostat 28, third thermostat 30 and/or fourth thermostat 32 may be wired, wireless, or some combination thereof, as desired.

One or more of first thermostat 26, second thermostat 28, third thermostat 30 and/or fourth thermostat 32 may independently be connected (either wirelessly or through a wired connection) to one or more components of an HVAC system (not illustrated). Examples of such components may include heaters, furnaces, boilers, A/C units, dampers, and the like. In some cases, one or more of first thermostat 26, second thermostat 28, third thermostat 30 and/or fourth thermostat 32 may be connected to and/or may control operations of a single rooftop HVAC unit that may be configured to provide heated air, cooled air and/or fresh air as appropriate and as instructed by first thermostat 26, second thermostat 28, third thermostat 30 and/or fourth thermostat 32, although this is not required.

Each of first thermostat 26, second thermostat 28, third thermostat 30 and/or fourth thermostat 32 may be of any suitable thermostat type. In some instances, each of first thermostat 26, second thermostat 28, third thermostat 30 and/or fourth thermostat 32 are independently programmable thermostats or non-programmable thermostat, depending on the application. In some cases, each of first thermostat 26, second thermostat 28, third thermostat 30 and/or fourth thermostat 32 may be independently programmable thermostats, but may function in accordance with instructions provided by building control appliance 12, rather than in accordance with their own schedule programming. While a total of four thermostats 26, 28, 30 and 32 are illustrated, it will be recognized that second network 20 may equally communicate with fewer than four thermostats and/or with more than four thermostats, as desired, as well as other devices.

HVAC control system 10 is shown as including a PC (personal computer) 34. As will be discussed in greater detail subsequently, PC 34 may permit a user to view web pages that are provided by building control appliance 12. In some cases, PC 34 may be a desktop computer or a notebook (laptop) computer. In some instances, PC 34 may not be a traditional computer but may instead be a device that is adapted to display web pages, such as a cell phone or a personal digital assistant (PDA).

Figure 2:
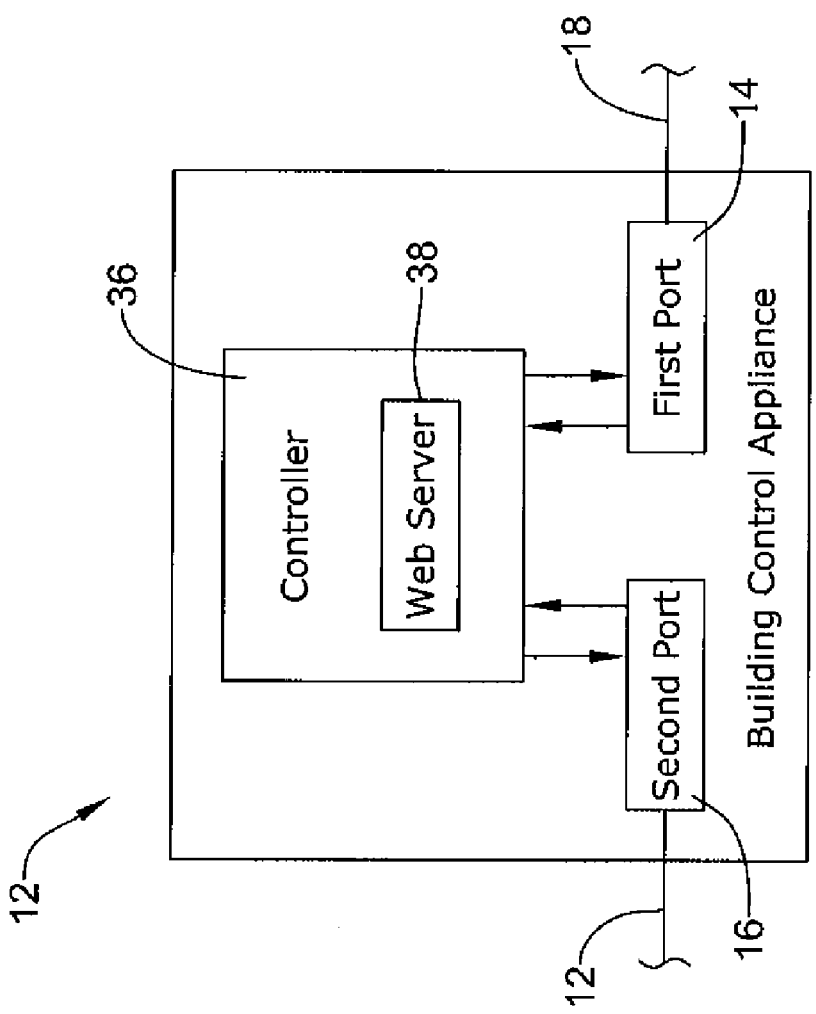
FIG. 2 is a schematic view of a portion of the HVAC control system of FIG. 1.

FIG. 2 provides further illustration of the illustrative building control appliance 12 of FIG. 1. The illustrative building control appliance 12 includes a controller 36 that includes or otherwise implements a web server 38. Controller 36 is coupled to a first port 14 and a second port 16. In the illustrative embodiment, first port 14 provides a connection between controller 36 and first network 18 (see FIG. 1), and second port 16 provides a connection between controller 36 and second network 20 (FIG. 1). In some cases, controller 36 may be programmed with a control algorithm that issues commands to the thermostats 26, 28, 30, and 32 via second network 20 to activate and/or deactivate HVAC equipment that is connected to thermostats 26, 28, 30, and 32.

It will be recognized that building control appliance 12 may be disposed at a first location while PC 34 may be disposed at a second location that is remote from the first location. For example, building control appliance 12 may be located within a basement, utility room, office or other location of a particular building, while PC 34 may be located upstairs within a building manager's office or even in a different building from building control appliance 12. More generally, PC 34 may be located at any remote location that has access to the building control appliance 12 via the first network 18.

In some instances, web server 38 of building control appliance 12 may be adapted to provide a summary web page (see FIG. 3B), via first port 14, that displays information pertaining to one or more of the thermostats. In some cases, the summary web page may include information pertaining to two or more thermostats. This may include, for example, two or more of first thermostat 26, second thermostat 28, third thermostat 30 and/or fourth thermostat 32. The particular information that is displayed may be customized for a particular user and/or user class. Controller 36 may be adapted to receive sensor information from the thermostats via second network 20. In some cases, controller 36 may be programmed with a control algorithm that issues commands to the thermostats via second network 20 to activate or deactivate HVAC equipment that is connected to the thermostats.

In some instances, a particular user has a set of user rights, and the information that is displayed on the summary web page may be consistent with the user rights of the particular user. In some cases, the information that is displayed on the summary web page may be limited to information regarding thermostats that are assigned to the particular user, such as the thermostats that control the space of a tenant in a multi-tenant building. In some cases, the information that is displayed on the summary web page may be selected, for example, in accordance with the technical proficiency of the particular user. For example, when the particular user is an HVAC contractor, the information displayed on the summary web page may include configuration and/or setup information, and when the particular user is a tenant of a building the information displayed on the summary web page may not include configuration and/or setup information.

A variety of information may be displayed on the summary web page. Examples of information include but are not limited to one or more of a thermostat identifier for one or more of the thermostats, a current inside temperature reported by one or more of the thermostats, a current outside temperature, a current set point for one or more of the thermostats, a schedule related parameter for one or more of the thermostats, a humidity related parameter that is reported by one or more of the thermostats, a current operating mode of HVAC equipment that is connected to one or more of the thermostats, an alarm related parameter for one or more of the thermostats, a discharge air temperature of HVAC equipment that is connected to one or more of the thermostats, a plenum related pressure of HVAC equipment that is connected to one or more of the thermostats, a relay output related parameter of HVAC equipment that is connected to one or more of the thermostats, a lockout status of HVAC equipment that is connected to one or more of the thermostats; a fan switch status of HVAC equipment that is connected to one or more of the thermostats, a throttle range of HVAC equipment that is connected to one or more of the thermostats, an integral time of the control algorithm used to control the HVAC equipment that is connected to one or more of the thermostats, a derivative time of the control algorithm used to control the HVAC equipment that is connected to one or more of the thermostats, and an anticipator authority of the control algorithm used to control the HVAC equipment that is connected to one or more of the thermostats. These are only examples, and it is contemplated that any suitable information may be included on the summary web page, as desired.

In an illustrative embodiment, web server 38 may be adapted to serve up a summary web page in which the information that is displayed includes one or more parameters. In some cases, the summary web page may include two or more parameters. Each parameter or setting may be displayed within a corresponding column on the summary web page. In some cases, at least some of the parameters or settings include a hyperlink that, when selected, causes web server 38 to display another web page that includes additional information that is related to the selected parameter or setting.

In some instances, web server 38 may be adapted to provide a summary web page that includes information that has been customized for a particular user or user class. For example, the information that is displayed for a first user or user class may be a first subset of information available to building control appliance 12, while the information that is displayed for a second user or user class may be a second subset of information available to building control appliance 12. The second subset of information may be more comprehensive than the first subset of information. In some cases, the information that is displayed for a third user or user class may be a third subset of information available to building control appliance 12, wherein the third subset of information is more comprehensive than the second subset of information.

In some instances, a floor of a particular building may have more than one thermostat. Web server 38 may be adapted to serve up or otherwise provide one or more web pages that may, for example, be viewed using PC 34 and that may display a graphical representation of a floor plan of the floor of the building. In some cases, web server 38 may permit a user to upload an image file that contains a graphical floor plan for the user's building. The graphical floor plan may be a schematic drawing, a blueprint, a CAD or other computer-generated drawing of a space, an actual photo of a space, and the like.

In some cases, web server 38 may permit a user to drag and drop individual building control device images onto the floor plan via the web page. Likewise, it is contemplated that individual building control device images already on the floor plan may be moved. Each building control device image may represent a building control device such as a thermostat. The relative position into which each building control device image is dropped onto the graphical floor plan may correspond to an actual physical location within the floor plan of the building. In some instances, web server 38 may be adapted to display, on the one or more web pages, a number of individual building control device images in a list so that an individual may select one or more of the individual building control device images and place them appropriately onto the displayed floor plan.

Web server 38 may also be adapted to display information pertaining to a particular building control device when a user clicks on a corresponding building control device image on the floor plan displayed on the one or more web pages served up by web server 38.

In some instances, a building may have a number of different HVAC components such as air handlers controlled by a variety of different control devices such as thermostats, VAV (variable air volume) boxes and the like. Web server 38 may be adapted to serve up one or more web pages via first port 14 (and hence across first network 18) that solicit information pertaining to a potential alarm condition. An example of a potential alarm condition would be if the air temperature within any space or a selected space reached a particular level. A number of other potential alarm conditions are contemplated, including various temperature parameters, various pressure parameters, an offline status of one or more of the thermostats, and/or any other suitable condition. Once the information has been inputted into the one or more web pages served up by web server 38, controller 36 may provide the appropriate instructions to each of the individual device controllers over second network 20. Web server 38 may be adapted to provide one or more web pages that report when an alarm condition has been satisfied.

In some instances, web server 38 may be adapted to provide one or more web pages, via first port 14, that solicit and receive information pertaining to user rights privileges. The user rights privileges may control, at least in part, what information can be or is displayed by web server 38 and/or what information can be changed using web server 38. Controller 36 may maintain monitoring information, status information, set point information, alarming information, trending information and/or configuration information, and the user rights privileges control, at least in part, what information can be or is displayed and/or changed via web server 38.

In some cases, building control appliance 12 may be adapted to be coupled, either directly or indirectly, to an HVAC system, and web server 38 may be adapted to provide one or more web pages via first port 14 that allow information related to the HVAC system to be assigned and unassigned to the user rights privileges. In some cases, at least some of the users of building control appliance 12 are assigned user rights privileges.

A user may be allowed to access building control appliance via web server 38, and web server 38 may be adapted to only display information that corresponds to the user rights privileges that are assigned to the user. Each user may be assigned to one of two or more user groups. Each member of a user group may have the same assigned user rights privileges. Web server 38 may be adapted to provide one or more web pages that allow one or more types of information to be assigned and/or unassigned to the user rights privileges of each user group. The user rights privileges may, for example, define viewing privileges and/or changing privileges. For example, one of the user groups may correspond to a tenant group, another of the user groups may correspond to a facility manager group, and another of the user groups may correspond to a contractor group. In some cases, the user rights privileges for the facility manager group may be more expansive than for the tenant group, and the user rights privileges for the contractor groups may be more expansive than for the facility manager group.

In some embodiments, web server 38 may be adapted to serve up or otherwise provide one or more web pages that provide information regarding the status of one or more of the thermostats 26, 28, 30 and/or 32. Web server 38 may provide web pages that are arranged for receiving information. In some cases, for example, web server 38 may serve up one or more web pages that solicit and accept configuration information for one or more of the thermostats 26, 28, and/or 32.

A thermostat may employ one or more external sensors such as temperature sensors. In many cases, external temperature sensors are provided having a particular resistance. An installer typically needs to know how to connect the external temperature sensors (which sensors should be used, and which sensors should be connected in series and/or which sensors should be connected in parallel) in order to provide the thermostat with an expected resistance. In some illustrative embodiments, web server 38 may serve up one or more web pages that prompt a user (installer or the like) to provide information pertaining to the external temperature sensors (if any) that will be used with the particular thermostat, and in some cases, the number of remote sensors that will be used.

Web server 38 may then, for example, serve up one or more web pages that provide the installer with a wiring diagram illustrating how a particular combination of external temperature sensors should be combined to form a remote sensing network for the thermostat. In some cases, web server 38 may serve up a web page that includes or otherwise provides a predetermined wiring diagram that is based, at least in part, upon the information pertaining to the one or more remote sensors received, including the number of remote sensors and the type of one or more of the remote sensors. In some instances, controller 36 may be adapted to look up a predetermined wiring diagram based upon the information pertaining to the one or more remote sensors.

In some illustrative embodiments, web server 38 may be adapted to provide one or more web pages, via first port 14, that solicit non-schedule thermostat configuration information. The one or more web pages may also receive the solicited information via one or more responses. In some cases, controller 36 may provide at least some of the non-schedule thermostat information to at least some of the thermostats, for example, via the second network 20. The thermostats may, for example, be selected from or may include one or two or more of first thermostat 26 (FIG. 1), second thermostat 28 (FIG. 1), third thermostat 30 (FIG. 1) and/or fourth thermostat 32 (FIG. 1). In some cases, controller 36 may be capable of automatically discovering at least one of the thermostats on second network 20. Controller 36 may provide at least some of the non-schedule thermostat configuration information solicited by the one or more web pages for each of the thermostats to the corresponding thermostats via second network 20. In some instances, web server 38 may be adapted to provide one or more web pages that solicit temperature scheduling information and that receive temperature scheduling information via one or more responses.

The web pages served up by web server 38 may include a number of predetermined configuration options for selection by the user. At least some of the predetermined configuration options may, if desired, be presented in a pull-down menu. Examples of predetermined configuration options include, but are not limited to, one or more of a thermostat model option, an equipment type option, a thermostat keypad lockout option, a system mode option, a fan mode option, a room temperature input designation option, a humidity input designation option, an outdoor temperature input designation option, an occupancy sensor input designation option, a number of cooling stages option, a number of heating stages option, a cooling cycle rate and/or a heating cycle rate.

In some cases, controller 36 may download the non-schedule thermostat configuration information to at least some of the thermostats via second network 20. Sensor information from at least some of the thermostats may be provided to controller 36 via second network 20. Controller 36 may be programmed with a control algorithm that issues commands to the one or more thermostats via second network 20 to activate or deactivate HVAC equipment that is connected to the one or more thermostats, based at least in part on the received sensor information. The control algorithm may be capable of issuing commands to the one or more thermostats via second network 20 to activate or deactivate HVAC equipment that is connected to the one or more thermostats, based at least in part on the received sensor information and a schedule. In some cases, the control algorithm may be capable of issuing commands to the one or more thermostats via second network 20 to activate or deactivate HVAC equipment that is connected to the one or more thermostats, based at least in part on the received sensor information, a schedule, and the non-schedule thermostat configuration information.

In some cases, controller 36 may be adapted to provide one or more commands to at least one of the thermostats, wherein the one or more commands result in one or more of the HVAC units that are connected to the at least one of the thermostats to activate and/or deactivate. In some cases, controller 36 implements a control algorithm that includes a programmable schedule, and wherein the one or more commands are based, at least in part, on the programmable schedule. While the thermostats themselves may be capable of operating in accordance with their own local schedule, controller 36 may provide commands that cause the thermostats to operate in accordance with the schedule of the controller 36. That is, and in some cases, the local schedules of the thermostats may be bypassed and not used.

A further description of features of various illustrative embodiments is provided below. For example, 3A-10D show illustrative but non-limiting examples of web pages that may be served up by web server 38, and FIGS. 11A-15C show illustrative but not limiting methods that may be carried out in accordance with the present invention.

Figure 3A:
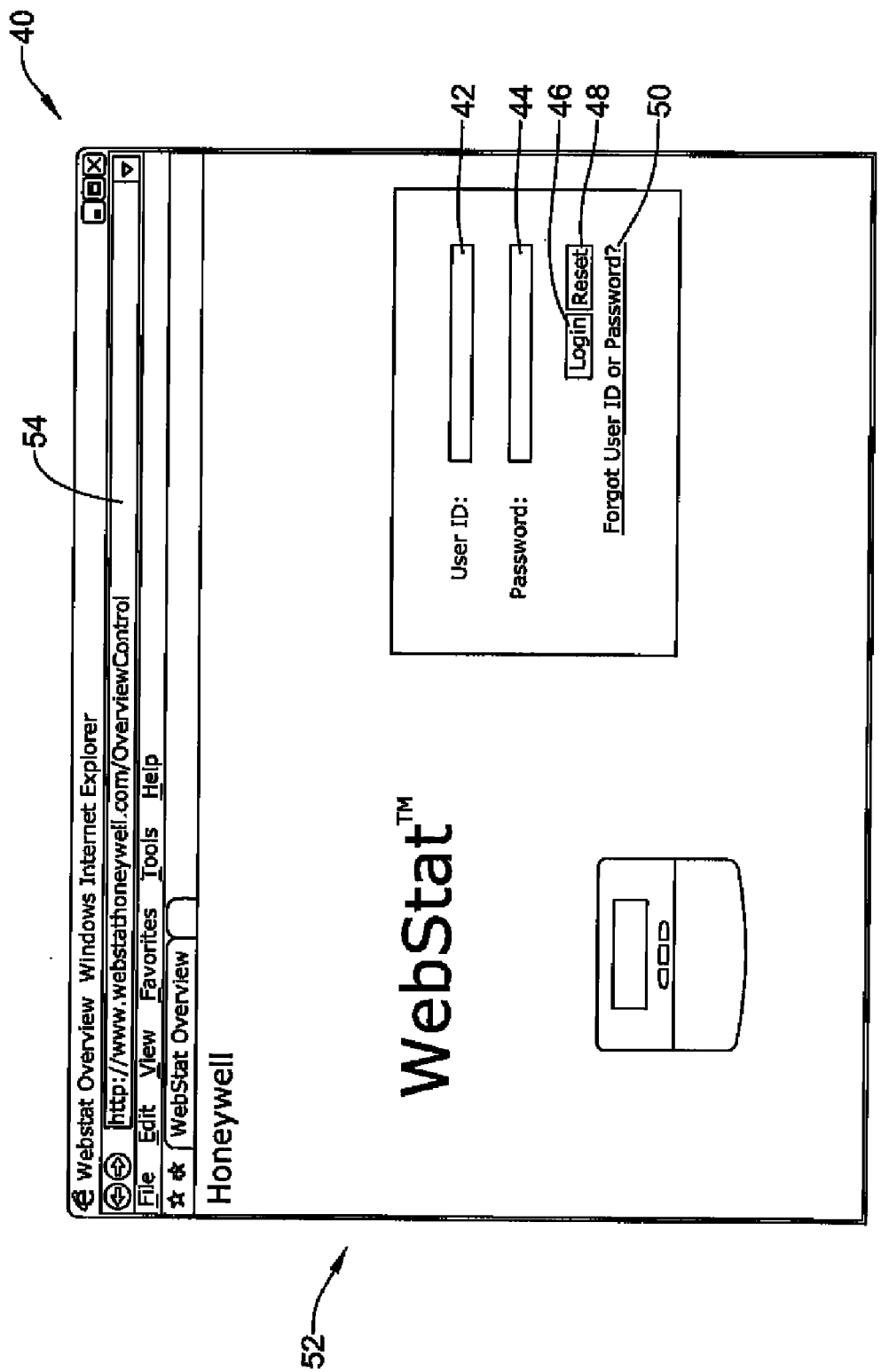
FIGS. 3A-3F are illustrative but non-limiting examples of web pages that may be generated by the HVAC control system of FIG. 1, pertaining to an overview thereof.

FIGS. 3A-3F are illustrative but non-limiting examples of web pages that may be served up by web server 38 (FIG. 2). In FIG. 3A, web server 38 has created, provided or otherwise served up a web page 40 that permits a user to log into building control appliance 12. In some cases, a user may log into building control appliance 12 using PC 34 (FIG. 1), but this is not required. Web page 40 may, for example, be accessed and displayed on a computer running a thin client application such as Microsoft Internet Explorer. In some instances, it is contemplated that building control appliance 12 itself may have web page display functionality.

Web server 38 may solicit, via web page 40, a User ID and/or a password, as indicated by a User ID blank 42 and a Password blank 44. Throughout this discussion, it should be recognized that if a blank space that a user may enter information into is shown, other ways of data entry such as a pull-down menu, a series of check boxes or the like may be used. Similarly, in situations in which a pull-down menu is shown, other ways of data entry such as a series of check boxes or blank spaces into which data may be typed or selected may be used.

Once the user ID and password has been entered, a user may log into building control appliance 12 by clicking on a Login button 46. Alternatively, if a user makes a mistake entering either their User ID or their password, they may clear the entered information by clicking on a Reset button 48. In some cases, if the user has forgotten either their User ID and/or their password, they may click on the Forgot User ID or Password? link 50. Subsequently, building control appliance 12 may, in response to one or more challenge questions, provide the missing information or, in some cases, may email the missing information to the user as an additional security measure. Web page 40 may also include graphical icons 52 that may, for example, provide identifying information for an HVAC contractor.

Once a user has successfully logged into building control appliance 12 (FIG. 2), web server 38 (FIG. 2) may provide a web page 54 that provides an overview. In some cases, web page 54 includes common elements that are displayed on many of the web pages that web server 38 may be adapted to provide. For example, web page 54 includes a web status bar 56 and a navigation bar 58. Web status bar 56 includes an URL 60 that provides a current web site address and also includes standardized tool bars provided, for example, by Microsoft® Corporation. In some cases, at least some of the text and graphics displayed within web status 56 may be functions of how an individual has customized (or not customized) the web browser, rather than a result of any information served up by web server 38.

In the illustrative embodiment, navigation bar 58 provides information to a user that pertains to navigating through the various web pages that are or may be served up by web server 38 (FIG. 2). Navigation bar 58 may be common to many of the web pages served up by web server 38 and may include several features. A Help button 62 permits a user to, at any time, obtain online assistance pertaining to whatever web page is being served up by web server 38 (FIG. 2). A Logout button 64 permits a user to log out of building control appliance 12 (FIG. 2). Navigation bar 58 may include a Date/Time icon 66 and/or a weather icon 68. In some cases, weather icon 68 may be a link that a user may click on to access local weather information, such as a local weather site. If desired, weather icon 68 may merely provide a current outside temperature.

Figure 3B:
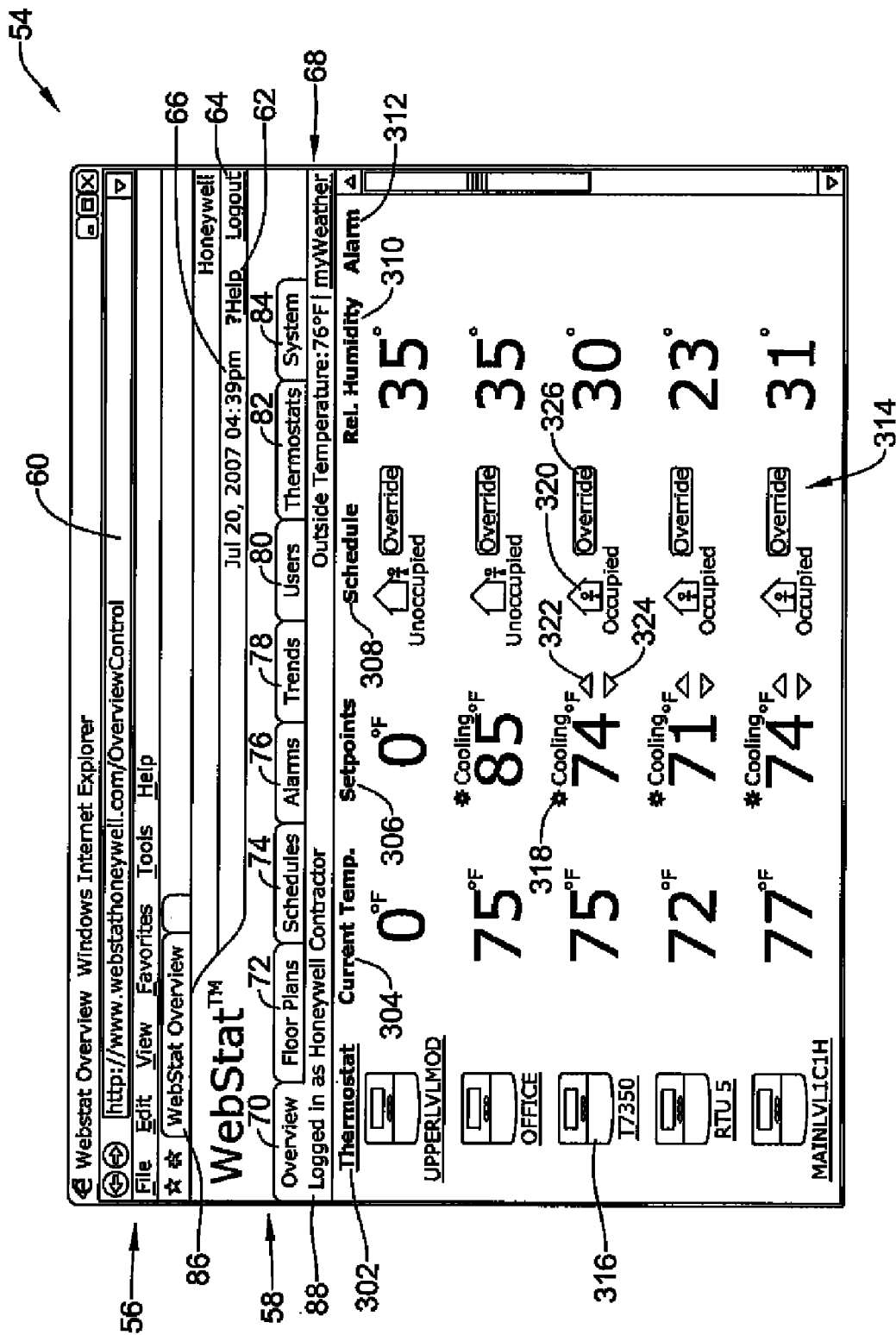

In the illustrative embodiment, navigation bar 58 may also include one or more of an Overview tab 70, a Floor Plans tab 72, a Schedules 74 tab, an Alarms tab 76, a Trends tab 78, a Users tab 80, a Thermostats tab 82 and/or a System tab 84. Each tab will be described in subsequent Figures. In many cases, web status bar 56 may include a position confirmation 86, which provides confirmation of what tab has been selected and is currently active. In FIG. 3B, the Overview tab 70 has been selected, so hence position confirmation 86 includes the text "WebStat Overview". WebStat™ is a trademark owned by Honeywell that relates to features of HVAC control system 10 (FIG. 1). As discussed above, a particular user may be a particular type of user and/or may fall into a particular group or class of users. In some cases, navigation bar 58 may include a user login confirmation 88 that displays the user type or class.

Within Overview tab 70, it can be seen that web page 54 provides a significant amount of information that may in some cases be organized into columns. As illustrated, web page 54 may include one or more of a Thermostat column 302, a Current Temperature column 304, a Setpoints column 306, a Schedule column 308, a Relative Humidity column 310 providing relative humidity data for each of the corresponding thermostats and/or an Alarm column 312 providing alarm information. In some cases, web page 54 may include additional columns (not illustrated) that, for example, provide an HVAC professional with additional information pertaining to HVAC equipment performance such as discharge air temperatures, coolant pressures and the like. In addition, web page 54 may include fewer columns, if desired.

Thermostat column 302 may provide a columnar list of thermostats that may be assigned or otherwise available to a particular user Current Temperature column 304 may provide a columnar list of current ambient temperatures sensed by each of the corresponding thermostats within Thermostat column 302.

Setpoints column 306 may provide a columnar list of current temperature set points as well as equipment status for each of the corresponding thermostats within Thermostat column 302. If the HVAC equipment controlled by a particular thermostat is operating, Setpoints column 306 may include one or more icons for each thermostat, indicating the operational status of corresponding HVAC equipment. For example, a snowflake icon may be displayed if air conditioning equipment is operating, or perhaps a flame icon may be displayed if heating equipment is operating.

If a particular thermostat is operating within an Occupied time period (as will be discussed subsequently with respect to Schedule column 308), Setpoints column 306 may include an up arrow and a down arrow that may be clicked on to raise or lower the current setpoint temperature for a particular thermostat. If the particular thermostat is operating within an Unoccupied time period, Setpoints column 306 may, in some cases, not display up or down buttons for adjusting the temperature set point. In some cases, the up and down arrows may merely be grayed out if the particular thermostat is operating within an Unoccupied time period.

Schedule column 308 may provide a columnar list of schedule information for each corresponding thermostat, such as whether a particular thermostat is operating according to a schedule in which the current time corresponds to an Occupied time or is operating according to a schedule in which the current time corresponds to an Unoccupied time. For example, in a commercial office environment, a particular thermostat may be programmed or otherwise operated in accordance with a schedule in which the Occupied time is set to a time period of 7 AM to 5 PM, and the Unoccupied time is set to a time period of 5 PM to 7 AM. Schedule column 308 may also include an override button 314 for at least one of the corresponding thermostats listed within thermostat column 302.

As shown, web page 54 may include information pertaining to a number of different thermostats. In some instances, it may be desirable to obtain greater information regarding a specific thermostat. To illustrate, one can explore a specific thermostat. For example, thermostat 316 is labeled within Thermostat column 302 as "T7350". A thermostat may be labeled using any appropriate nomenclature. For example, a thermostat may be labeled in accordance with its physical location or any other desired naming system or plan.

By reading a row across the columns, one can see that thermostat 316 is displaying a current temperature of 75° F. and has a current set point temperature of 74° F. As a result, the air conditioning equipment controlled by thermostat 316 is operational, as evidenced by the snowflake icon 318. It can be seen that thermostat 316 is operating in accordance with a schedule that specifies that the current time corresponds to an Occupied time period, as indicated by the occupied icon 320. Consequently, and in the illustrative embodiment, setpoints column 306 includes an up button 322 and a down button 324 that may be used to at least temporarily override the scheduled setpoint. An override button 326 corresponding to thermostat 316 is displayed within Schedule column 308.

Figure 3C:
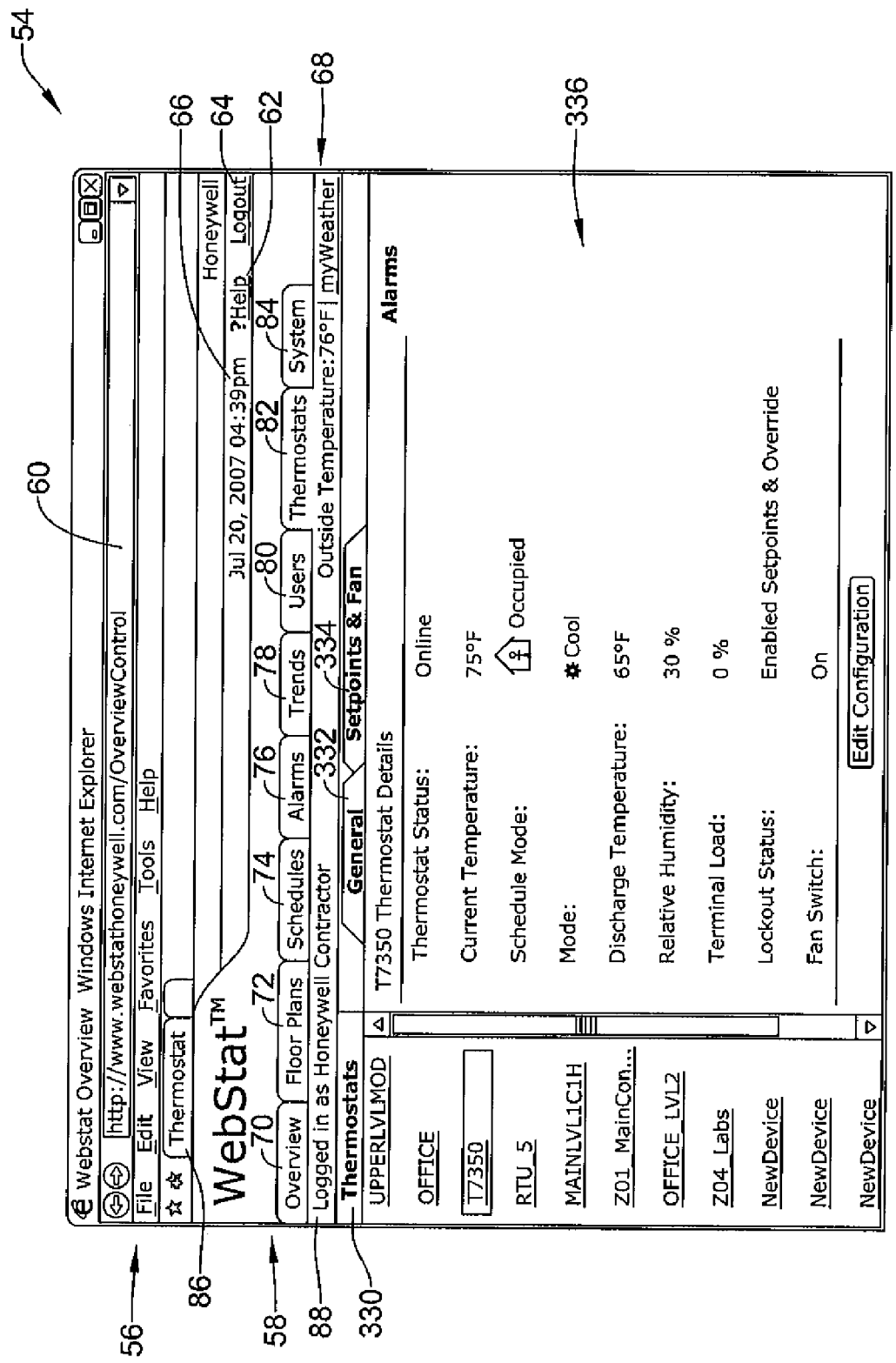

FIG. 3C provides a web page 328 that may be served up by web server 38 (FIG. 2) if, for example, a user clicks on the icon representing thermostat 316. It can be seen that navigation bar 58 now indicates that Thermostat tab 82 has been selected. Web page 328 includes a thermostat column 330, a General tab 332 and a Setpoints & Fan tab 334. Thermostat column 330 includes a columnar list of all available thermostats, even though web page 328 was reached by clicking on thermostat 316 (FIG. 3B). If desired, the information displayed in FIG. 3C and FIG. 3D (to be discussed) can be obtained for any of the thermostats listed in Thermostat column 330.

Under General tab 332, as shown, web page 334 includes a pane 336 that provides information regarding thermostat 316 (which is labeled as T7350). As can be seen, pane 336 provides a user with information regarding one or more of thermostat status, current temperature, schedule mode, operating mode, discharge temperature, relative humidity, terminal load, lockout status and fan switch status. Clicking on Setpoints & Fans tab 334 may cause web server 38 (FIG. 3) to serve up a web page 338, as shown in FIG. 3D.

Figure 3D:
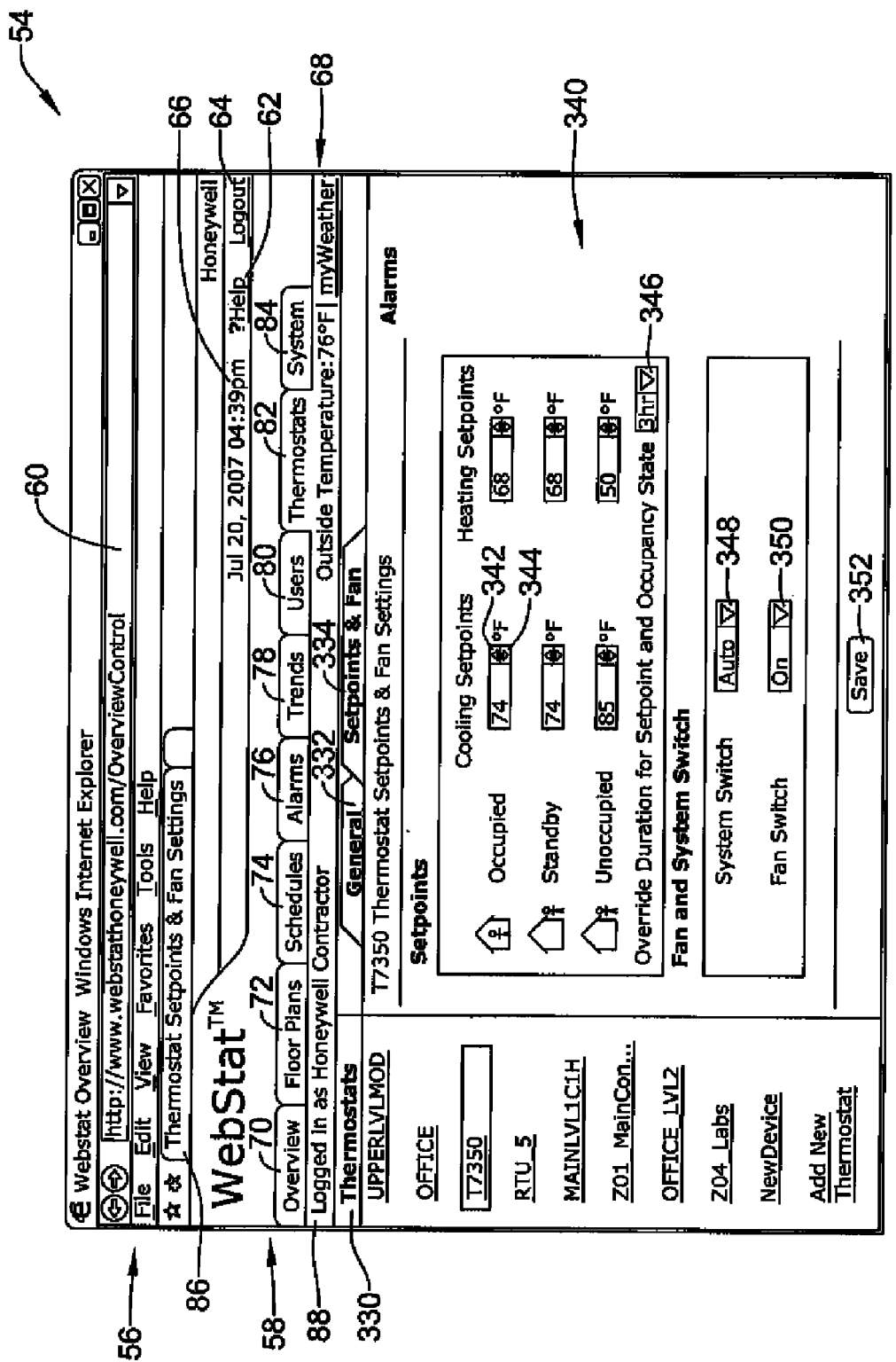

In FIG. 3D, it can be seen that web page 338 includes a pane 340 that includes information regarding setpoint and fan information for thermostat 316 (T7350). In particular, pane 340 displays cooling and heating temperature set points for one or more time periods such as occupied, unoccupied and standby. For example, pane 340 includes an up arrow 342 and a down arrow 344 that may be used to alter the cooling set point temperature during the occupied time period. Pane 340 includes a pull-down menu 346 that may be used to alter a schedule override duration.

Pane 340 also includes settings pertaining to a fan switch and a system switch. In particular, pane 340 includes a pull-down menu 348 that may be used to alter a setting such as Auto, cool, heat and the like for the system switch as well as a pull-down menu 350 that may be used to set the fan switch to either On or Auto. A Save button 352 permits a user to save any changes that they have made to the parameters displayed within web page 352. In some instances, the Save button 352 may be omitted, and web server 38 (FIG. 2) may ask a user if changes should be saved if any parameter values or settings were altered and if the user attempts to exit a particular web page by, for example, selecting another tab within navigation bar 58. Alternatively, the changes may automatically be saved.

Figure 3E:
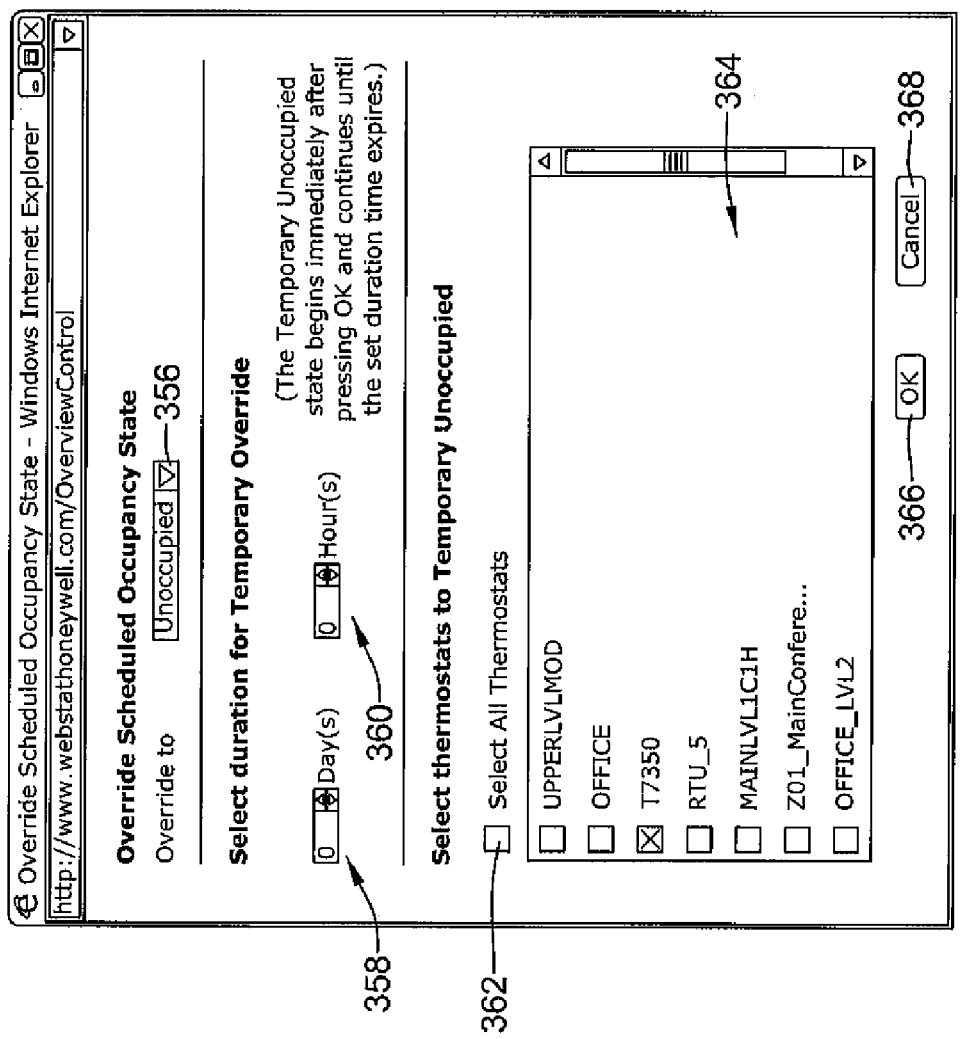

Returning briefly to FIG. 3B, if a user clicks on override button 326, web server 38 (FIG. 2) may provide web page 354, as seen in FIG. 3E. Web page 354 may be simpler in appearance than web page 54 (FIG. 3B) and may in some instances be a pop-up page that floats atop web page 54. Web page 354 includes a pull-down menu 356, which permits a user to determine how to override the current status of a particular thermostat. For example, if the current status is occupied, a user may override the current status by changing it to unoccupied. A length of the override period may be set using pull-down menu 358, which may be used to set a number of days and/or pull-down menu 360, which may be used to set a number of hours.

Once an override time period has been established, a user may wish to specify which thermostat or thermostats to apply the override condition. In some cases, web page 354 may include a check box 362 that provides a quick and simple way to select all of the thermostats that are available to the user. Alternatively, web page 354 may provide a pane 364 that includes a list of all available thermostats and permits the user to check off the thermostats that are to be included. As illustrated, it can be seen that there is a check mark in the check box adjacent the thermostat labeled as T7350 (thermostat 316). A user may then elect to initiate the override by clicking on an OK button 366 or may cancel the impending override by clicking on a Cancel button 368.

Figure 3F:
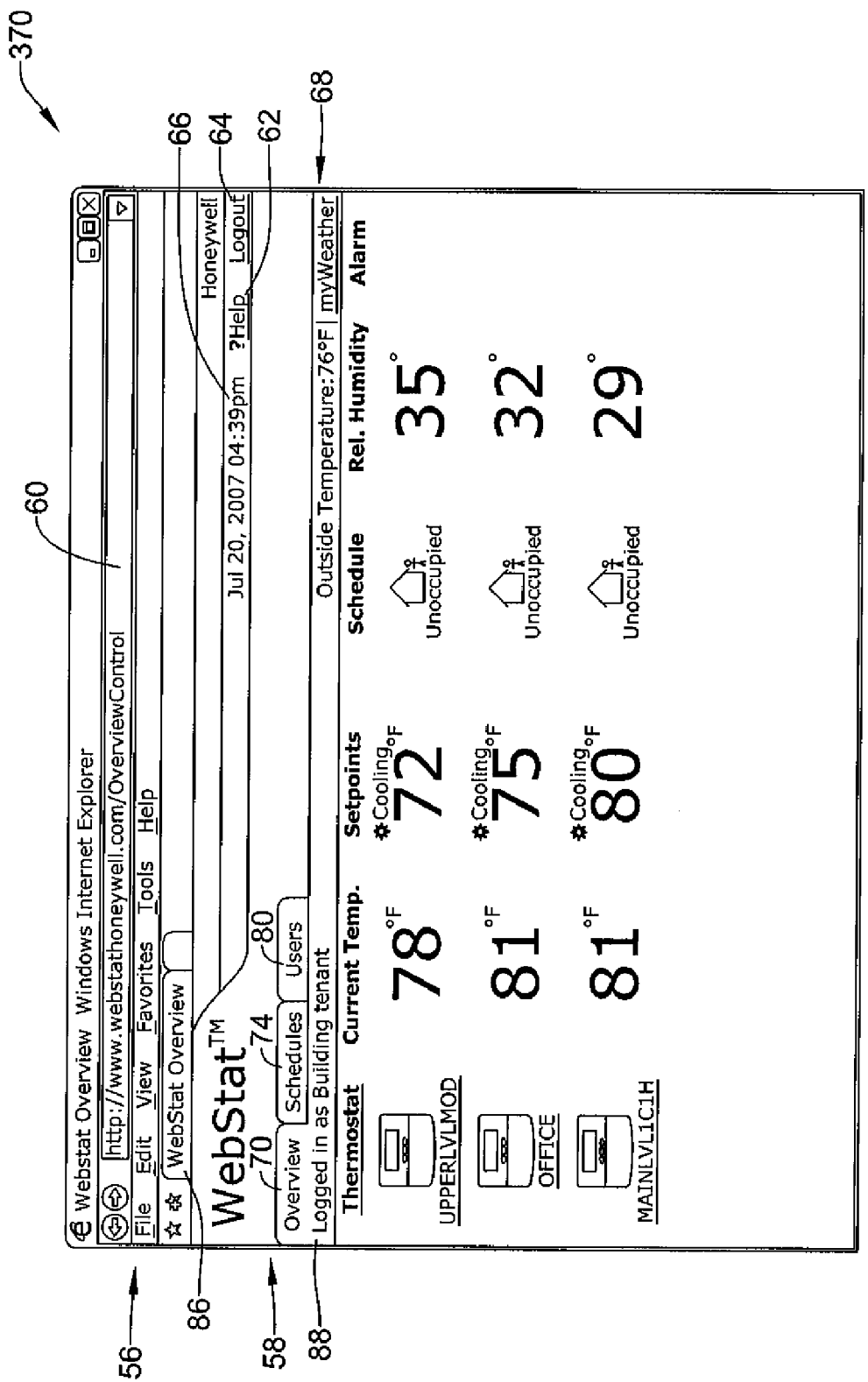

In some cases, a summary web page may provide less information than described thus far. FIG. 3F provides an example web page 370 in which navigation bar 58 includes fewer icons than shown in web page 54 (FIG. 3B). In particular, web page 370 includes Overview tab 70, Schedules tab 74 and Users tab 80. However, Floor Plans tab 72, Alarms tab 76, Trends tab 78, Thermostats tab 82 and System tab 84 (all present in web page 54) are notably absent from web page 370. Web page 370 may represent a summary or overview web page for a user that has, for example, restricted tenant privileges. In this case, a user such as a Contractor or a Facilities Manager may have determined, for example, that the user has no need for access to the trending functionality, and may have restricted the user's rights accordingly. Similarly, an authorized user may have determined that, for one reason or another, they do not wish the tenant to be able to adjust the schedule, configure any thermostats or alarms, or make any changes to system configurations. In some cases, the user may decide, for one reason or another, that more or less information is desired on the summary page. It is contemplated that the amount and/or type of information that is included on the summary page may be user definable to provide a custom look. This may be set on a user basis, a user class basis, a user rights basis, or any other basis, as desired.

FIGS. 4A-4E provide illustrative but non-limiting examples of web page that may be served up by web server 38 (FIG. 2). In particular, FIGS. 4A-4E provide web pages pertaining to the Floor Plans tab 72 (see FIG. 3B) and the corresponding functionality of building control appliance 12 (FIG. 1). The web pages shown in FIGS. 4A-4E may, for example, be accessed and displayed on a computer running a thin client application such as Microsoft® Internet Explorer®.

Figure 4A:
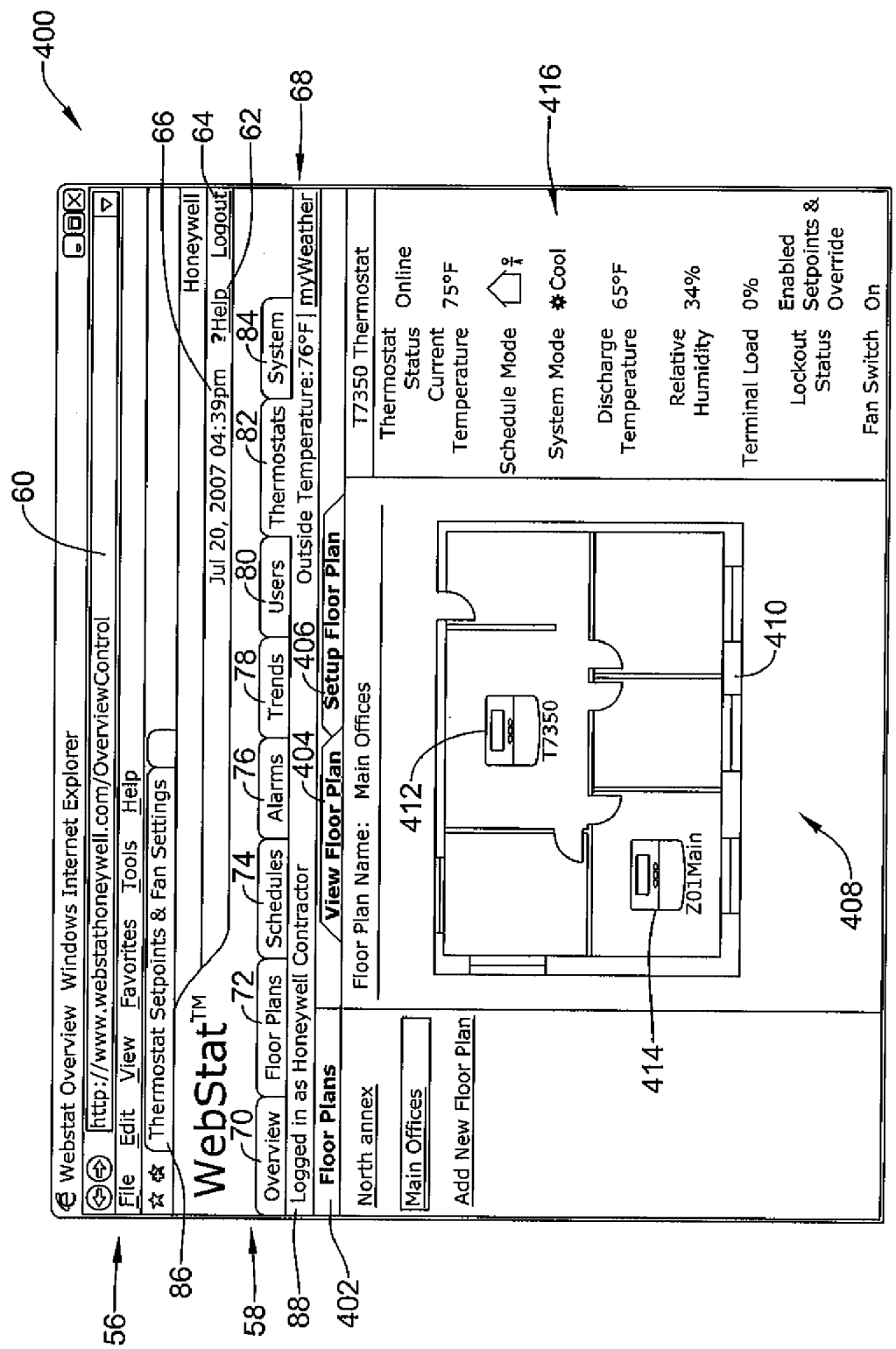
FIGS. 4A-4E are illustrative but non-limiting examples of web pages that may be generated by the HVAC control system of FIG. 1, pertaining to a floor plan functionality thereof.

FIG. 4A shows a web page 400 that may be reached, from any or nearly any web page that may be served up by web server 38 (FIG. 2), by clicking on the Floor Plans tab 72 disposed within navigation bar 58. Web page 400 includes a floor plans column 402, a View Floor Plan tab 404 and a Setup Floor Plan tab 406. Web page 400 represents a web page that may be served up as a result of a user clicking on the View Floor Plan tab 404. Building control appliance 12 (FIG. 1) permits a user to upload or otherwise import a graphical representation of a building floor plan and then arrange thermostats on the graphical representation of the building floor plan.

Floor plans column 402 may list, either graphically or alphanumerically, one or more floor plans that may be accessed by the current user. In the illustrated web page 400, floor plans column 402 includes clickable links to a North annex floor plan and a Main Offices floor plan (illustrated). There is also a link for adding a new floor plan. Clicking on the "Add New Floor Plan" link may cause web server 38 (FIG. 2) to serve up one more web pages that permit a user to select or upload a new floor plan graphic, add and/or configure thermostats, and the like. Web page 400 includes a pane 408 that provides a graphical representation 410 of (in this case) the Main Offices floor plan. As illustrated, the Main Offices floor plan includes a thermostat 412 labeled as T7350 and a thermostat 414 labeled as Z01 Main Conference superimposed thereon.

By clicking on one of the thermostat icons 412 or 414, web page 400 provides a pane 416 that displays information regarding the selected thermostat. In FIG. 4A, the user has clicked on thermostat 412 in page 408, and therefore web server 38 (FIG. 2) has displayed information pertaining to thermostat 412 within pane 416. If a user wished to view information pertaining to thermostat 414, they would simply click on thermostat 414 in pane 408. It will be recognized that the information displayed in pane 416, pertaining to thermostat 412 (labeled T7350) is the same as the information previously displayed for this thermostat in FIGS. 3B, 3C and 3D.

Figure 4B:
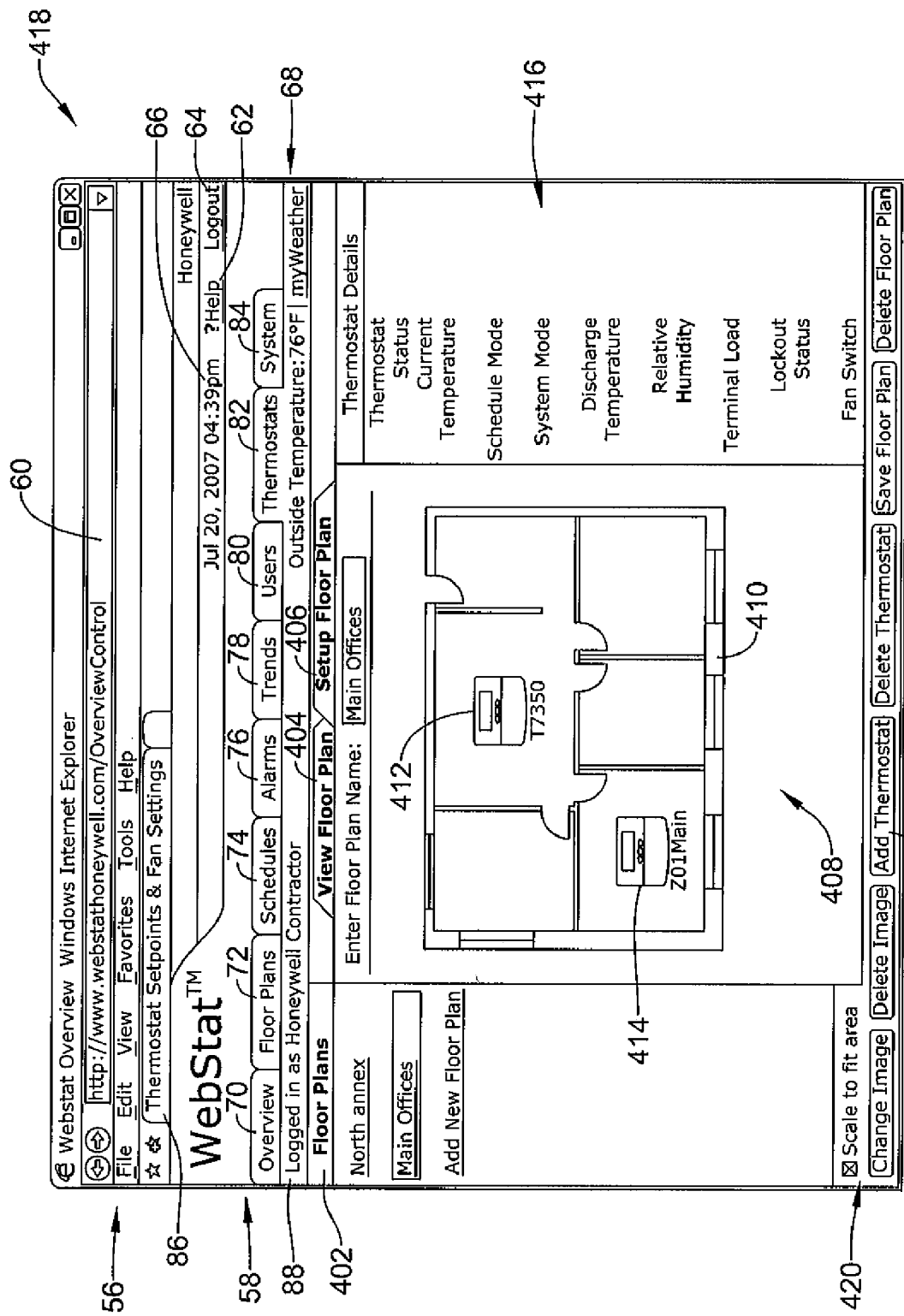

FIG. 4B shows a web page 418 that may result from a user clicking on Setup Floor Plan tab 406. It will be noted that in FIG. 4B, thermostat 412 has been moved from the left side of a room to the right side of a room. Web server 38 (FIG. 2) may be adapted to permit a user to move thermostats to correspond to their actual physical location within the physical floor space. In the illustrative embodiment, a thermostat may be moved within web page 418 by clicking on the thermostat and dragging the thermostat to a new location before releasing the mouse button. As illustrated, pane 416 does not display any specific thermostat information because no thermostat icon has been clicked.

Web page 418 may include a floor plan modification bar 420 that permits a user to, for example, change the image selected to represent the floor plan or to even delete the image. Floor plan modification bar 420 permits a user to save a current floor plan or even delete the current floor plan. Floor plan modification bar 420 includes an Add Thermostat button 422 that, in conjunction with web server 38 (FIG. 2), permits a user to add one or more additional thermostats to floor plan 410. In response to a user clicking on Add Thermostat button 422, web server 38 may display a pop-up web page 424, as seen in FIG. 4C.

Figure 4C:
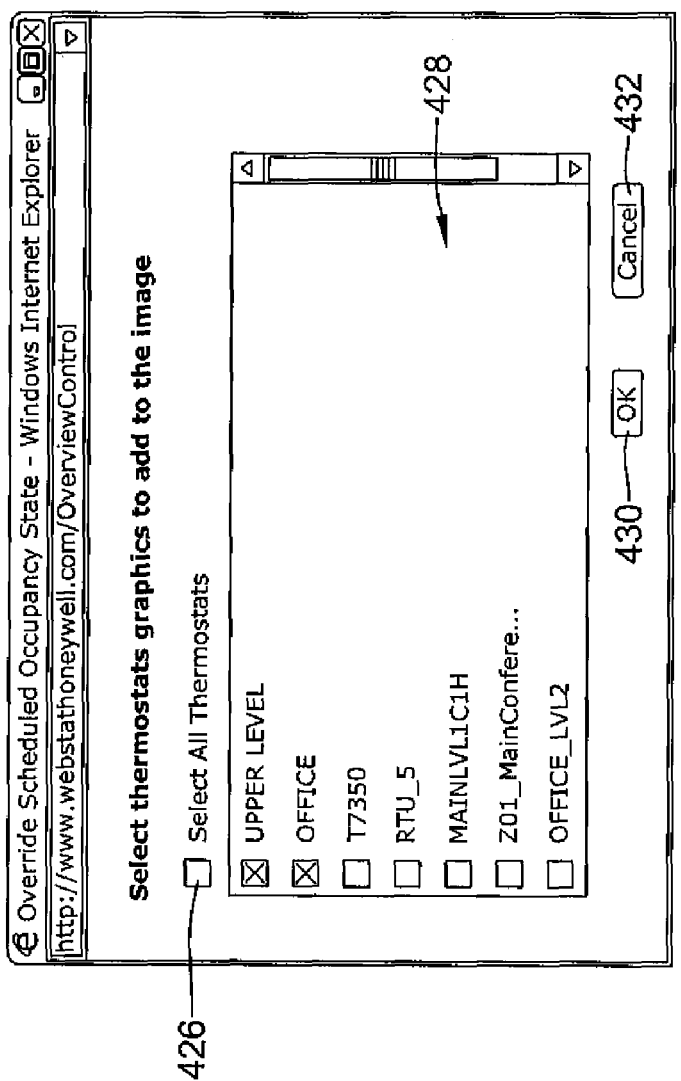

Web page 424 of FIG. 4C may be simpler in appearance than web page 418 (FIG. 4B) and may in some instances be a pop-up page that floats atop web page 418. In some instances, web server 38 (FIG. 2) serves up web page 424 so that a user may select one or more thermostats to add to floor plan 410 (FIG. 4B). In some cases, web page 424 may include a check box 426 that provides a quick and simple way to select all of the thermostats that are available to the user. Alternatively, web page 424 may provide a pane 428 that includes a list of all available thermostats, and permits the user to check off the thermostats that are to be included. As illustrated, it can be seen that there are check marks in the check boxes adjacent the thermostat labeled as UpperLevel and the thermostat labeled as Office. These names may, for example, represent physical locations of the thermostats within a space, if desired. A user may verify the selection by clicking on an OK button 430 or may cancel the impending override by clicking on a Cancel button 432.

Figure 4D:
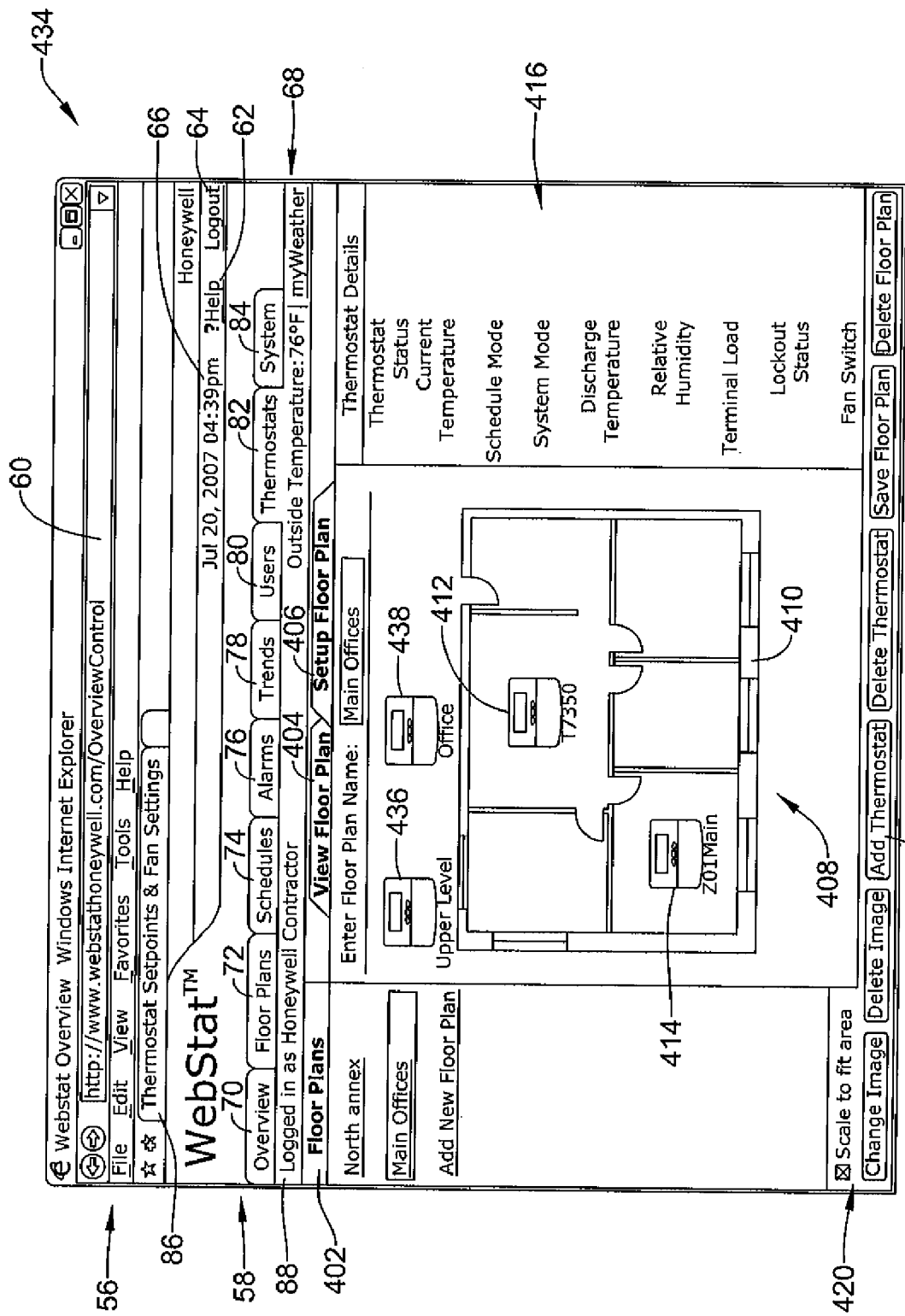
Figure 4E:
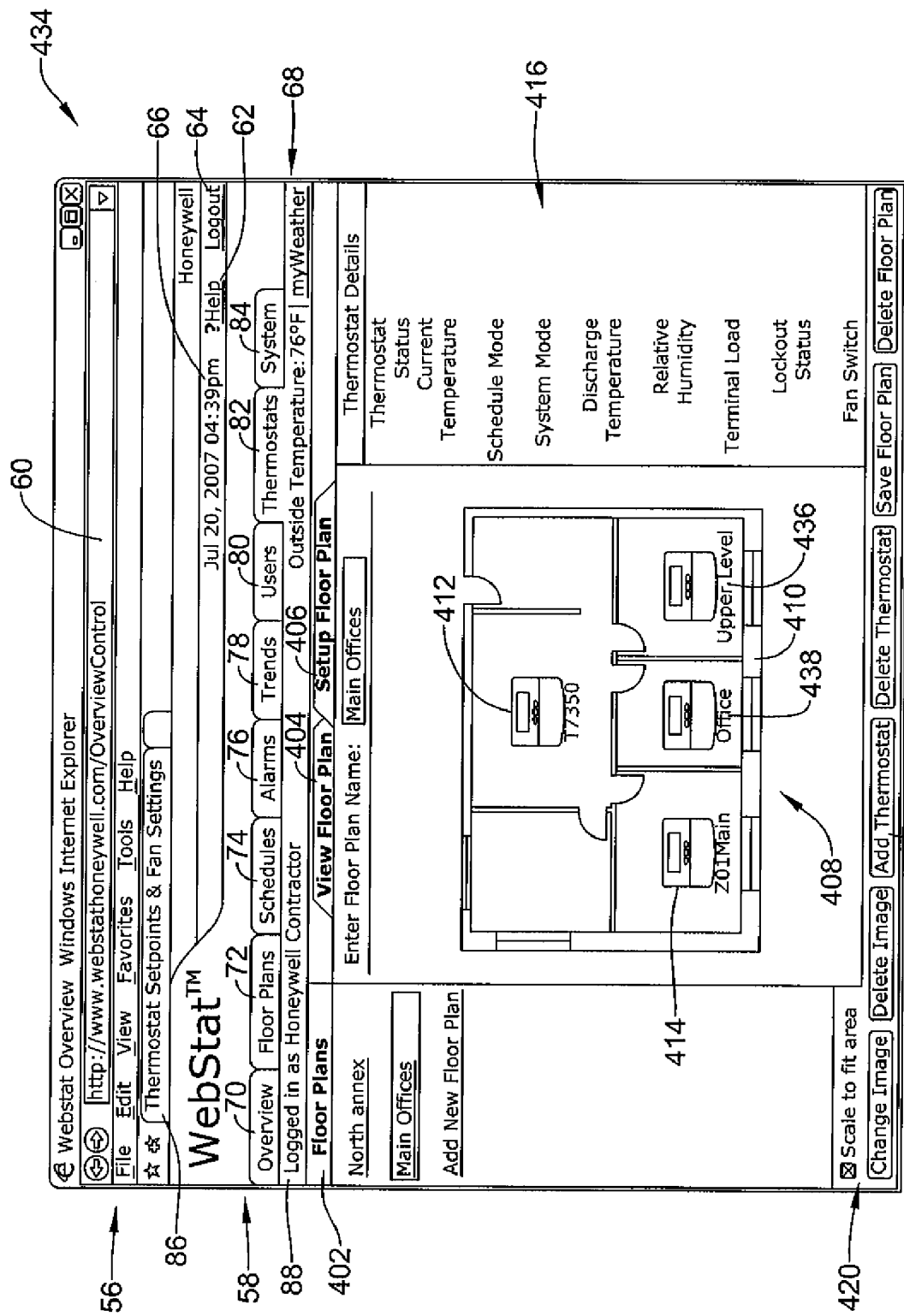

Once the user has clicked OK button 430, web server 38 (FIG. 2) may serve up web page 434, as seen in FIG. 4D. It can be seen that the newly selected thermostats have been graphically displayed as thermostat 436 (labeled as UpperLevel) and as thermostat 438 (labeled as Office). A user may position thermostat 436 and/or thermostat 438 in appropriate positions on floor plan 410 by dragging and dropping thermostat 436 and/or thermostat 438 onto floor plan 410 using, for example, a mouse. FIG. 4E shows web page 434 once thermostat 436 and thermostat 438 have been dropped into their respective positions on floor plan 410.

FIGS. 5A-5D provide illustrative but non-limiting examples of web page that may be served up by web server 38 (FIG. 2). In particular, FIGS. 5A-5D provide web pages pertaining to the Schedules tab 74 (see FIG. 3B) and the corresponding functionality of building control appliance 12 (FIG. 1). The web pages shown in FIGS. 5A-5D may, for example, be accessed and displayed on a computer running a thin client application such as Microsoft® Internet Explorer®.

Figure 5A:
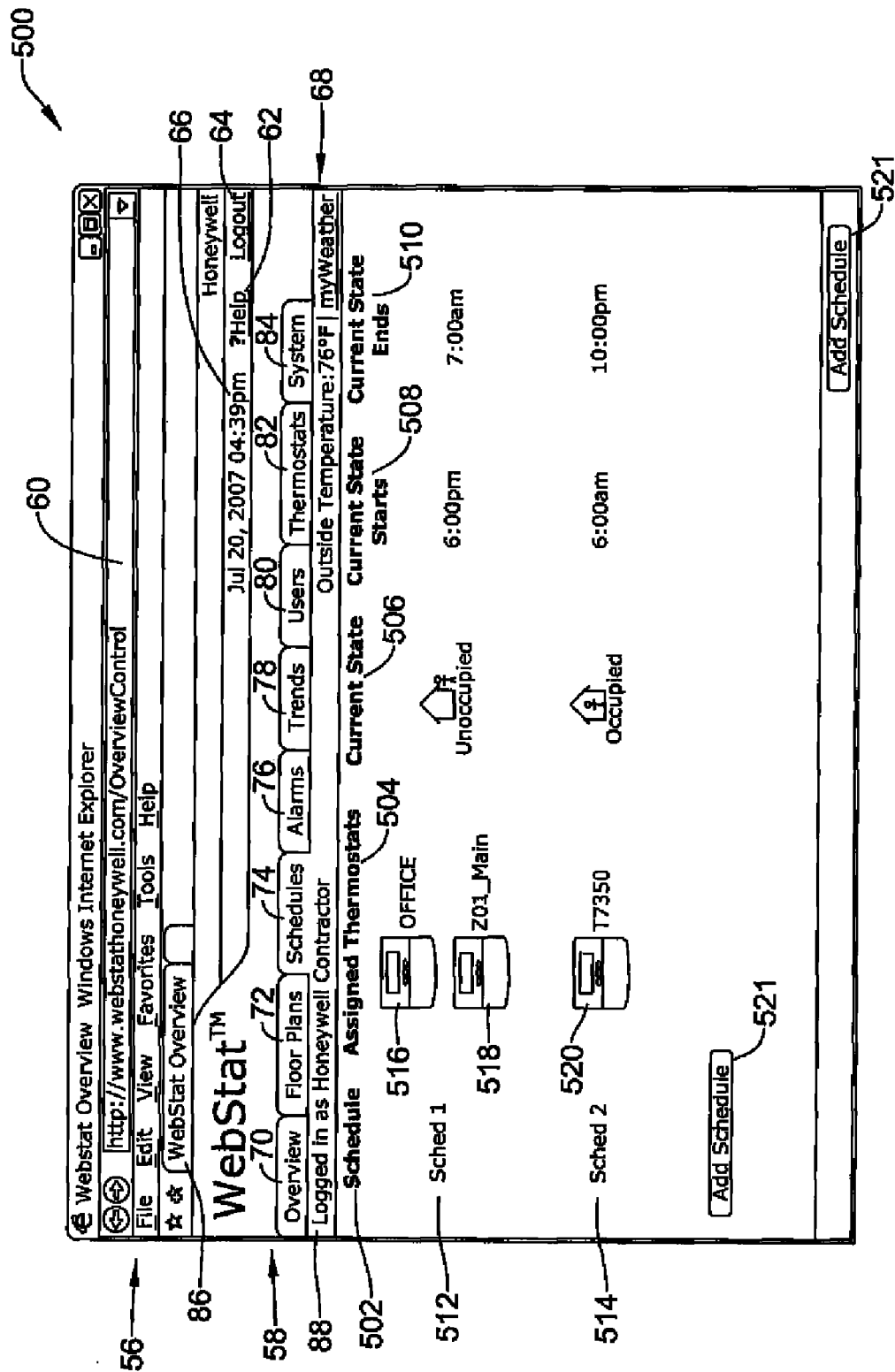
FIGS. 5A-5D are illustrative but non-limiting examples of web pages that may be generated by the HVAC control system of FIG. 1, pertaining to a scheduling functionality thereof.

FIG. 5A shows a web page 500 that may be reached, from any or nearly any web page that may be served up by web server 38 (FIG. 2), by clicking on the Schedules tab 74 disposed within navigation bar 58. Web page 500 includes a Schedule column 502, an Assigned Thermostats column 504, a Current State column 506, a Current State Starts column 508 and a Current State Ends column 510. Web page 500 may include an Add Schedule button 521, which may be used to create one or more additional schedules, as desired.

Schedule column 502 may include a graphical or alphanumeric list of all named schedules that may be available to a particular user. Building control appliance 12 (FIG. 1) may be adapted to accommodate any desired number of different schedules, such as one, two, three, four or more different schedules. As illustrated, web page 500 is displaying two schedules, named Sched1 and Sched2. Sched1 is referenced using a first schedule icon 512 and Sched2 is referenced using a second schedule icon 514. Reading across the columns, it can be seen that thermostat 516 (labeled Office) and thermostat 518 (labeled Z01Main) have been assigned to Sched1. Sched1 is currently in an unoccupied state that runs from 6:00 pm to 7:00 am. Similarly, it can be seen that thermostat 520 (labeled T7350), which is assigned to Sched2 514, is currently in an occupied state that runs from 6:00 am to 10:00 pm. The times assigned to each schedule may be viewed by clicking on the corresponding schedule name.

Figure 5B:
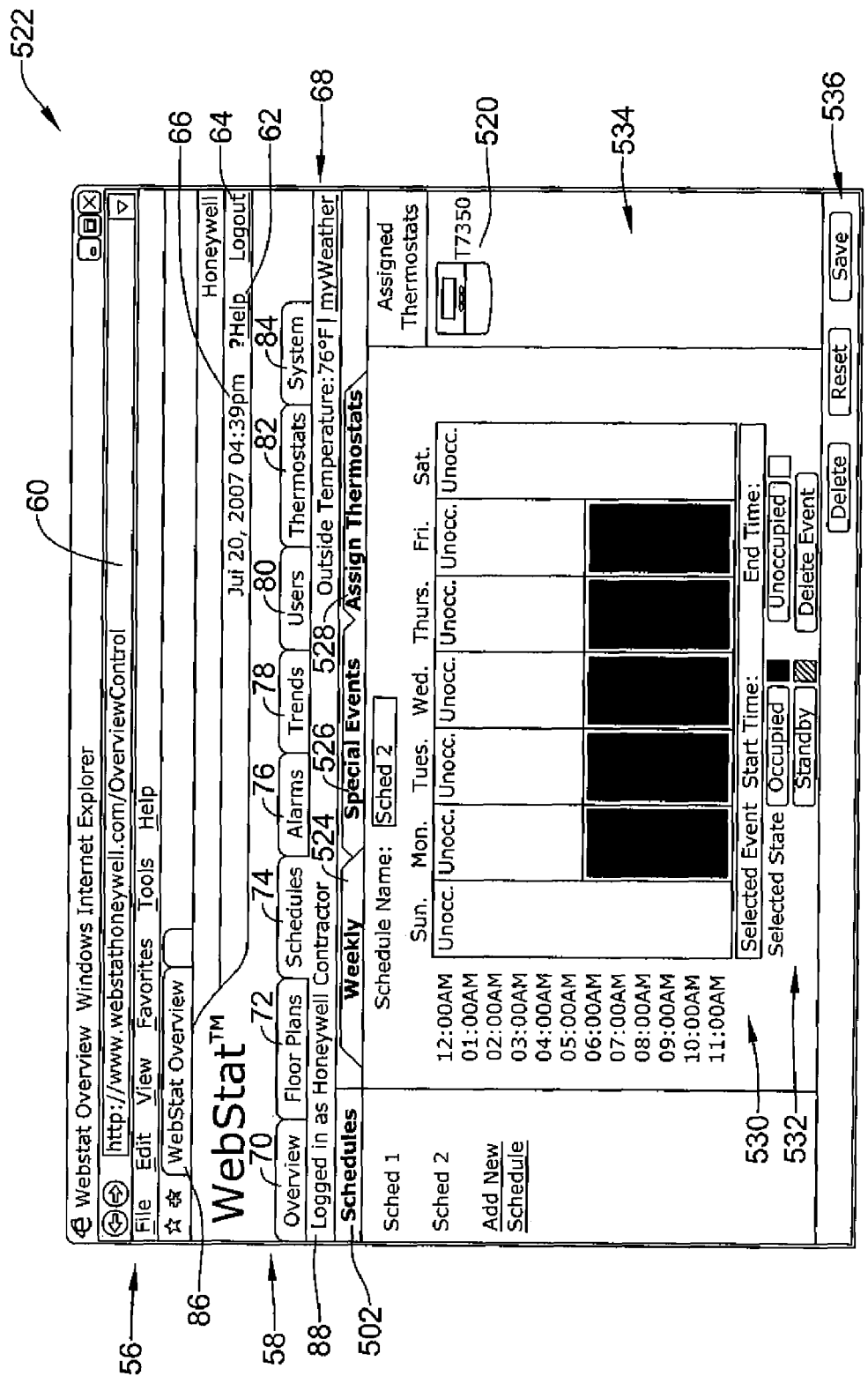

For example, if a user clicks on second schedule icon 514 (Sched2), web server 38 (FIG. 2) may serve up web page 522, seen in FIG. 5B. Web page 522 includes Schedule column 502, a Weekly tab 524, a Special Events tab 526 and an Assign Thermostats tab 528. Web page 522 is the result of clicking on Weekly tab 524. Web server 38 is providing a pane 530 that graphically displays the weekly schedule. Pane 530 may include a legend 532 that provides color coding, for example, for the graphically displayed weekly schedule.

In the illustrative embodiment, only a portion of a twenty four hour time period may be viewed without scrolling, but this is not required. In the time period shown (12:00 am midnight to about 11:30 am), it can be seen that the schedule reflects an unoccupied setting on Saturdays and Sundays during the illustrated time period. During the week (Monday through Friday), the schedule reflects an unoccupied time period from midnight to 6:00 am and an occupied time starting at 6:00 am. This corresponds, for example, to the starting time for the occupied time period shown in FIG. 5A. The schedule can be changed by simply clicking and dragging the boundaries between the unoccupied and occupied time periods.

In the illustrative example, web server 38 (FIG. 2) provides a pane 534 that may graphically and/or alphanumerically list or otherwise display the thermostat or thermostats that are assigned to a particular thermostat. For Sched2, pane 534 lists thermostat 520 (labeled as T7350). This corresponds to the summary information provided by web server 38 on web page 500 (FIG. 5A). The displayed schedule may, if desired, be deleted, reset or saved, by clicking on an appropriate button within change bar 536. Additional information pertaining to thermostat 520 may be obtained by, for example, clicking on thermostat 520.

Figure 5C:
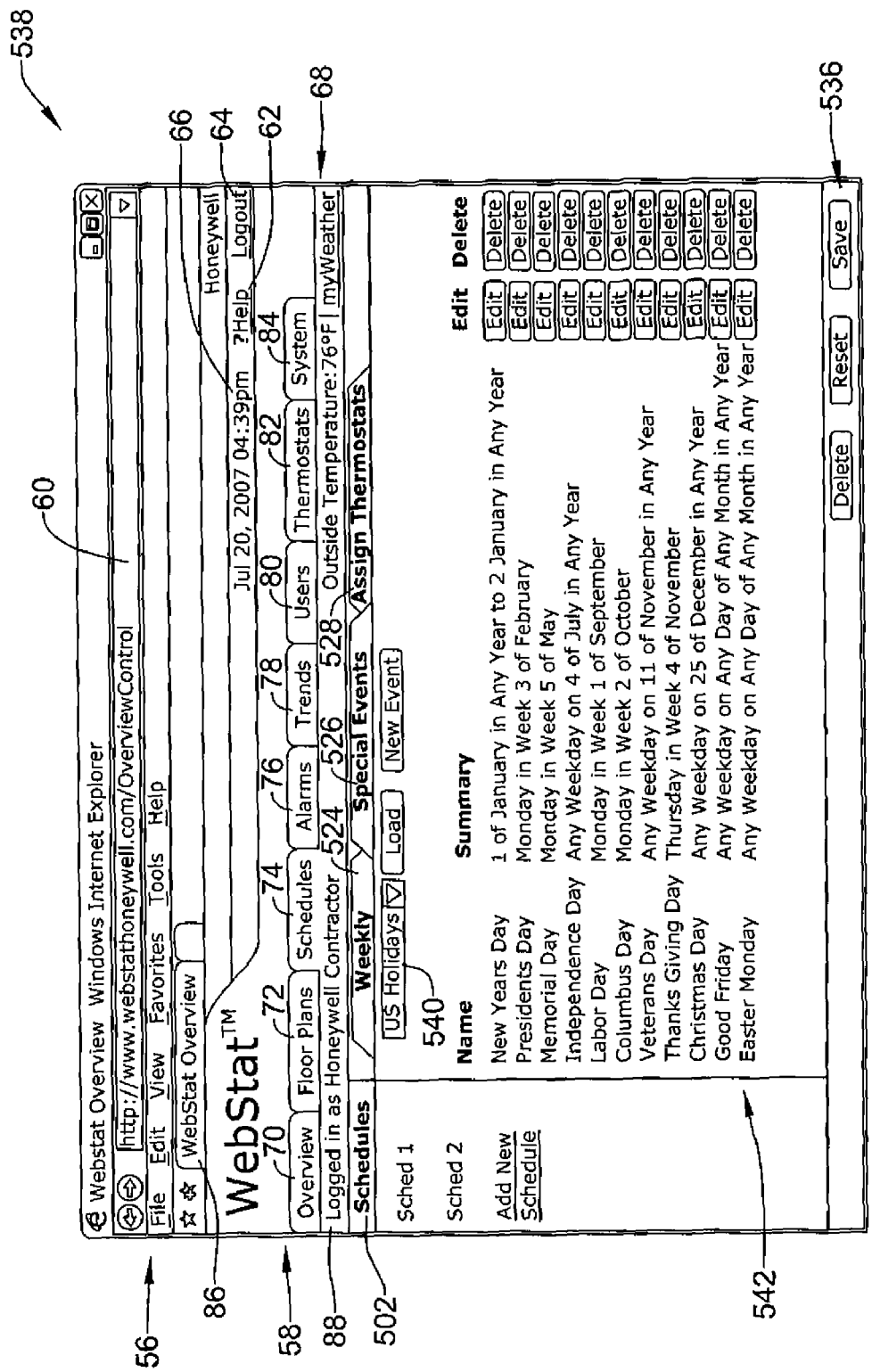

Clicking on Special Events tab 526 causes web server 38 (FIG. 2) to serve up web page 538, which is shown in FIG. 5C. Web page 538 includes a pull-down menu 540 that permits a user to select from one or more lists of special events. For example, a user may be permitted to choose from a list of US holidays, a list of Canadian holidays, or perhaps a building-specific list of special days. As illustrated, the user has selected a list of US holidays.

As a result, web server 38 provides within web page 538 a pane 542 that displays a list of predetermined holidays such as New Years Day, Independence Day and so on. For each holiday, pane 542 includes both a name of the holiday as well as rules pertaining to when the holiday occurs. For example, Independence Day is always July 4, but in some schedules, it may only be treated as a holiday if July 4 occurs during the work week. In other schedules, such as residential schedules, July 4 may be treated as a holiday regardless of what day of the week it falls on for a particular year.

For any particular listed holiday, a user may either edit or delete the listed holiday by clicking on either an Edit button or a Delete button corresponding to that holiday. For example, many businesses do not treat Columbus Day as a holiday. A facilities manager or other person may simply delete Columbus Day from the list of holidays. For each holiday, a user may edit HVAC settings by clicking the corresponding Edit button. Depending on which holiday is selected, web server 38 (FIG. 2) may for example permit the user to alter the schedule settings (i.e., when the occupied, unoccupied and/or standby periods begin and end) for that day.

Figure 5D:
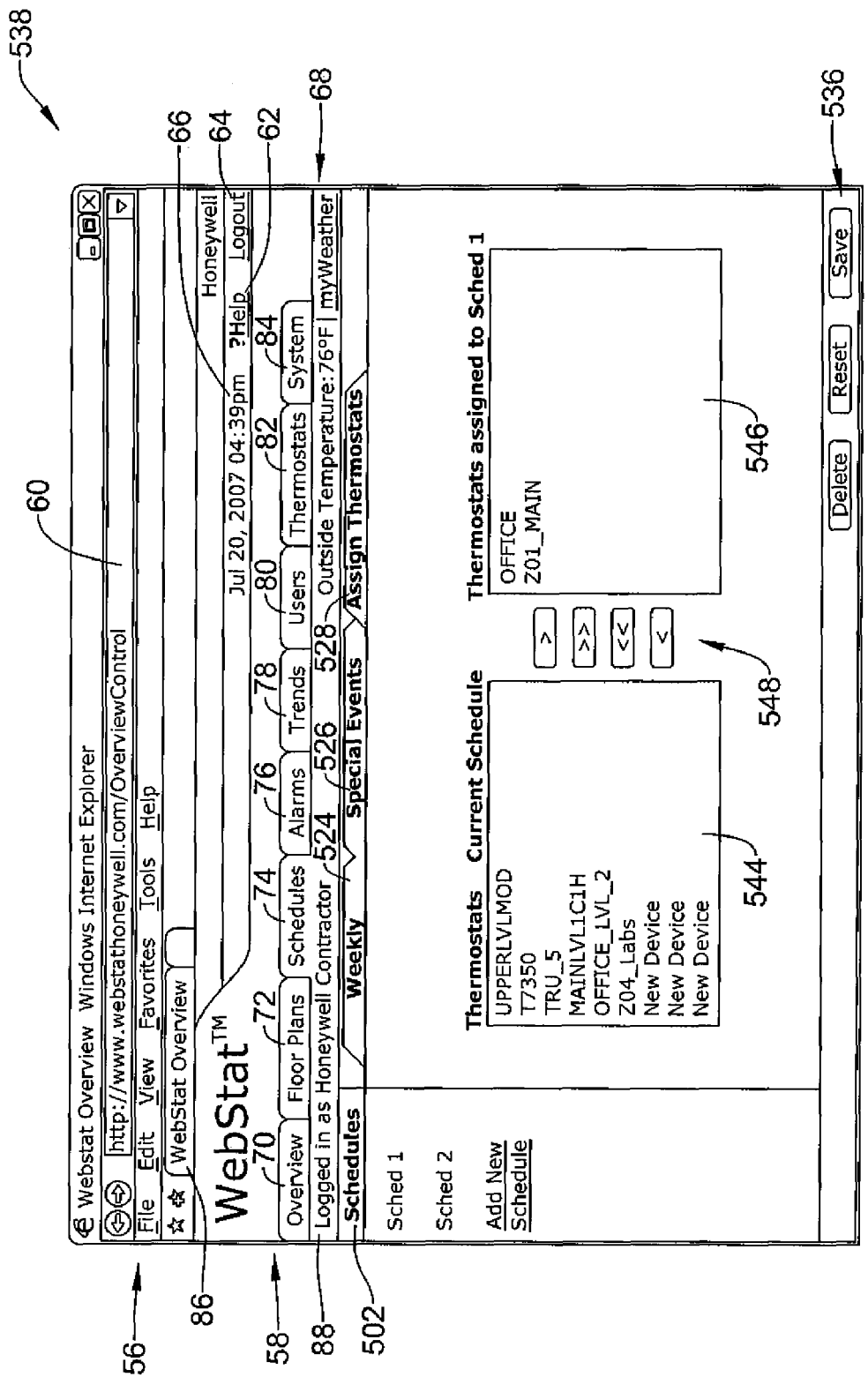

Clicking on Assign Thermostats tab 528 causes web server 38 (FIG. 2) to serve up web page 544, which is shown in FIG. 5D. Once a schedule has been created or edited, one or more thermostats may be assigned to the schedule. Web page 544 includes a pane 544 that provides a graphical and/or alpha-numeric list of available thermostats and also lists whether or not a particular thermostat is already assigned to a schedule. A pane 546 provides a graphical and/or alphanumeric list of thermostats that are currently assigned to the particular schedule.

If desired, a user may move a thermostat from pane 544 to pane 546 or from pane 546 to pane 544 using transfer buttons 548. In some cases, if a thermostat is already assigned to a different schedule, assigning the thermostat to the current schedule will remove the thermostat from its previously assigned schedule. In some instances, a thermostat that is already assigned to a schedule may not appear within the list of available thermostats within pane 544.

For example, if a user wished to assign thermostat "Z04_Labs" to Sched1, the user could click on the thermostat to highlight it and then click on the right arrow transfer button. If the user wished to remove the thermostat "Office" from Sched1, they could click on the thermostat to highlight it and then click on the left arrow transfer button. Once done, the user may delete, cancel or save their changes using change bar 536.

Figure 6A:
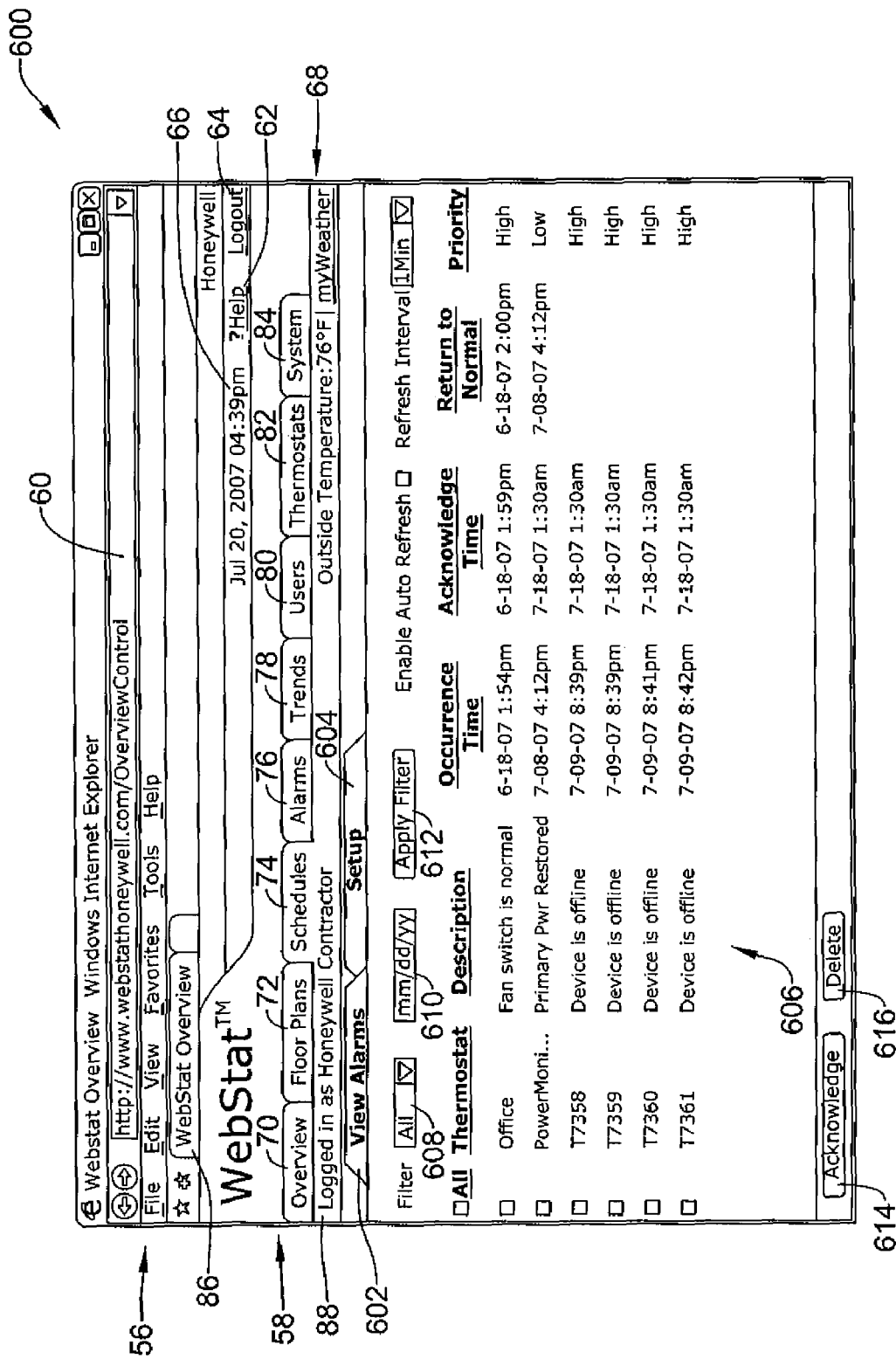
FIGS. 6A-6C are illustrative but non-limiting examples of web pages that may be generated by the HVAC control system of FIG. 1, pertaining to a batch alarm functionality thereof.
Figure 6B:
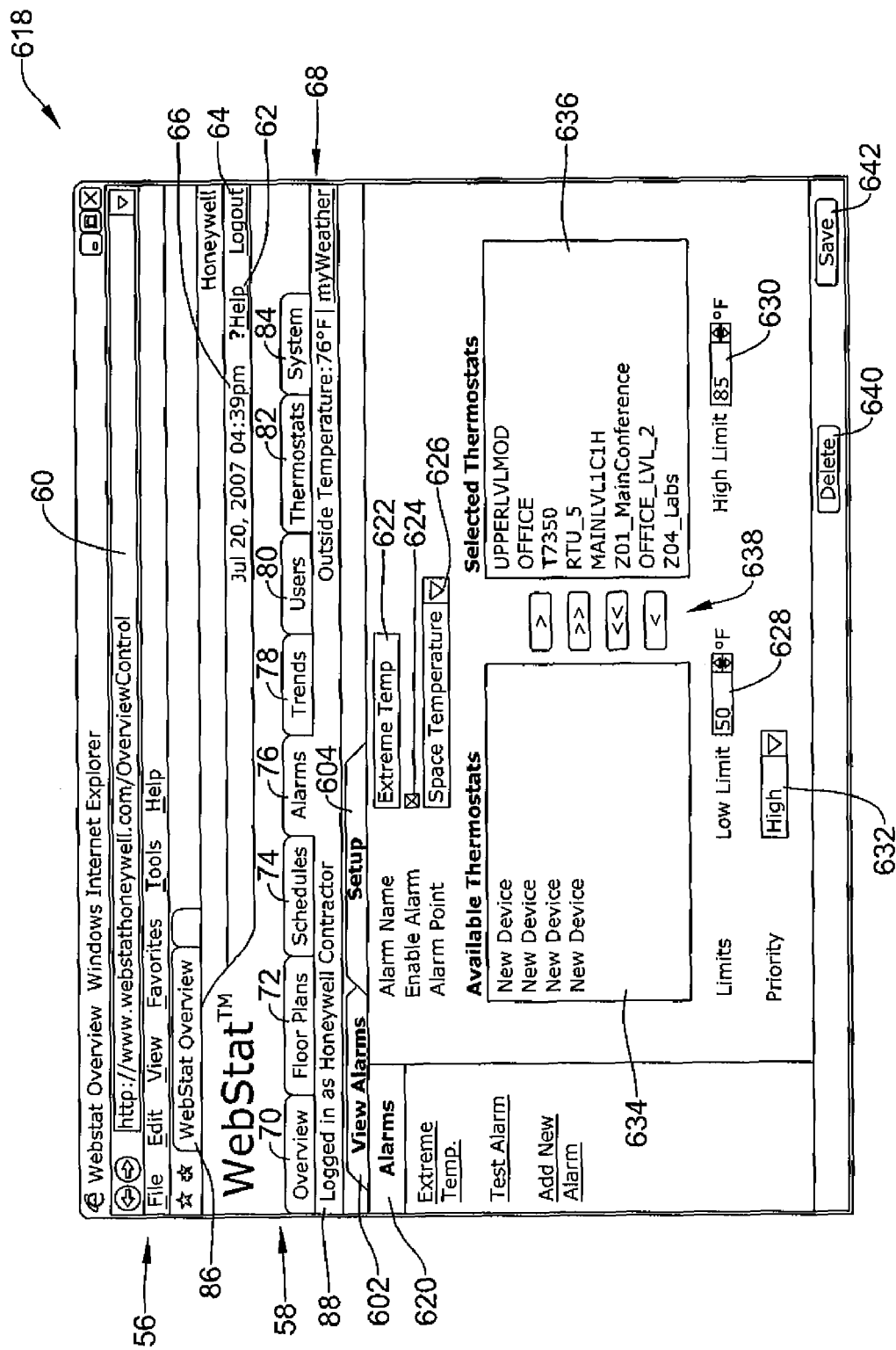
Figure 6C:
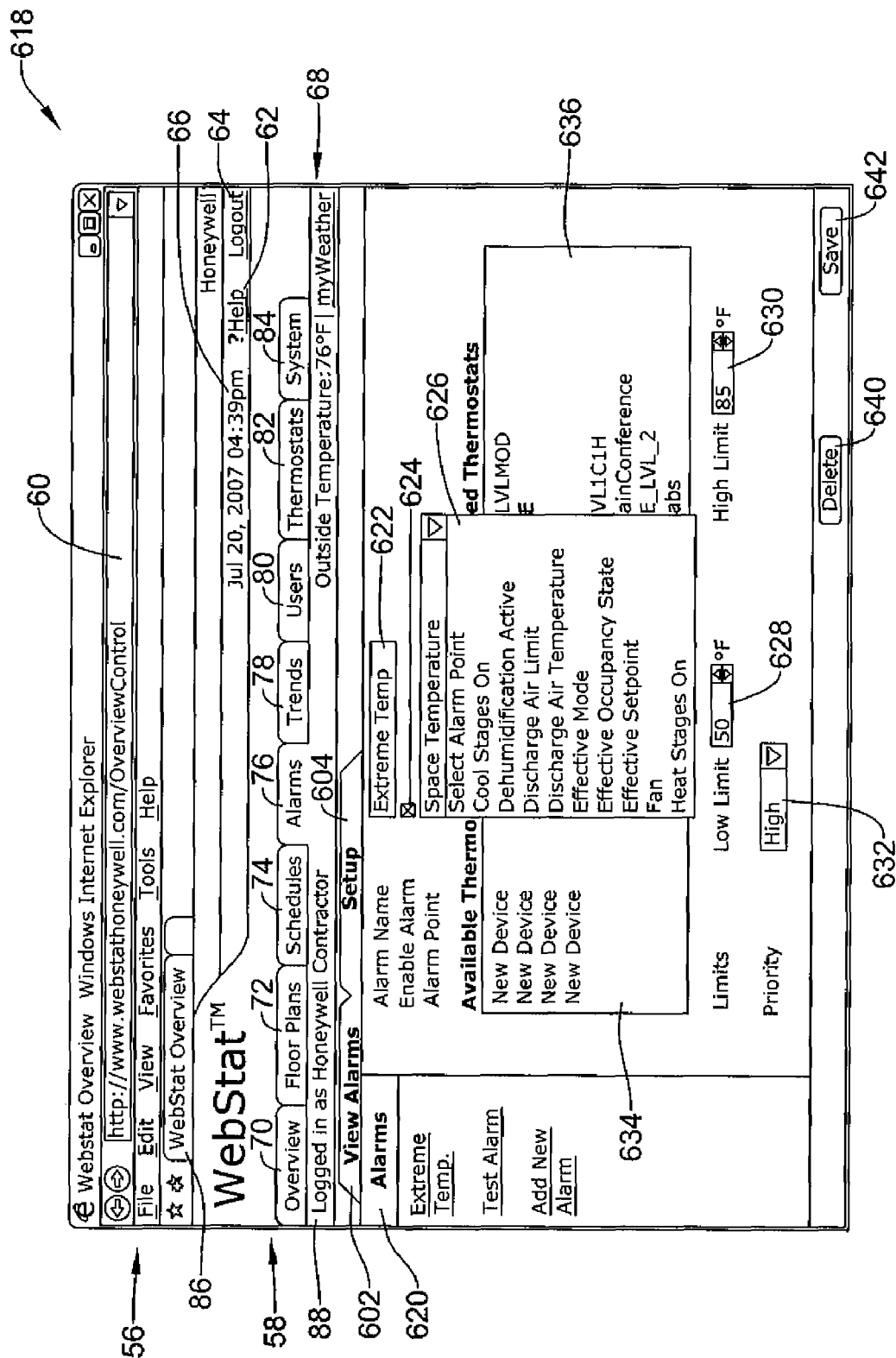

FIGS. 6A-6C provide illustrative but non-limiting examples of web page that may be served up by web server 38 (FIG. 2). In particular, FIGS. 6A-6 C provide web pages pertaining to the Alarms tab 76 (FIG. 3B) and the corresponding functionality of building control appliance 12 (FIG. 1). The web pages shown in FIGS. 6A-6C may, for example, be accessed and displayed on a computer running a thin client application such as Microsoft® Internet Explorer®.

FIG. 6A shows a web page 600 that may be reached, from any or nearly any web page that may be served up by web server 38 (FIG. 2), by clicking on the Alarms tab 76 disposed within navigation bar 58. Web page 600 includes a View Alarms tab 602 and a Setup tab 604. Web page 600 represents a web page that may be served up as a result of a user clicking on the View Alarms tab 602. Web page 600 provides a pane 606 that shows, in tabular form, a list of thermostats, an alarm description, a time at which a particular alarm occurred, a time at which the alarm was acknowledged, a time at which the alarm situation was resolved or otherwise returned to normal, and a priority ranking.

A pull-down filter menu 608 may permit a user to list only certain alarms, if desired. For example, a user may use pull-down filter menu 608 to list all alarms (as illustrated), or perhaps only some alarms. Alarms may be filtered in accordance with occurrence date, whether or not they have been acknowledged, or whether the particular alarms have been configured as being high priority, medium priority or low priority. If the pull-down filter menu 608 is used to filter by date, web server 38 (FIG. 2) provides a date box 610 that can be used to enter a suitable date. An Apply Filter button 612 causes web server 38 to filter the displayed alarms in accordance with the selected filter. It will be noted that pane 606 includes a column of check boxes adjacent the listing of thermostats displaying alarms. Once desired check boxes have been checked, the corresponding alarms may be acknowledged using Acknowledge button 614 and/or deleted using Delete button 616.

Clicking on Setup tab 604 may cause web server 38 (FIG. 2) to serve up web page 618, which is shown in FIG. 6B. Web page 618 includes an Alarms list 620. An alarm may be selected from the Alarms list 620 to be edited or even deleted. As seen in Alarm name box 622, web page 618 is currently displaying setup information for an alarm condition named Extreme Temp. Check box 624 indicates that the alarm has been enabled, and a pull-down menu 626 may be used to select the parameter upon which the Extreme Temp alarm will be based. In this situation, Space Temperature is the chosen parameter. FIG. 6C shows pull-down menu 626 in an expanded fashion, illustrating parameters that may be chosen.

Returning to FIG. 6B, a low limit box 628 permits a user to set a lower limit by either entering the lower limit or by toggling the value up and/or down. A high limit box 630 permits a user to set a high limit by either entering the high limit or by toggling the value up and/or down. In the illustrated alarm setup, the alarm will be raised if the space temperature drops below 50° F. or goes above 85° F. This has been set as a high priority alarm, as seen by priority pull-down menu 632.

Once an alarm has been configured, web page 618 permits the user to select the thermostat or thermostats to which the alarm will be applied. Web page 618 provides a pane 634 that displays available thermostats, a pane 636 that displays selected thermostats, and transfer buttons 638 that may be used to move thermostats back and forth between pane 634 (available thermostats) and pane 636 (selected thermostats). Once the thermostats have been selected, the user may either delete the alarm via Delete button 640 or save the alarm via Save button 642.

Figure 7A:
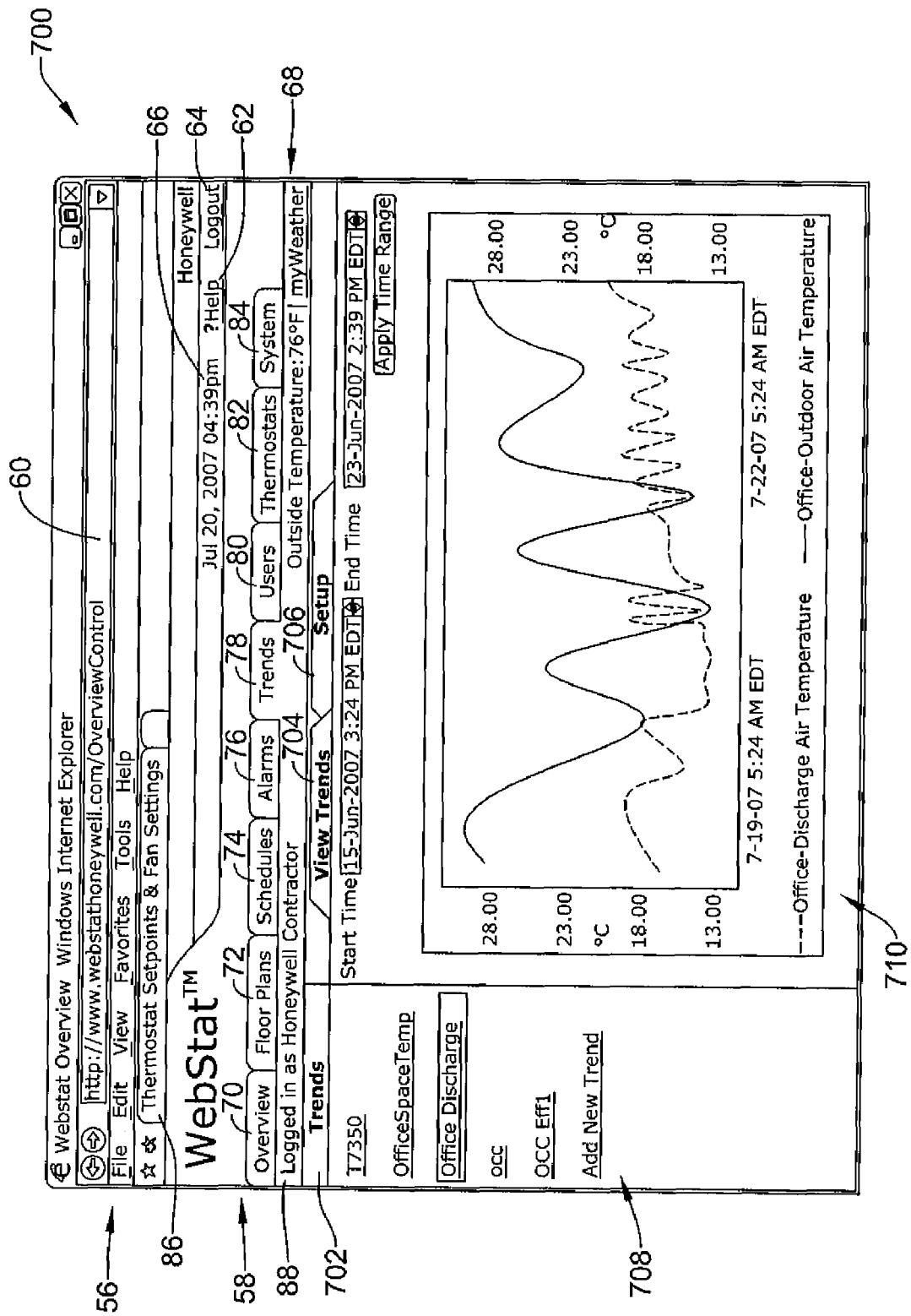
FIGS. 7A-7B are illustrative but non-limiting examples of web pages that may be generated by the HVAC control system of FIG. 1, pertaining to a trend analysis and display functionality thereof.
Figure 7B:
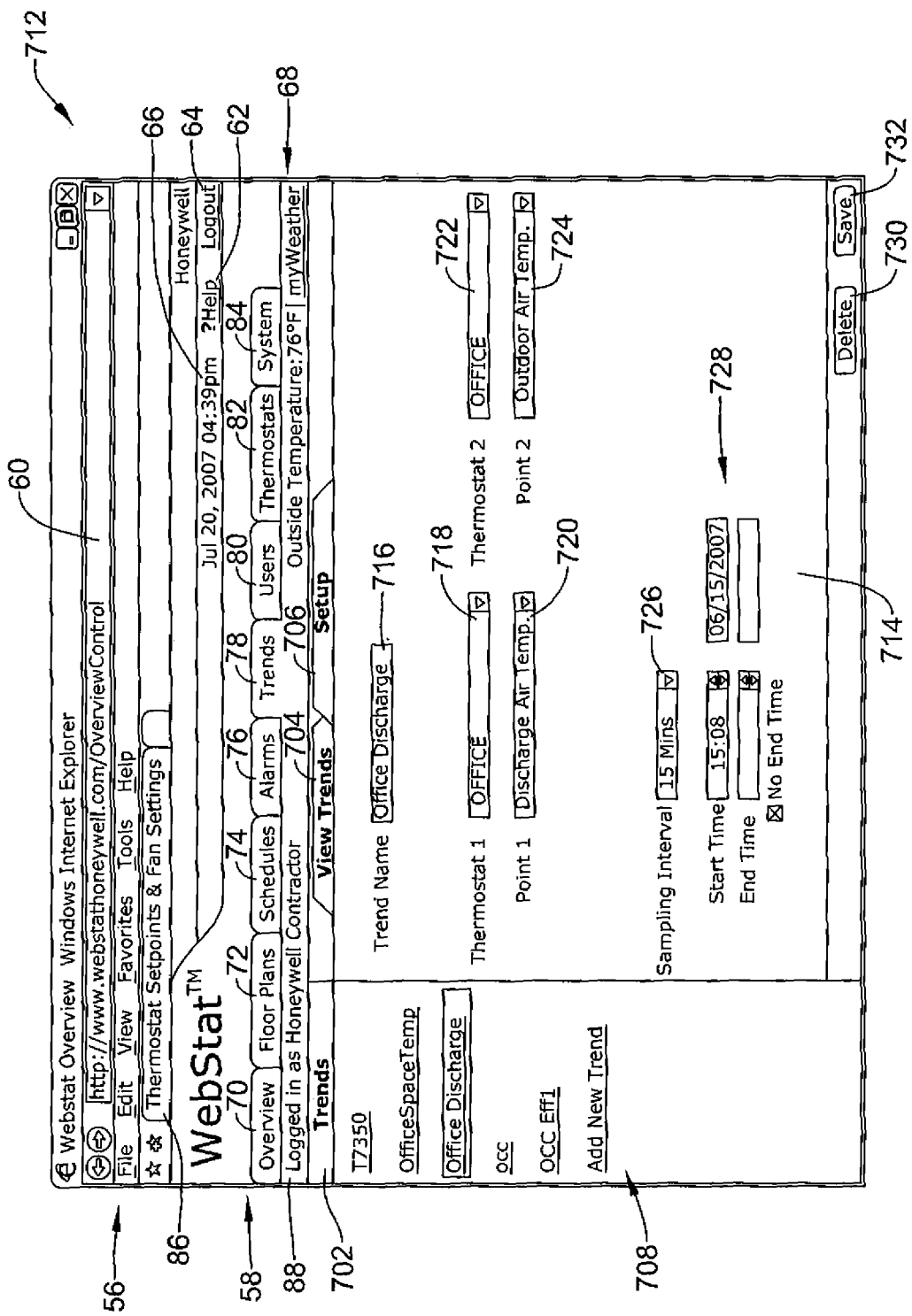

FIGS. 7A-7B provide illustrative but non-limiting examples of web page that may be served up by web server 38 (FIG. 2). In particular, FIGS. 7A-7B provide web pages pertaining to the Trends tab 78 (FIG. 3B), and the corresponding functionality of building control appliance 12 (FIG. 1). The web pages shown in FIGS. 7A-7B may, for example, be accessed and displayed on a computer running a thin client application such as Microsoft® Internet Explorer®.

FIG. 7A shows a web page 700 that may be reached, from any or nearly any web page that may be served up by web server 38 (FIG. 2), by clicking on the Trends tab 78 disposed within navigation bar 58. Web page 700 includes a Trends column 702, a View Trends tab 704 and a Setup tab 706. Web page 700 represents a web page that may be served up as a result of a user clicking on the View Trends tab 704. Trends column 702 provides a graphical and/or alphanumeric listing of available trends. These may be trends that have previously been configured. Trends column 702 may also include an Add New Trend link 708 that can, as will be discussed, be used to create a new trend.

Web page 700 displays a pane 710 that includes a graphical representation of several parameters. In the illustrated trend, pane 710 provides a comparison of Discharge Air Temperature and Outdoor Air Temperature for a thermostat labeled Office. In some cases, as shown, web server 38 (FIG. 2) may create and/or track a trend that shows two different parameters measured by a single thermostat. In some instances, web server 38 may create and/or track a trend that shows a common parameter measured by two different thermostats. In some cases, web server 38 may create and/or track a trend that shows a single parameter measured by a single thermostat. Other combinations and permutations can be used, as desired.

By clicking on Setup tab 706 or by clicking on Add New Trend link 708, web server 38 (FIG. 2) serves up web page 712, which is shown in FIG. 7B. Web page 712 includes a pane 714 that may be used to input information to create a new trend. As illustrated, pane 714 shows the parameter choices and other settings that were used to create the trend shown in FIG. 7A. A trend name is entered at box 716. A pull-down menu 718 may be used to select the first thermostat and pull-down menu 720 may be used to select the parameter that will be tracked for the first thermostat. Similarly, a pull-down menu 722 may be used to select the second thermostat and pull-down menu 724 may be used to select the parameter that will be tracked for the second thermostat.

A Sampling Interval pull-down menu 726 permits a user to select how often data points will be plotted while a Time Selector 728 permits the user to select starting and/or stopping points for the chosen trend. Once all parameters have been set and all choices made, the user may either delete the trend using Delete button 730 or save the trend using Save button 732.

FIGS. 8A-8J provide illustrative but non-limiting examples of web page that may be served up by web server 38 (FIG. 2). In particular, FIGS. 8A-8J provide web pages pertaining to the Users tab 80 (FIG. 3B) and the corresponding functionality of building control appliance 12 (FIG. 1). The web pages shown in FIGS. 8A-8J may, for example, be accessed and displayed on a computer running a thin client application such as Microsoft® Internet Explorer®.

Figure 8A:
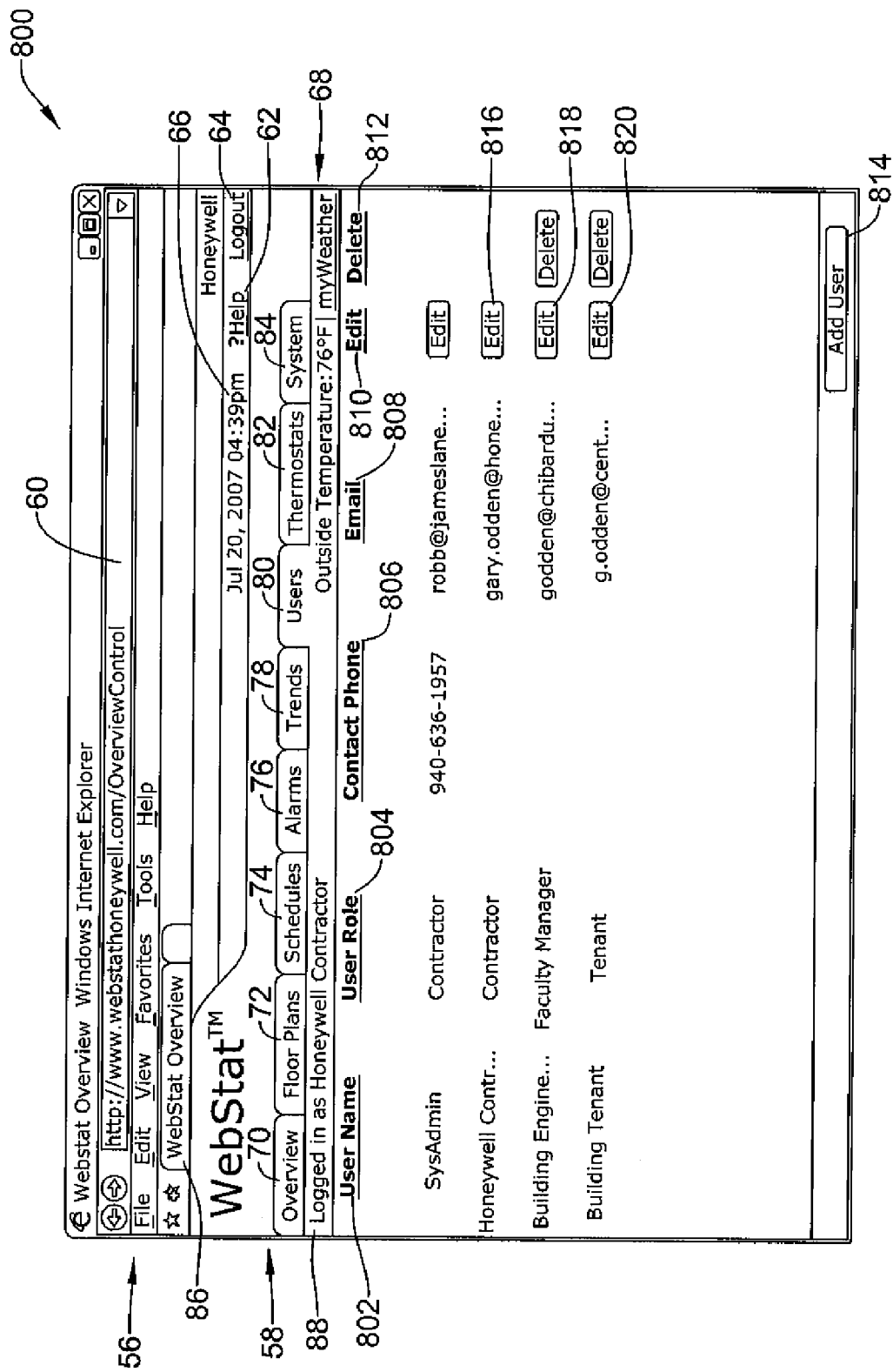
FIGS. 8A-8J are illustrative but non-limiting examples of web pages that may be generated by the HVAC control system of FIG. 1, pertaining to a users configuration functionality thereof.

FIG. 8A shows a web page 800 that may be reached, from any or nearly any web page that may be served up by web server 38 (FIG. 2), by clicking on the Users tab 80 disposed within navigation bar 58. Web page 800 includes a User Name column 802, a User Role column 804, a Contact Phone column 806, an Email column 808, an Edit column 810 and a Delete column 812. These are only illustrative. For example, contact Phone column 806 and Email column 808 provide contact information that in some cases may not be used by web server 38. An Add User button 814 may permit a user, depending on their user role, to add one or more users, as will be discussed subsequently.

User Name column 802 provides a graphical and/or alphanumeric listing of all authorized users. In some cases, User Name column 802 may list all users, regardless of the user roll of the user currently logged into building control appliance 12 (FIG. 2). In some cases, User Name column 802 may only list users of a particular role or class. For example, web server 38 may only list users that are at or above the level of the current user. A tenant may, for example, see a list of contractors and/or facility managers, but may not see other tenants beyond themselves.

User Role column 804 may provide a graphical and/or alphanumeric listing of the particular user role assigned to each of the displayed users. In some instances, User Role column 804 may include an Add New User link 815 that may be clicked on to add a new user, as will be discussed. In some cases, the user roles or classes may include Contractor, Facility Manager and Tenant. These are only illustrative. A special Contractor labeled SysAdmin may be a user that has Contractor privileges that cannot be deleted, thereby assuring that HVAC control system 10 (FIG. 1) retains at least one user/contractor. It can be seen that the Delete button (in Delete column 812) has been grayed out for the SysAdmin.

In the illustrative embodiment, a Contractor is a user that has all privileges assigned and that can perform all tasks. Moreover, a Contractor may delete a user having any role or class. A Facilities Manager is, for example, a building engineer that maintains HVAC equipment and that monitors the HVAC equipment with the help of building control appliance 12 (FIG. 2). In the illustrative embodiment, a Facilities Manager may only delete Tenants and other Facilities Managers. A Tenant only has access to the thermostats that are assigned to the particular Tenant.

Figure 8B:
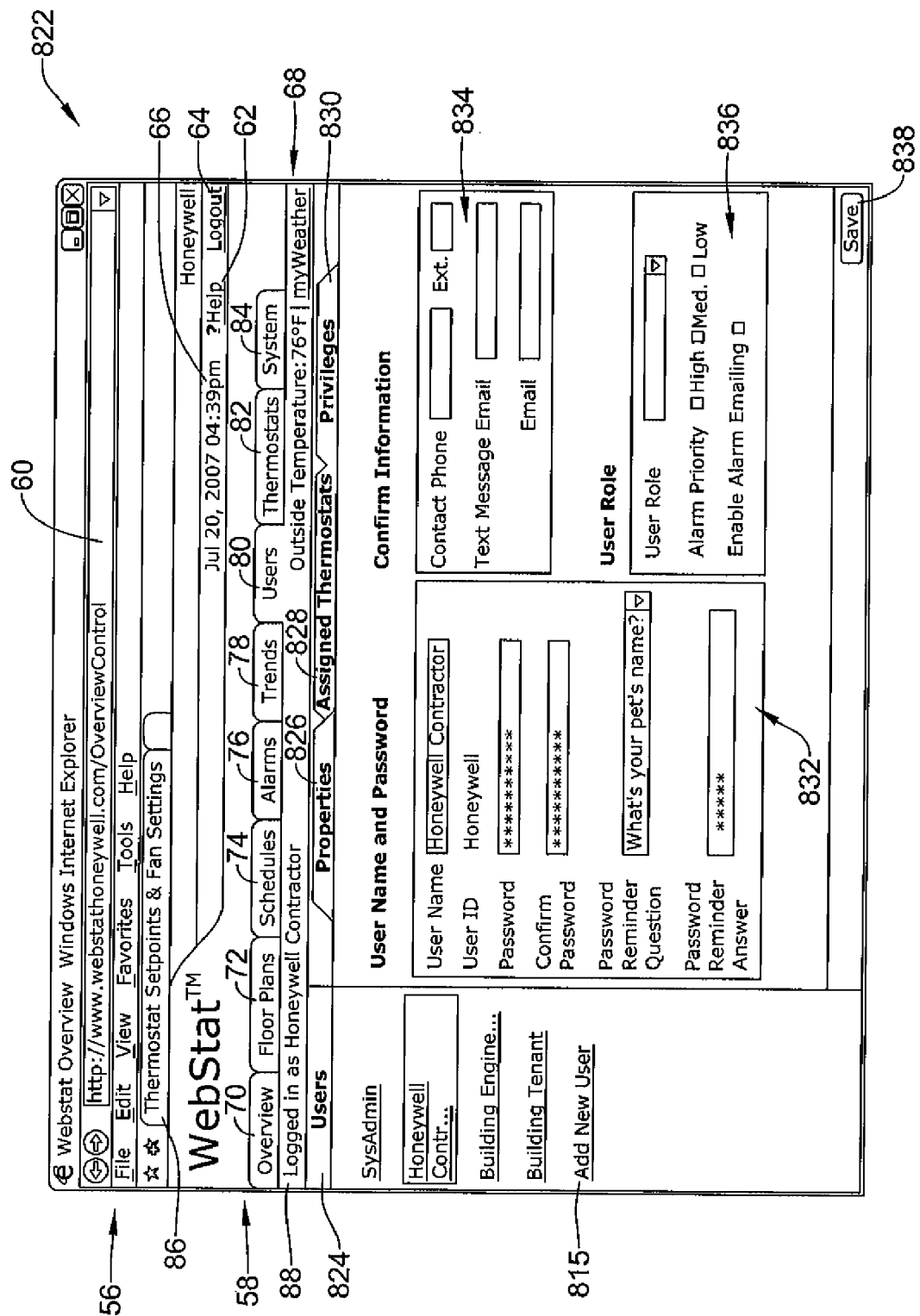

Edit column 810 includes an Edit button 816 corresponding to a user named Honeywell® Contractor, an Edit button 818 corresponding to a user named Building Engineer, and an Edit button 820 corresponding to a user named Building Tenant. Clicking on Edit button 816 may cause web server 38 (FIG. 2) to serve up a web page 822, which is shown in FIG. 8B.

Web page 822 includes a Users column 824, a Properties tab 826, an Assigned Thermostats tab 828 and a Privileges tab 830. Web page 822 represents a web page that may be served up as a result of a user clicking on the Properties tab 826. Web page 822 includes a pane 832 that permits Honeywell® Contractor (or another Contractor or the SysAdmin) to enter or edit login information, a pane 834 that pertains to contact information and a pane 836 that pertains to user role and alarm information. A Save button 838 permits the user to save any changed information.

Figure 8C:
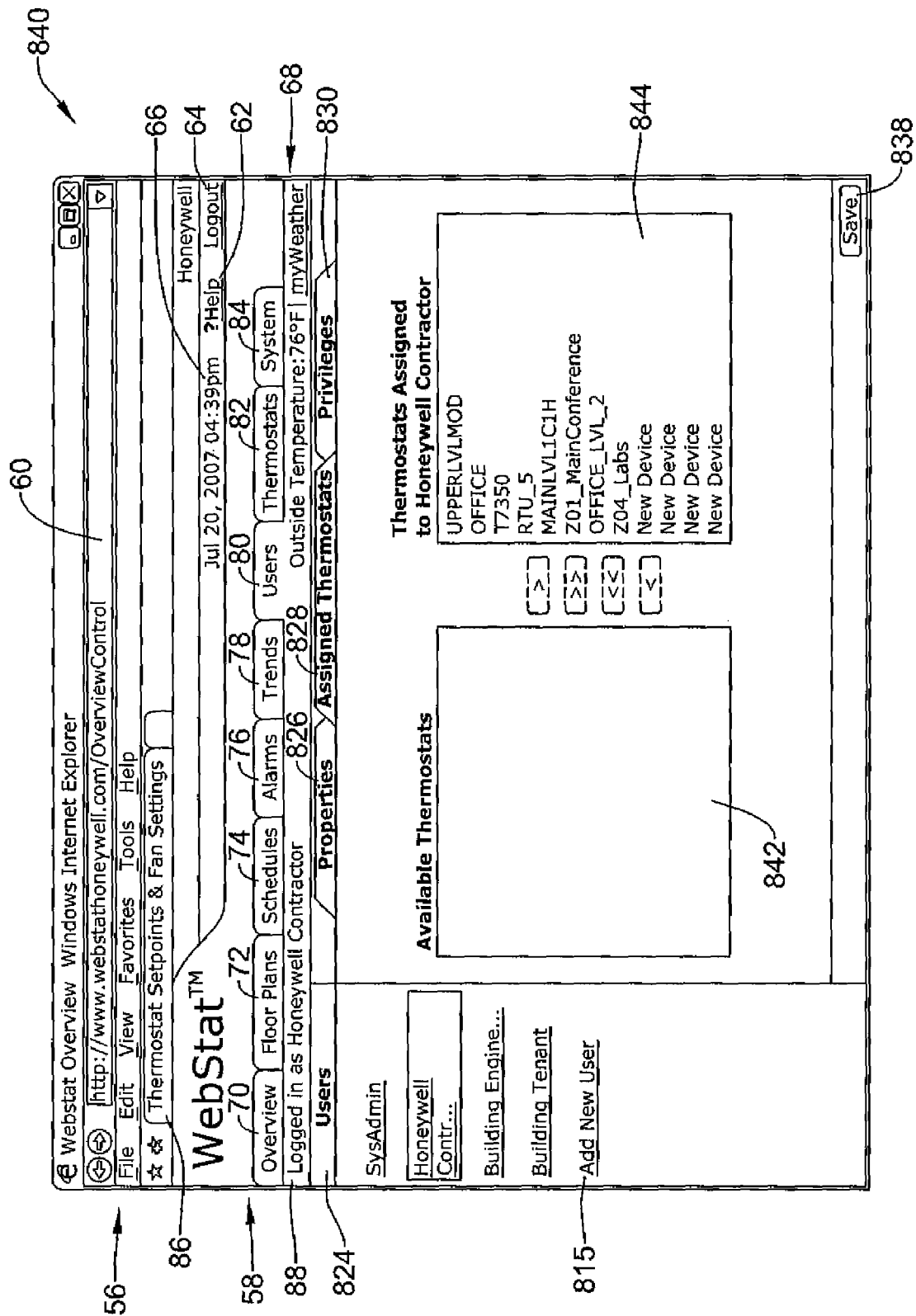

Clicking on Assigned Thermostats tab 828 may cause web server 38 (FIG. 2) to serve up web page 840, which is shown in FIG. 8C. Web page 840 permits a user with sufficient rights to view and/or change the thermostats assigned to a particular user. As illustrated, web page 840 provides information pertaining to the user named Honeywell® Contractor. A pane 842 provides a graphical and/or alphanumeric listing of available thermostats not already assigned to the user while a pane 844 provides a graphical and/or alphanumeric listing of thermostats assigned to the user. As the user is a Contractor in the example shown, all thermostats are assigned and remain assigned to the user, and hence the transfer buttons are grayed out.

Figure 8D:
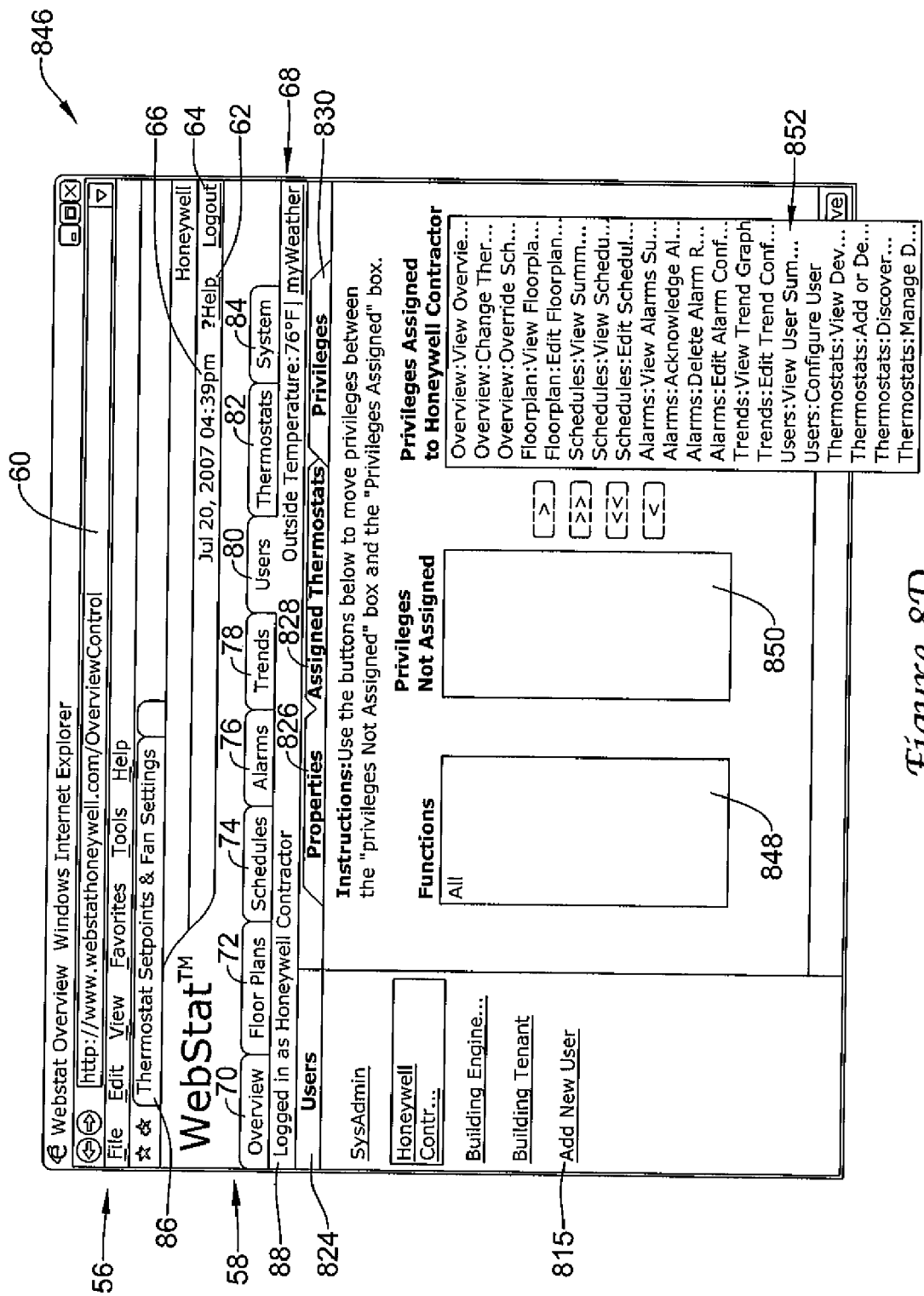

Clicking on Privileges tab 830 may cause web server 38 (FIG. 2) to serve up web page 846, which is shown in FIG. 8D. Web page 846 permits a user with sufficient rights to view and/or change the privileges assigned to a particular user. As illustrated, web page 846 provides information pertaining to the user named Honeywell® Contractor. Web page 846 may include a pane 848 that lists functions, a pane 850 that lists privileges that have not been assigned and a pane 852 that lists privileges that have been assigned. As web page 846 provides information for a Contractor (named Honeywell® Contractor), it can be seen that the functions listed in pane 848 have been grayed out, and that all privileges have been assigned. By reviewing the privileges listed in pane 852, it can be seen that users having the Contractor role have substantial authority within building control appliance 12 (FIG. 2).

Figure 8E:
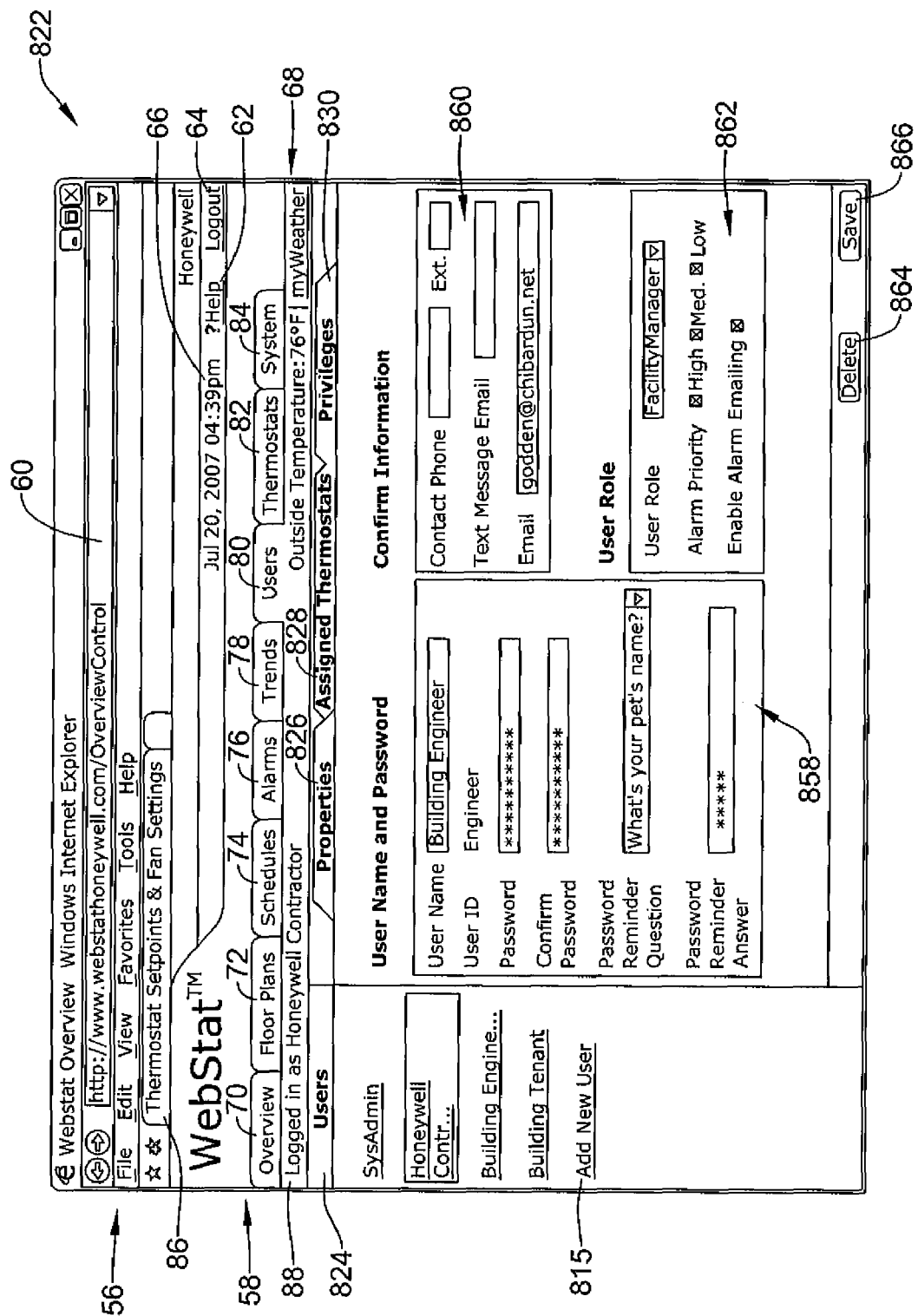

Web page 846 includes, under Users column 824, a link 854 labeled Building Engineer. Clicking on link 854 may cause web server 38 (FIG. 2) to serve up web page 856, which is shown in FIG. 8E. Web page 856 includes a pane 858 that permits Building Engineer (or another authorized user) to enter or edit login information, a pane 860 that pertains to contact information and a pane 862 that pertains to user role and alarm information. A Delete button 864 permits the user to delete any information that has been entered on web page 856 while a Save button 866 permits the user to save the information.

Figure 8F:
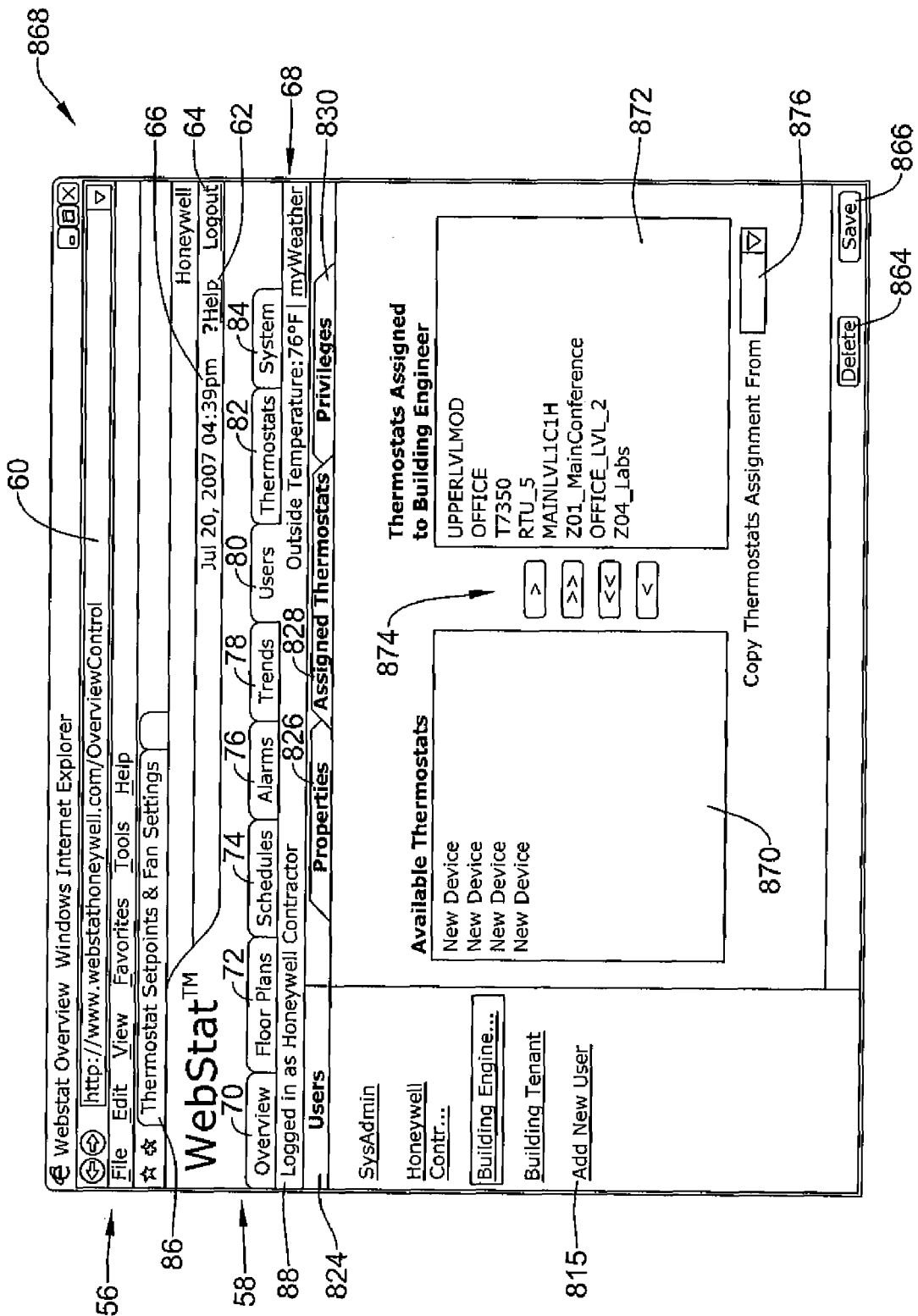

Clicking on Assigned Thermostats tab 828 may cause web server 38 (FIG. 2) to serve up web page 868, which is shown in FIG. 8F. Web page 868 permits a user with sufficient rights to view and/or change the thermostats assigned to a particular user. As illustrated, web page 868 provides information pertaining to the user named Building Engineer. A pane 870 provides a graphical and/or alphanumeric listing of available thermostats not already assigned to the user while a pane 872 provides a graphical and/or alphanumeric listing of thermostats assigned to the user. Transfer buttons 874 may be used to move thermostats between pane 870 (not assigned) and pane 872 (assigned). In some cases, a pull-down menu 876 may be used to copy the thermostat assignments of another user, if desired. Because Building Engineer is classified as a Facilities Manager and not a Contractor, some thermostats may or may not be assigned to Building Engineer.

Figure 8G:
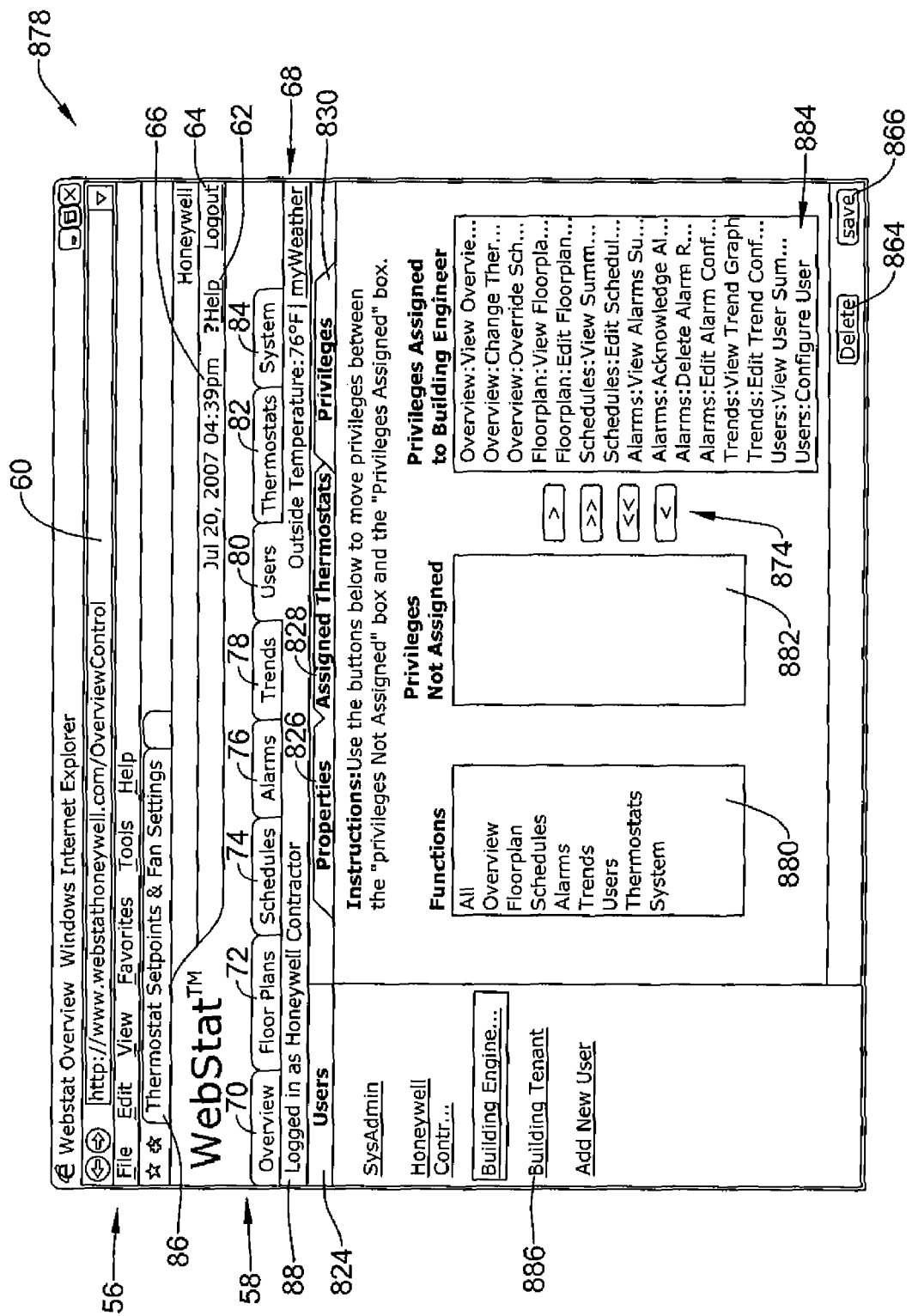

Clicking on Privileges tab 830 may cause web server 38 (FIG. 2) to serve up web page 878, which is shown in FIG. 8G.

Web page 878 permits a user with sufficient rights to view and/or change the privileges assigned to a particular user. As illustrated, web page 878 provides information pertaining to the user named Building Engineer. Web page 878 may include a pane 880 that lists functions, a pane 882 that lists privileges that have not been assigned and a pane 884 that lists privileges that have been assigned. Transfer buttons 874 may be used to move privileges between pane 882 (not assigned) and pane 884 (assigned).

As web page 878 provides information for a Facilities Manager (named Building Engineer), it can be seen that the functions listed in pane 880 are not grayed out, and thus may be selected or not selected. Moreover, by comparing pane 884 to pane 852 (FIG. 5D), it can be seen that Building Engineer has fewer privileges to choose from than Honeywell® Contractor. Web page 878 may include, under Users column 824, a link 886 labeled Building Tenant.

Figure 8H:
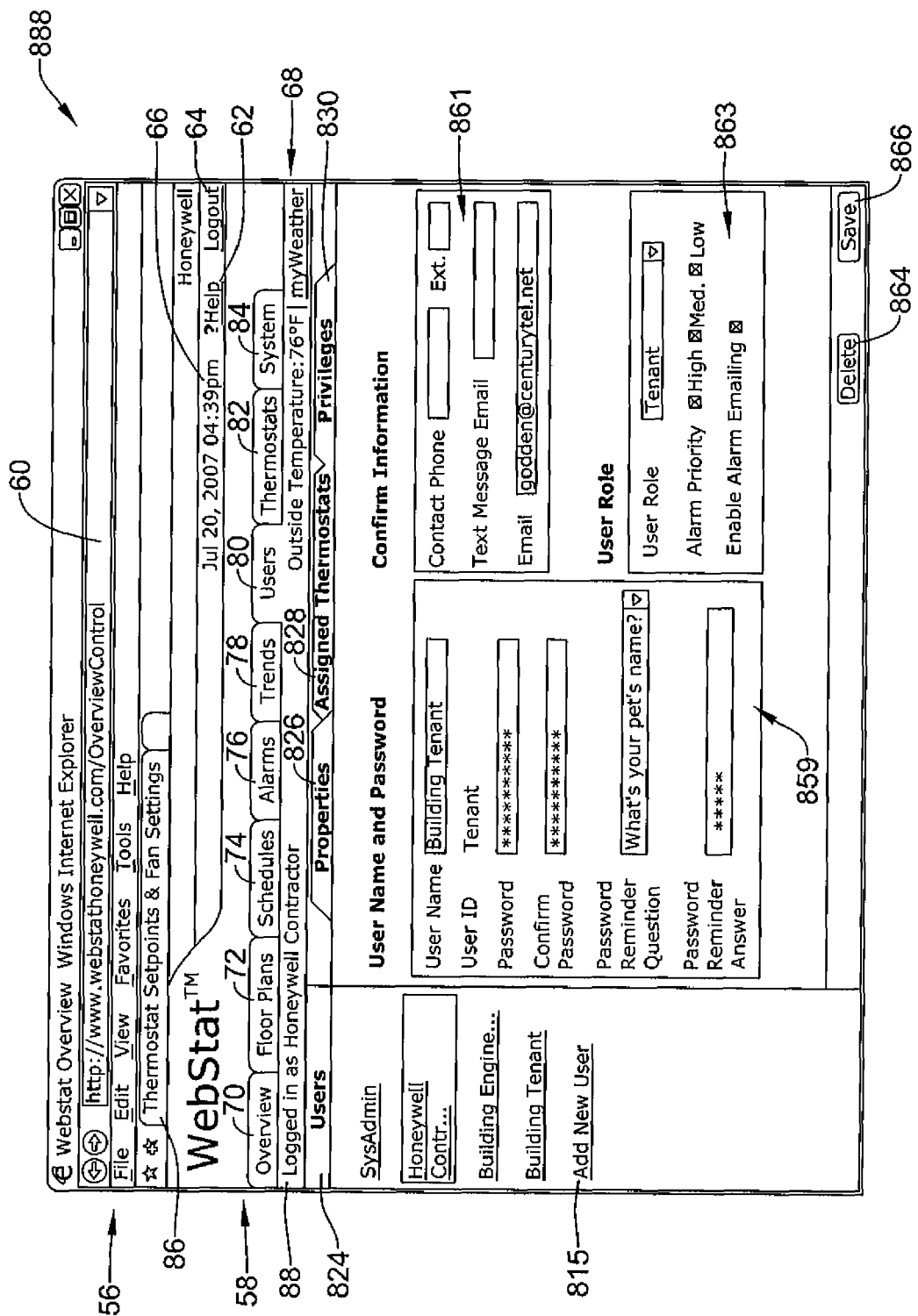

Clicking on link 886 may cause web server 38 (FIG. 2) to serve up web page 888, which is shown in FIG. 8H. Web page 88 includes a pane 859 that permits Building Tenant (or another authorized user) to enter or edit login information, a pane 861 that pertains to contact information and a pane 863 that pertains to user role and alarm information. A Delete button 864 permits the user to delete any information that has been entered on web page 856 while a Save button 866 permits the user to save the information.

Figure 8I:
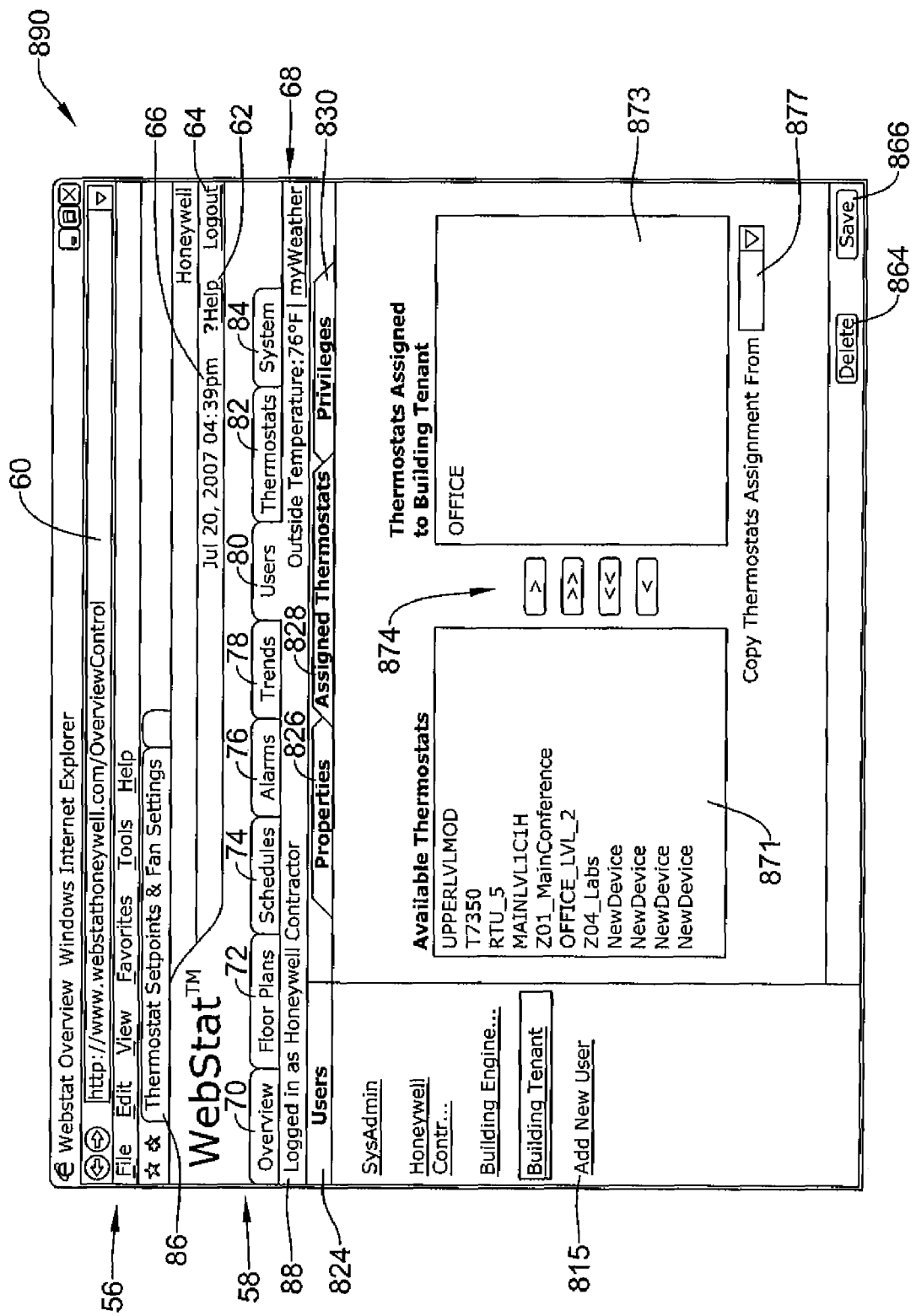

Clicking on Assigned Thermostats tab 828 may cause web server 38 (FIG. 2) to serve up web page 890, which is shown in FIG. 8I. Web page 890 permits a user with sufficient rights to view and/or change the thermostats assigned to a particular user. As illustrated, web page 890 provides information pertaining to the user named Building Tenant. A pane 871 provides a graphical and/or alphanumeric listing of available thermostats not already assigned to the user while a pane 873 provides a graphical and/or alphanumeric listing of thermostats assigned to the user. Transfer buttons 874 may be used to move thermostats between pane 871 (not assigned) and pane 873 (assigned). In some cases, a pull-down menu 876 may be used to copy the thermostat assignments of another user, if desired.

Figure 8J:
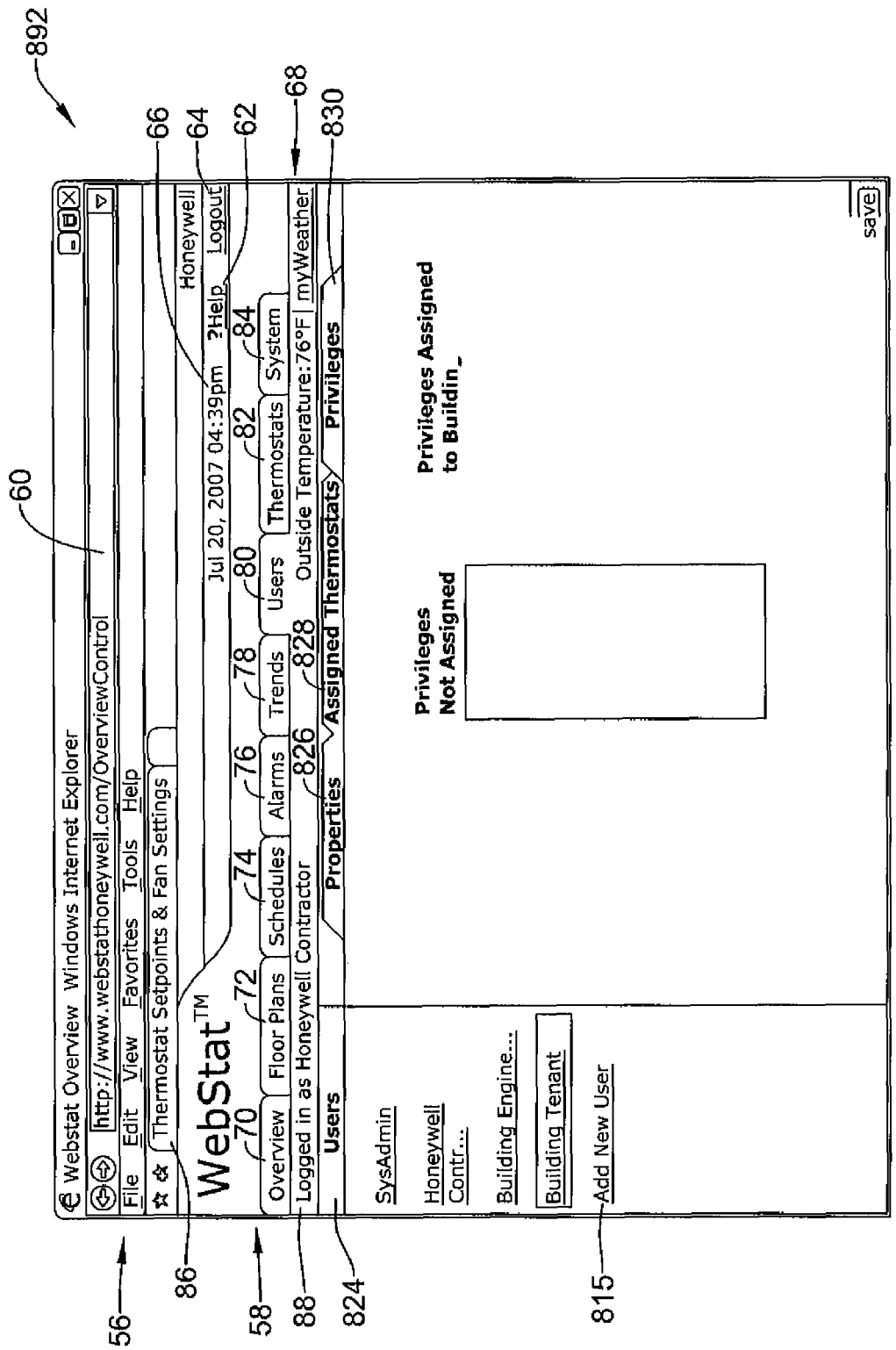

Clicking on Privileges tab 830 may cause web server 38 (FIG. 2) to serve up web page 892, which is shown in FIG. 8J. Web page 891 permits a user with sufficient rights to view and/or change the privileges assigned to a particular user. As illustrated, web page 892 provides information pertaining to the user named Building Tenant. Web page 891 may include a pane 881 that lists functions, a pane 883 that lists privileges that have not been assigned and a pane 885 that lists privileges that have been assigned. Transfer buttons 874 may be used to move privileges between pane 883 (not assigned) and pane 885 (assigned).

As web page 892 provides information for a Tenant (named Building Tenant), it can be seen that the functions listed in pane 881 are not grayed out, and thus may be selected or not selected. Moreover, by comparing pane 885 to pane 884 (FIG. 8G), it can be seen that Building Tenant has fewer privileges to choose from than Building Engineer Contractor.

In some instances, a user may wish to add a new user. This may be done by clicking on Add New User link 815. In response, web server 38 (FIG. 2) may serve up a web page similar to web page 888 (FIG. 8H), where a user may enter information including login information, contact information, user role information and alarm information. Clicking on an Assigned Thermostats tab may cause web server 38 to serve up a web page similar to web page 890 (FIG. 8I), where a user may enter information pertaining to thermostat assignments. Clicking on a Privileges tab may cause web server 38 to serve up a web page similar to web page 892 (FIG. 8J), where a user may enter information pertaining to assigned privileges.

Figure 9A:
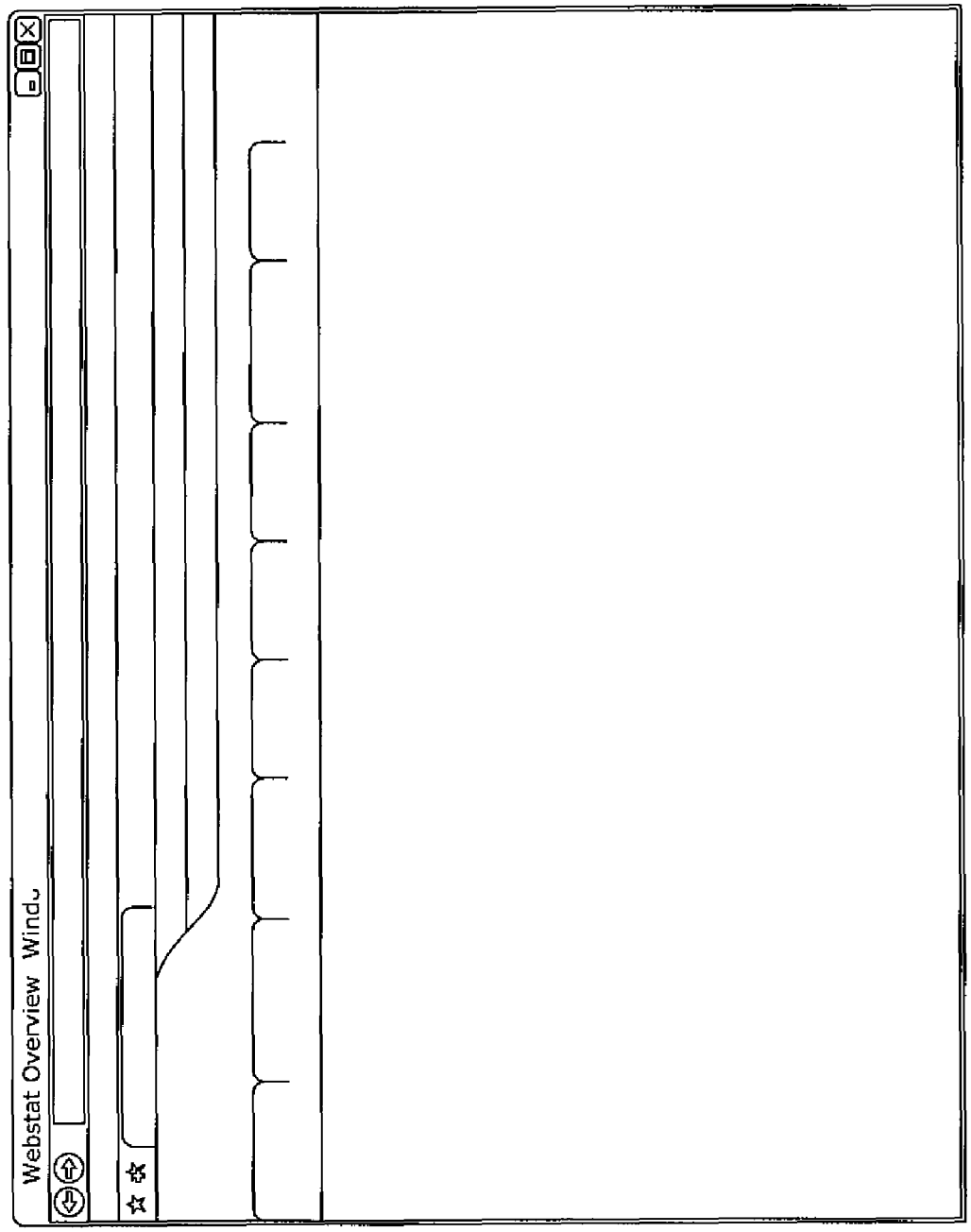
FIGS. 9A-9U are illustrative but non-limiting examples of web pages that may be generated by the HVAC control system of FIG. 1, pertaining to a thermostat configuration functionality thereof.
Figure 9B:
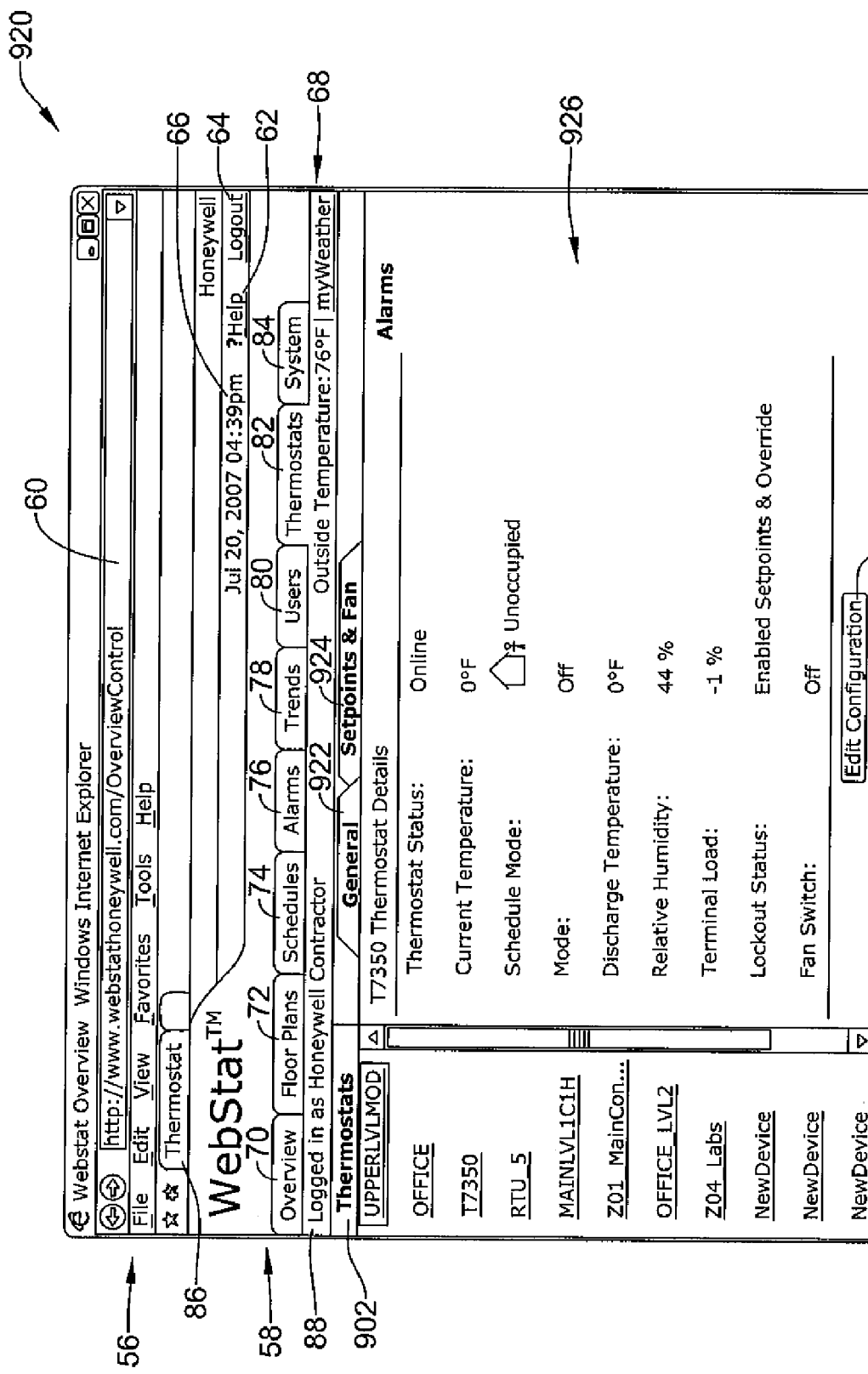
Figure 9C:
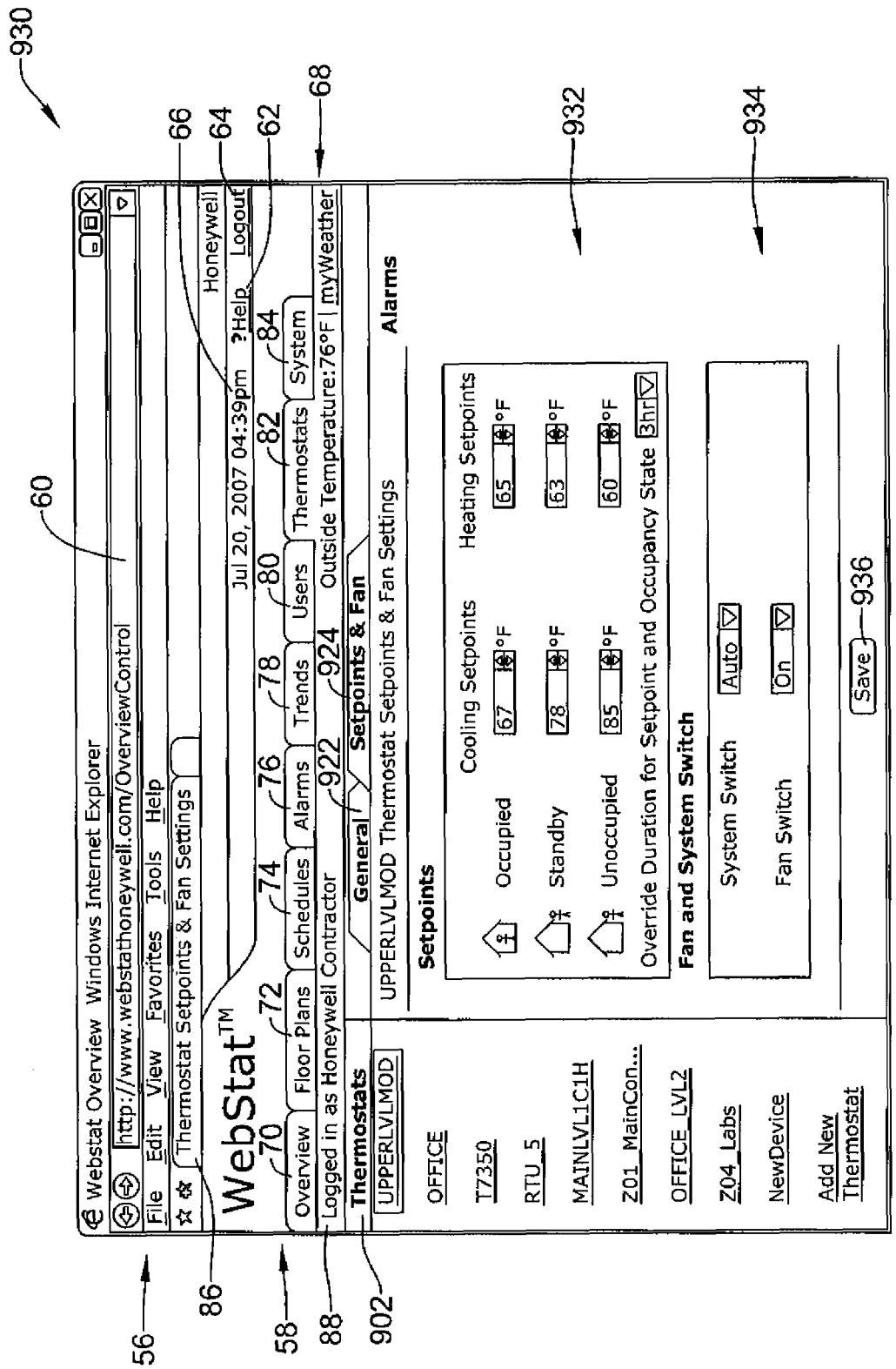
Figure 9D:
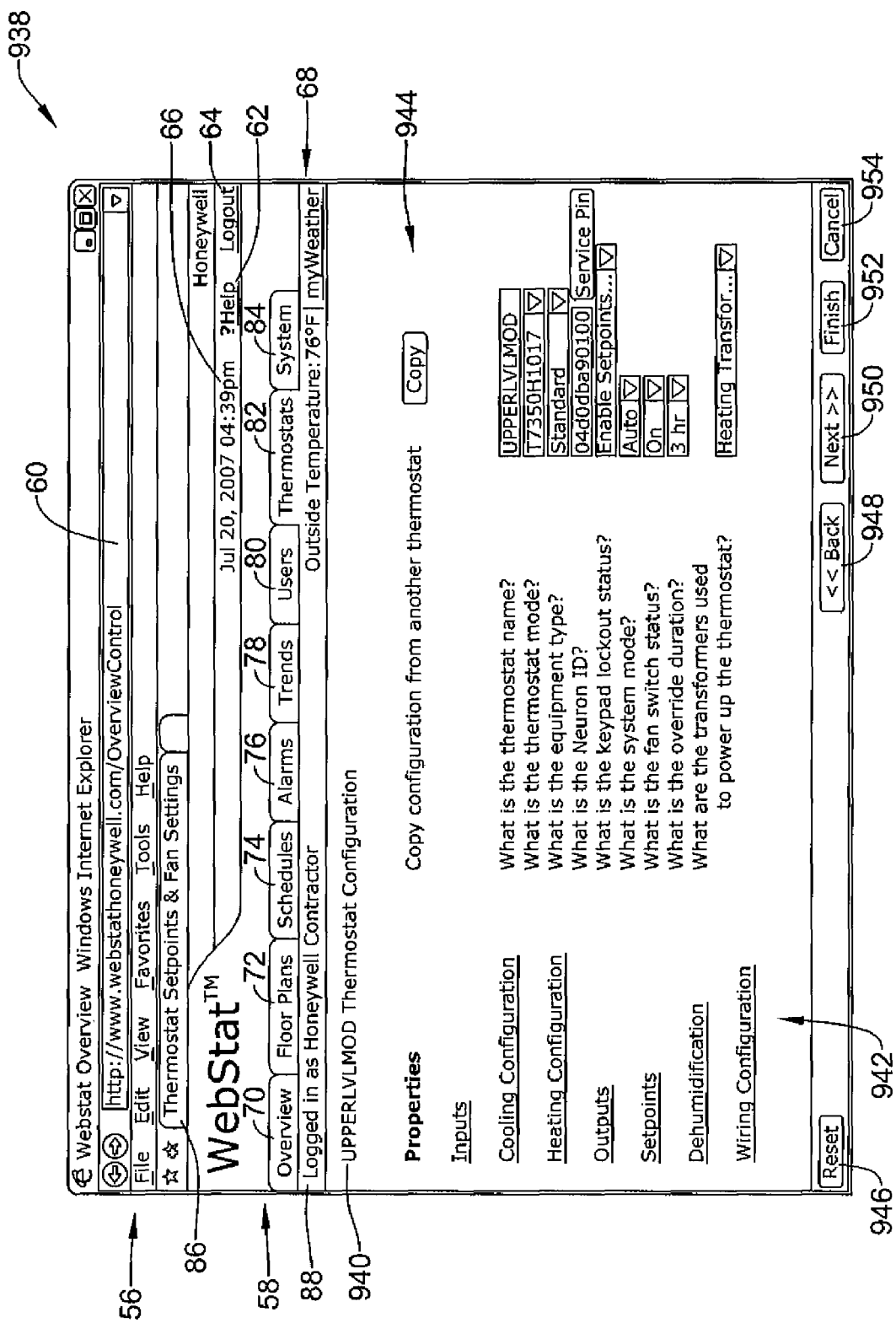
Figure 9E:
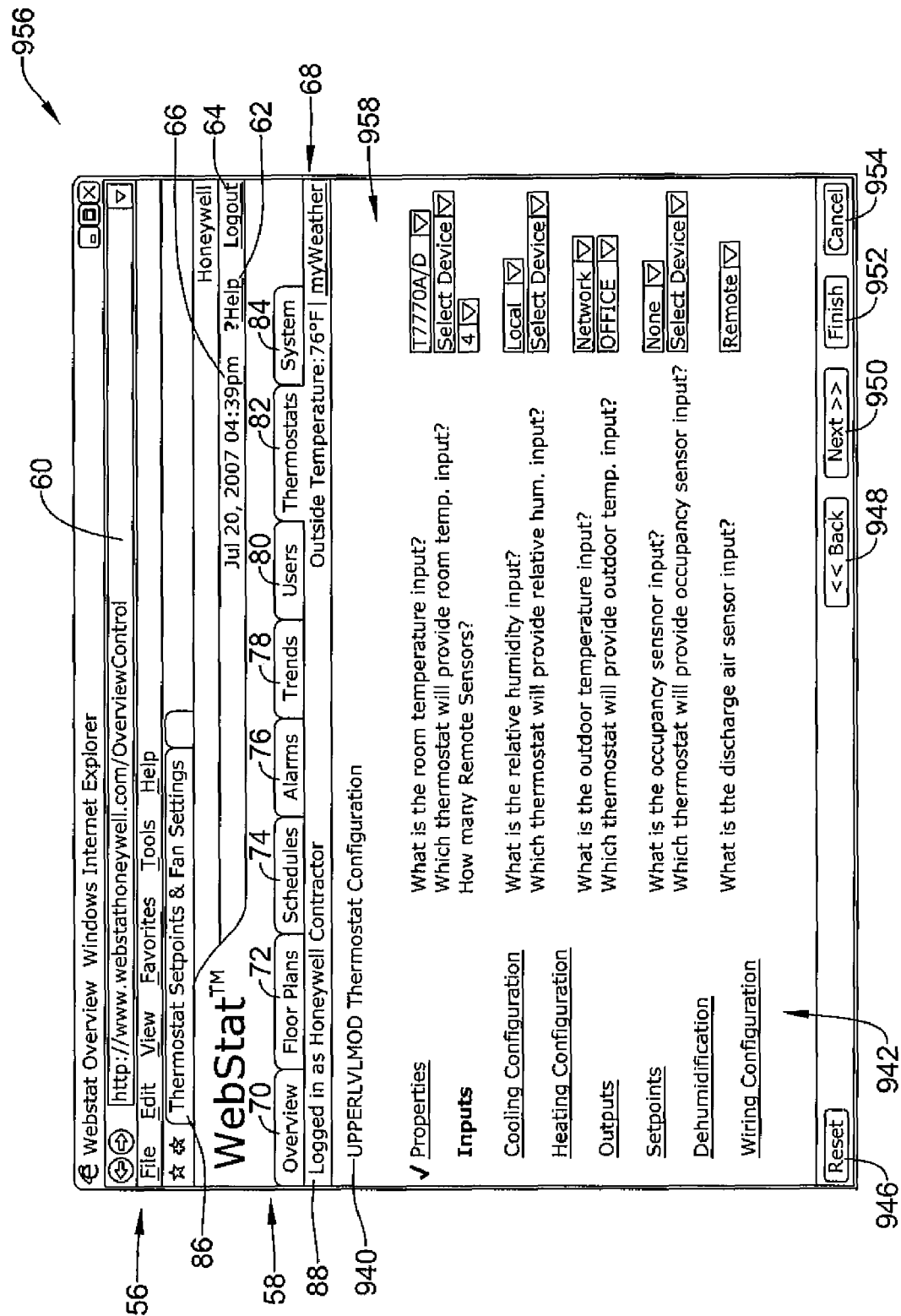
Figure 9F:
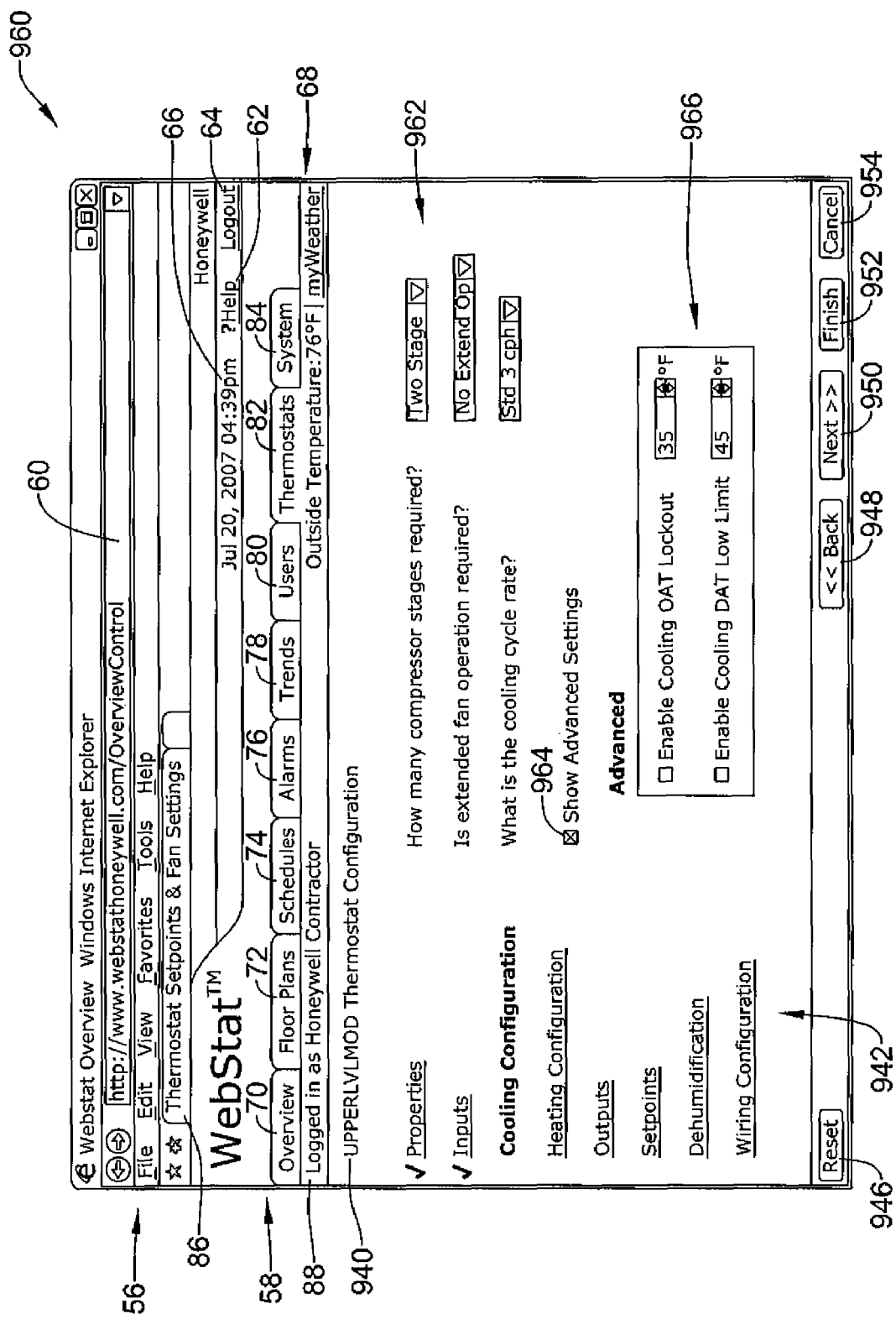
Figure 9G:
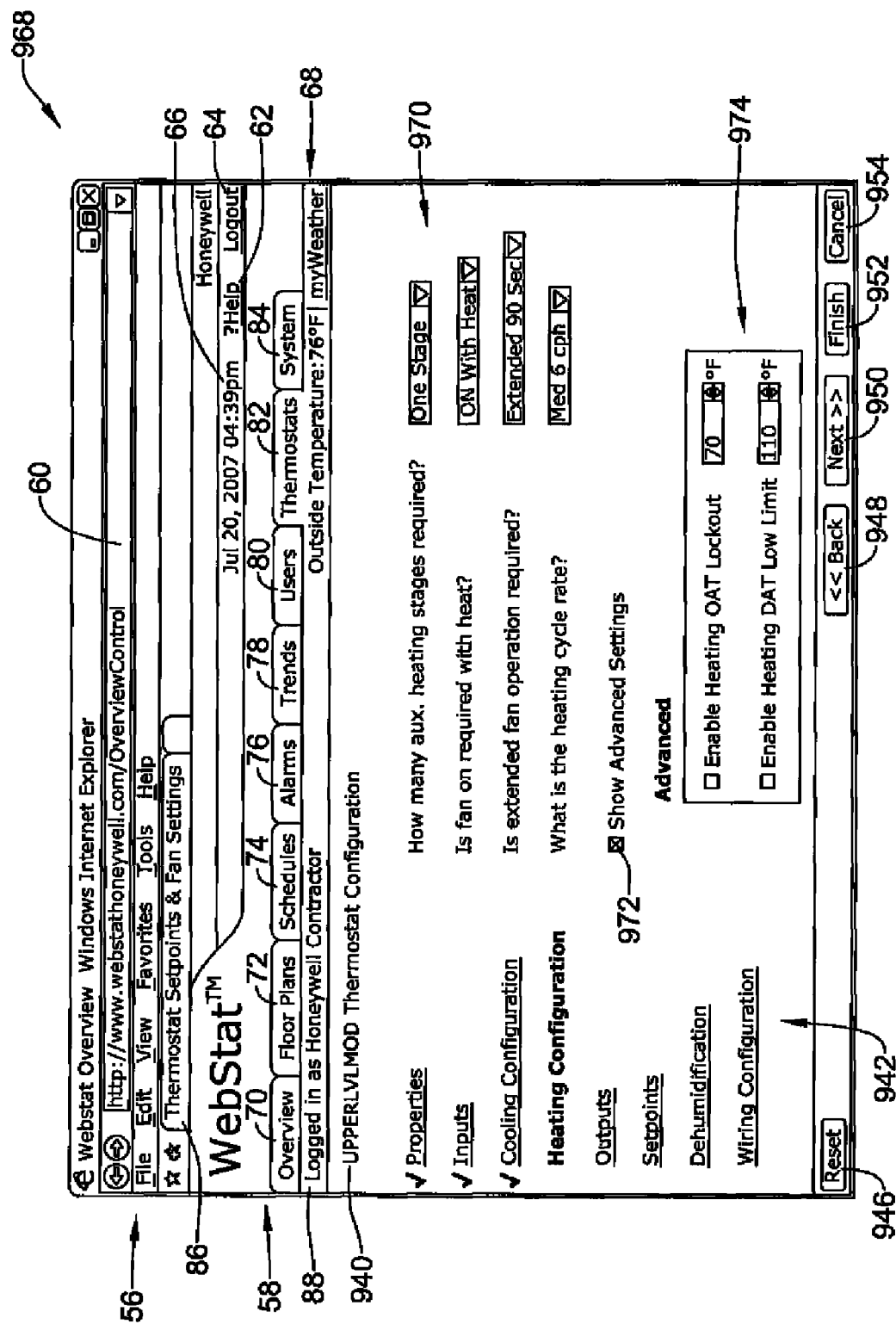
Figure 9H:
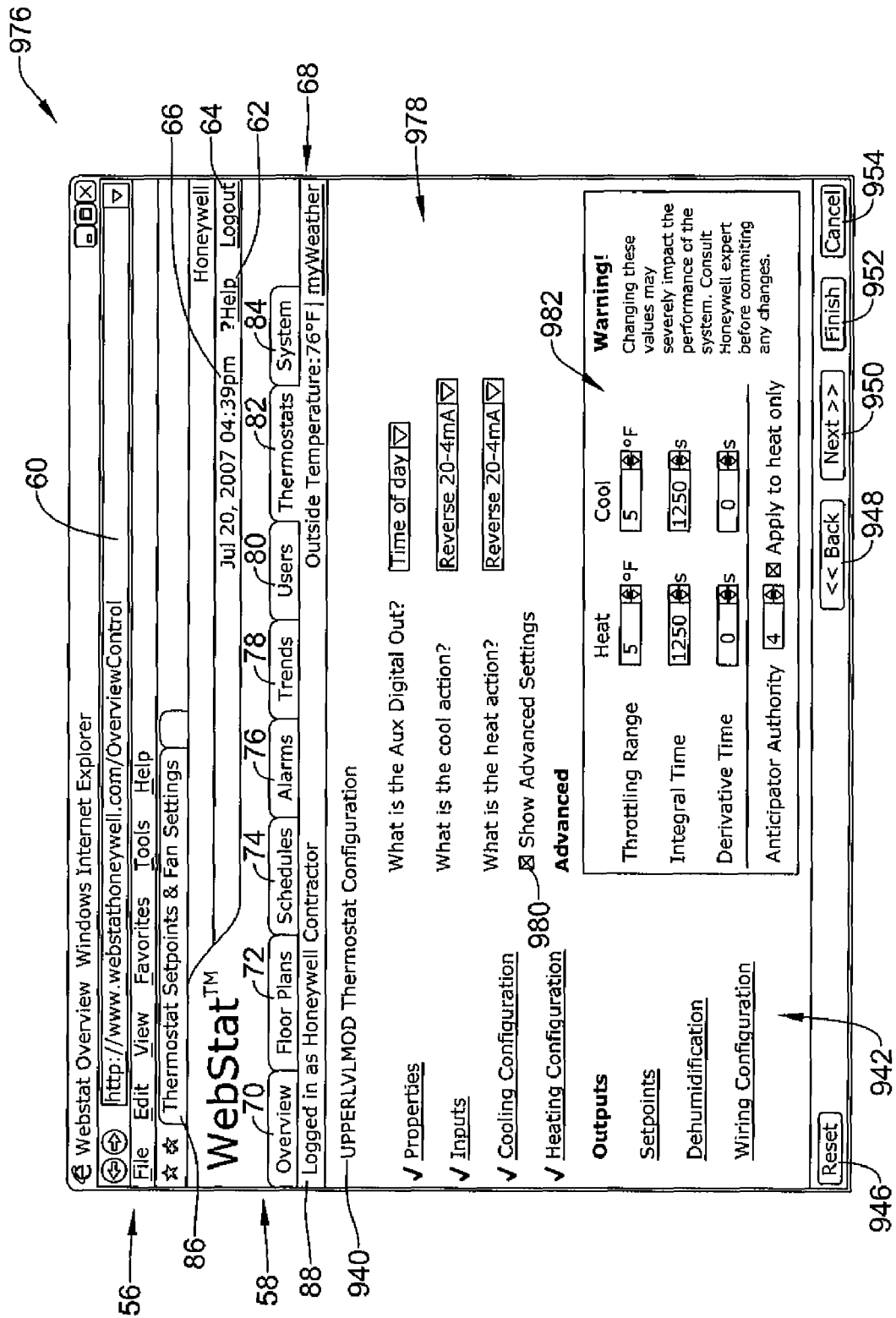
Figure 9I:
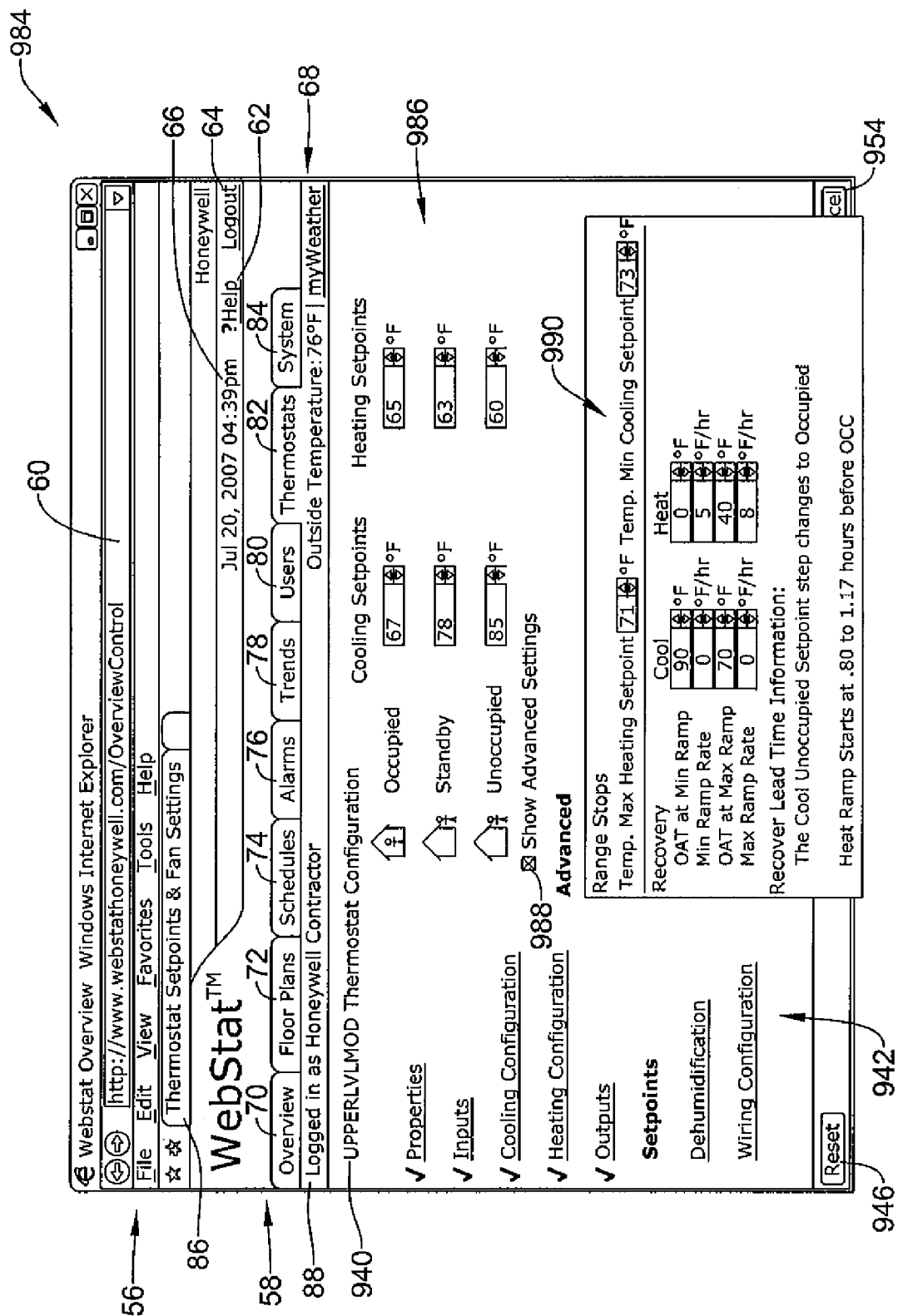
Figure 9J:
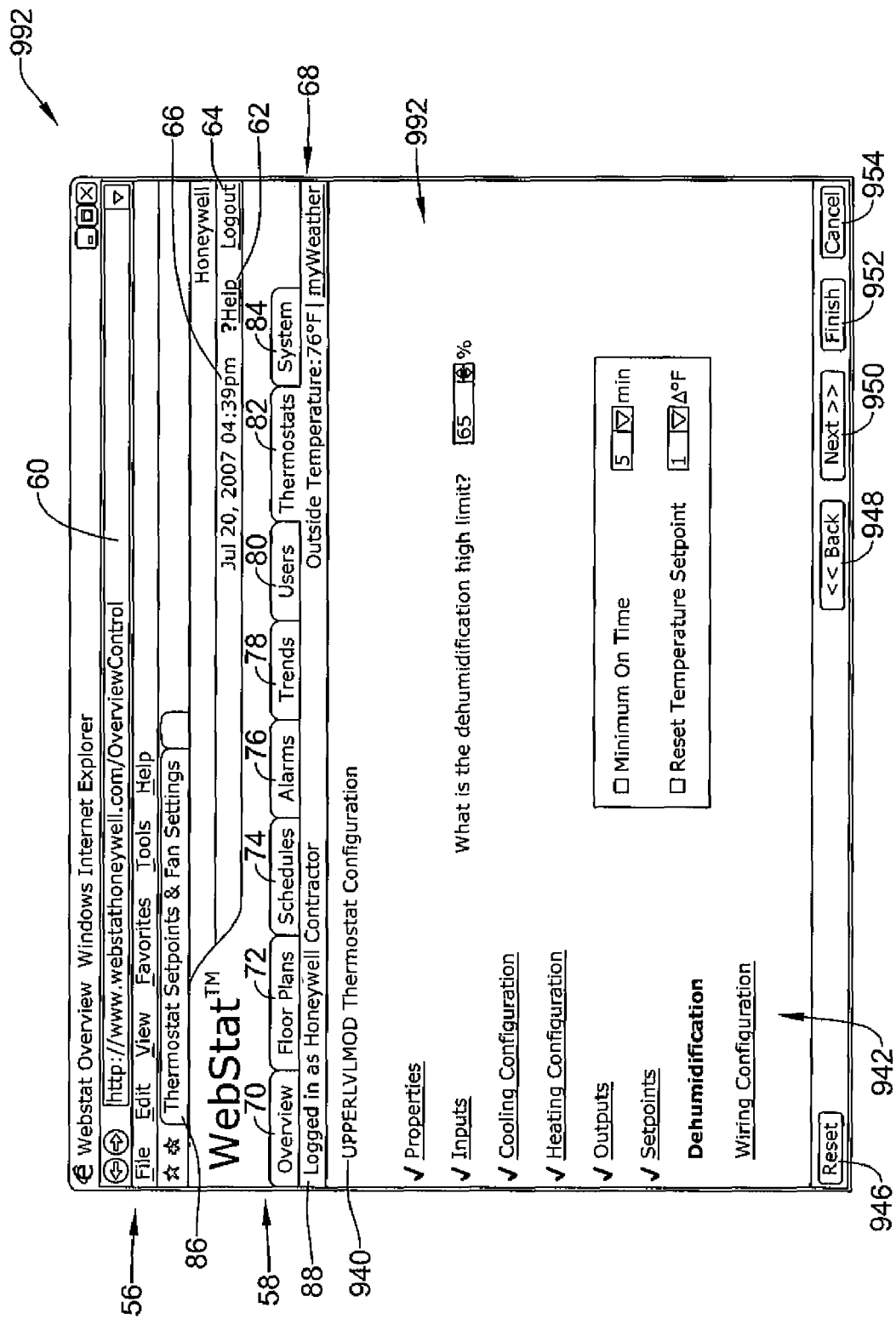
Figure 9K:
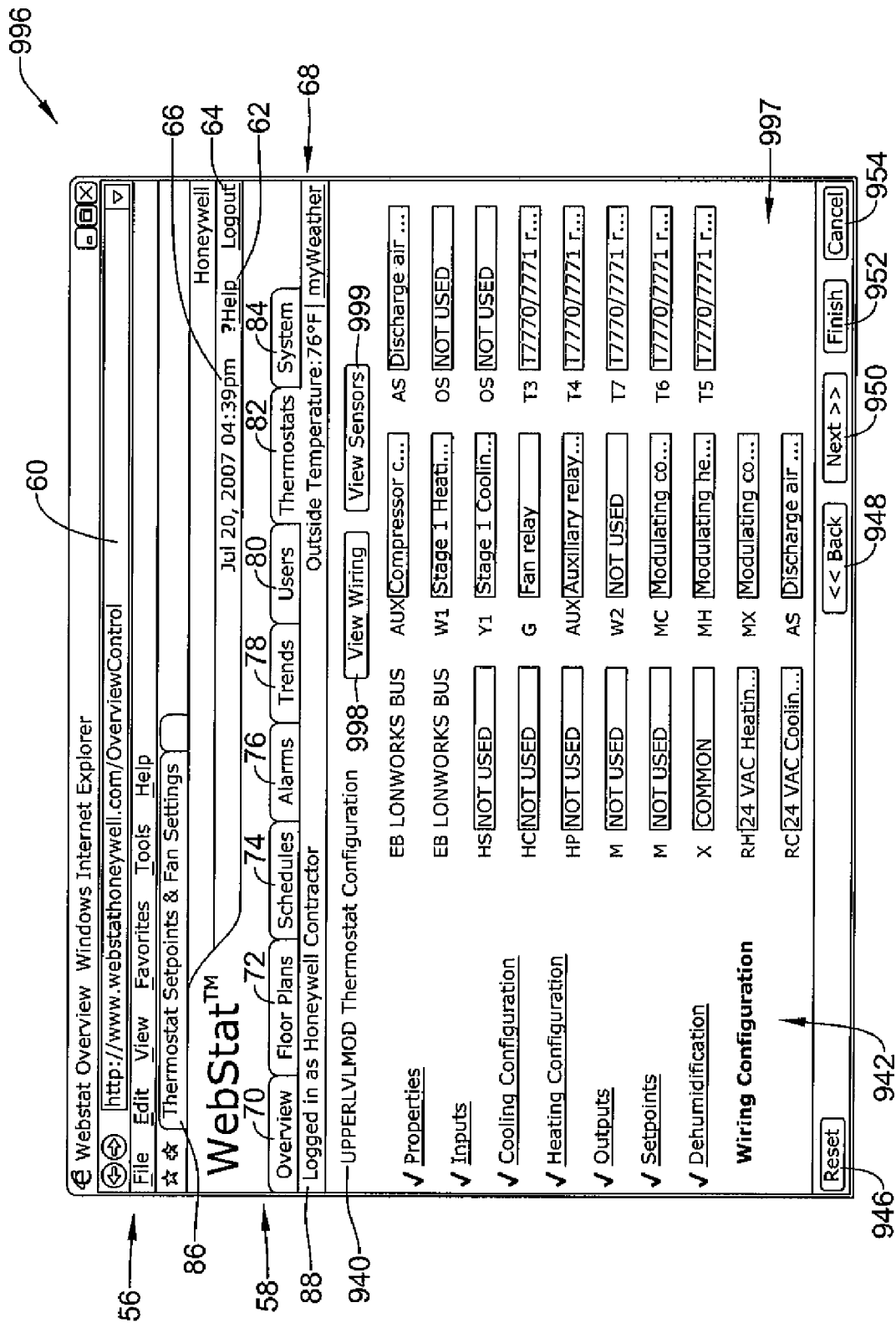
Figure 9L:
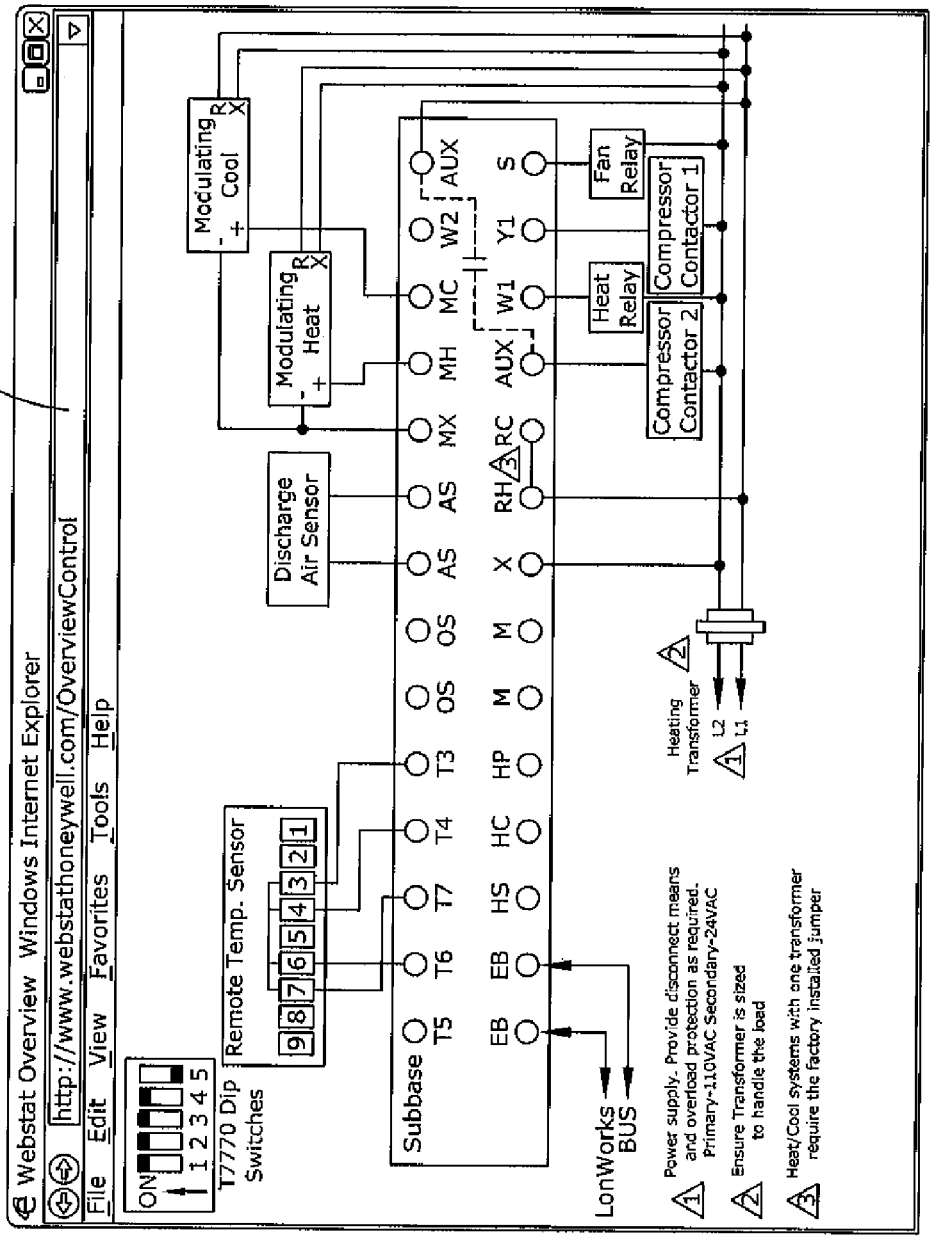
Figure 9M:
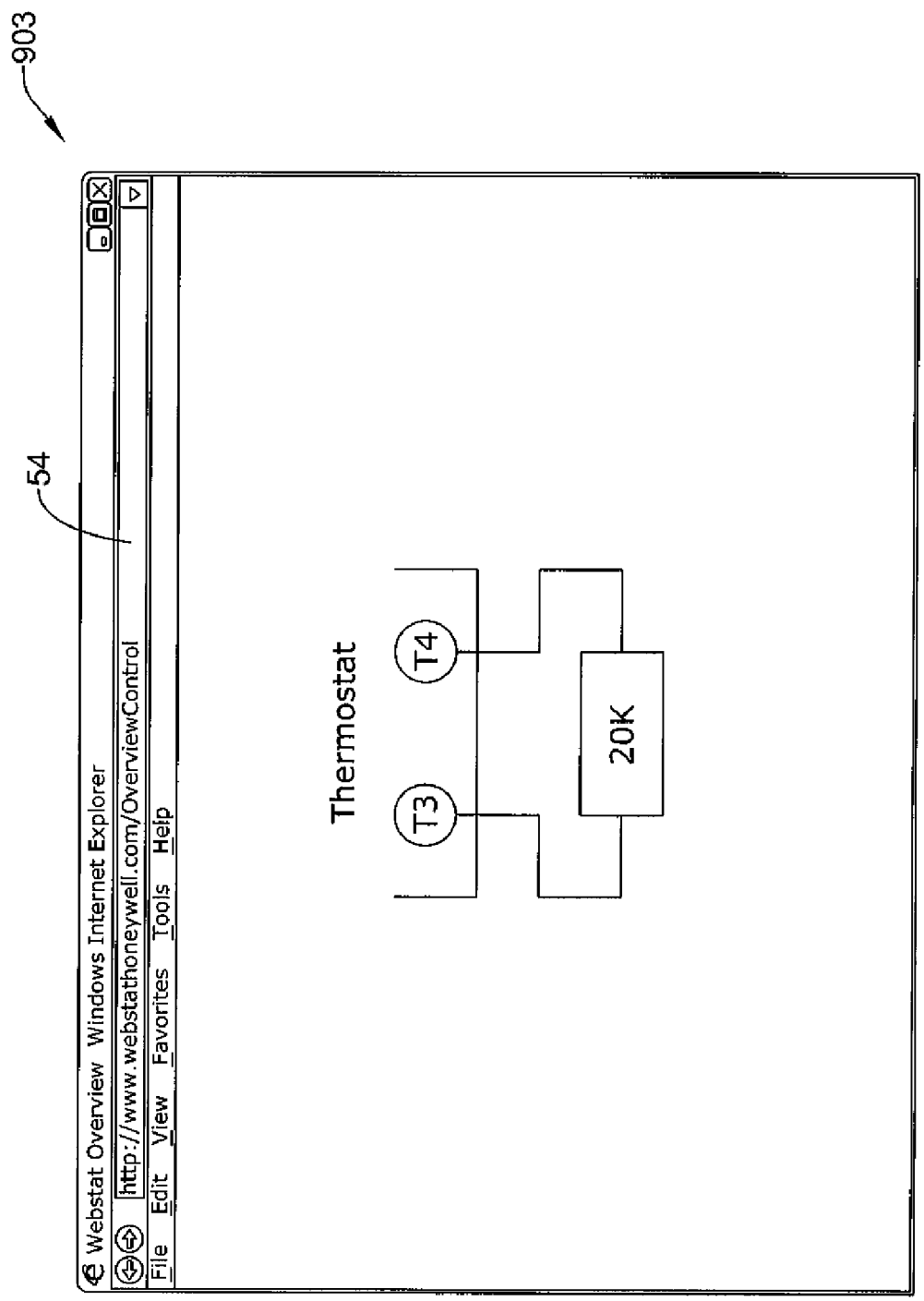
Figure 9N:
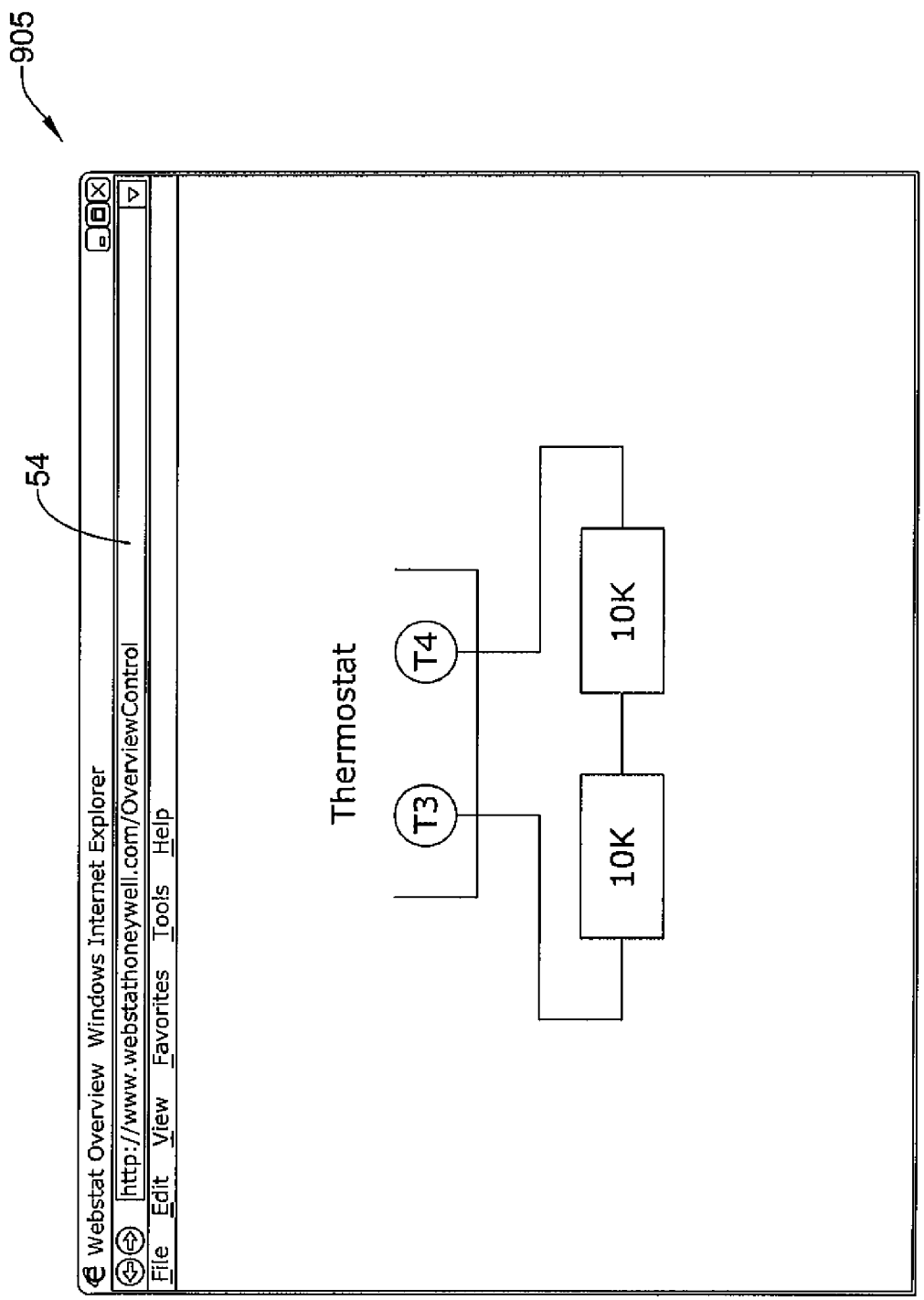
Figure 90:
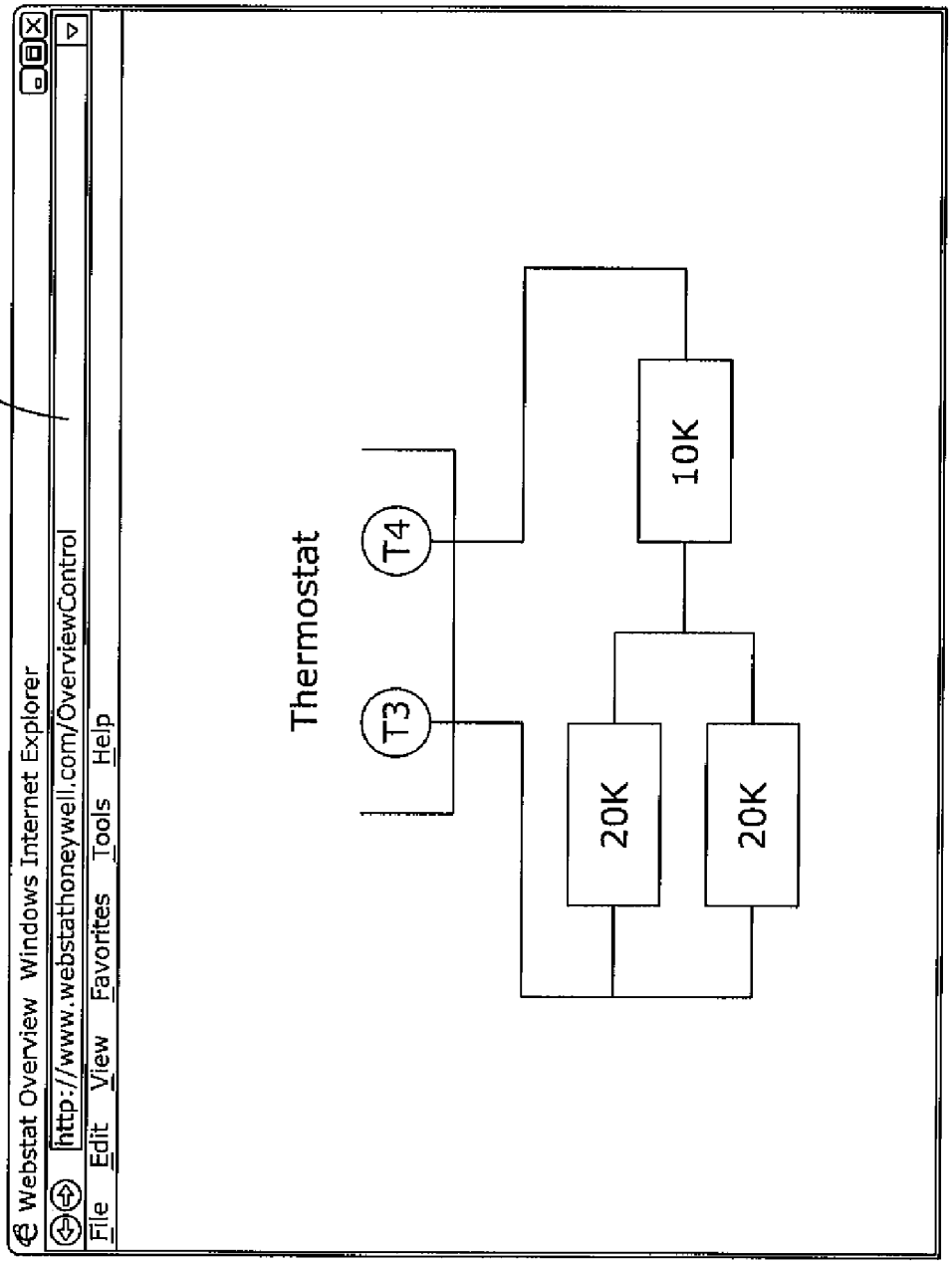
Figure 9P:
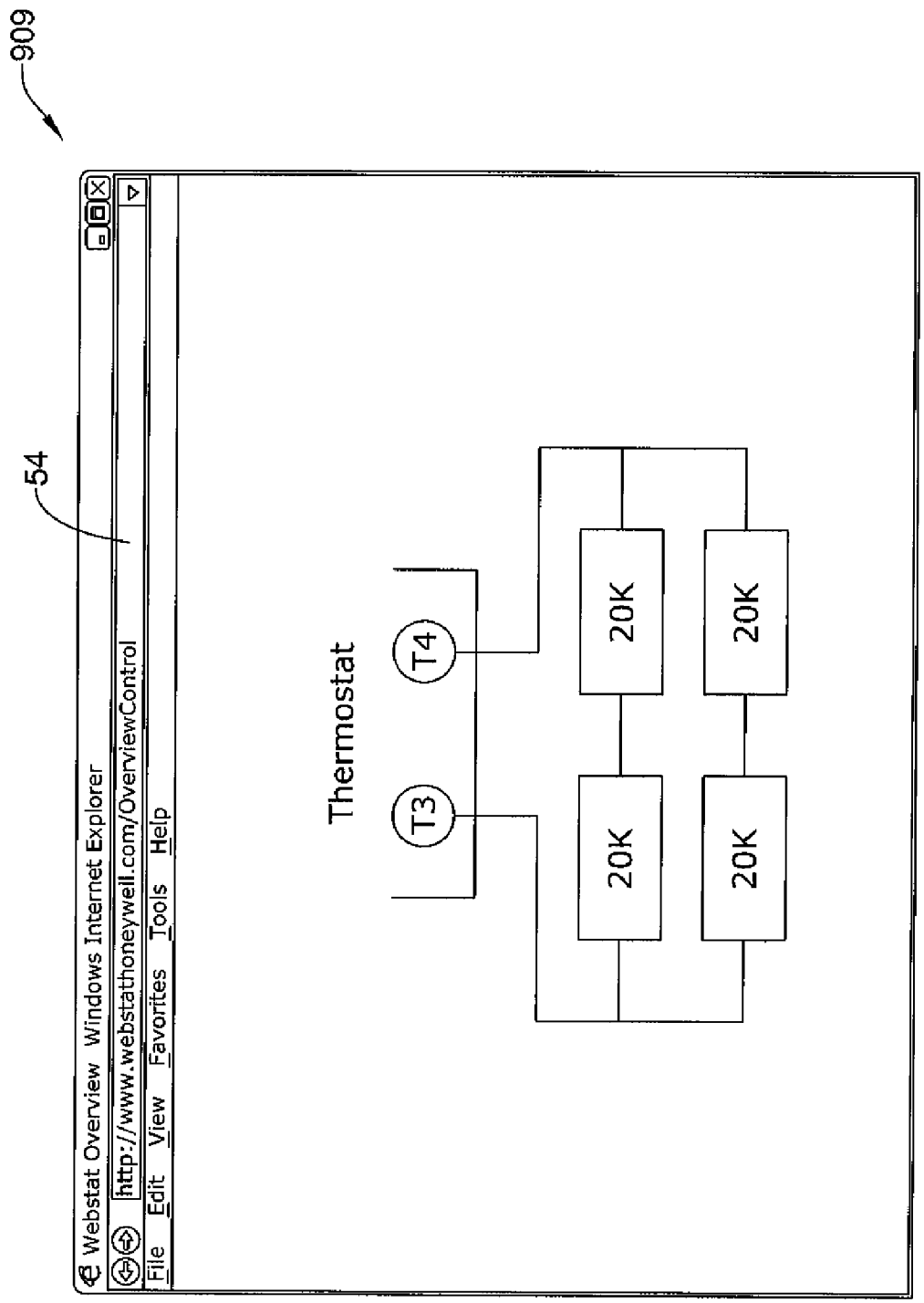
Figure 9Q:
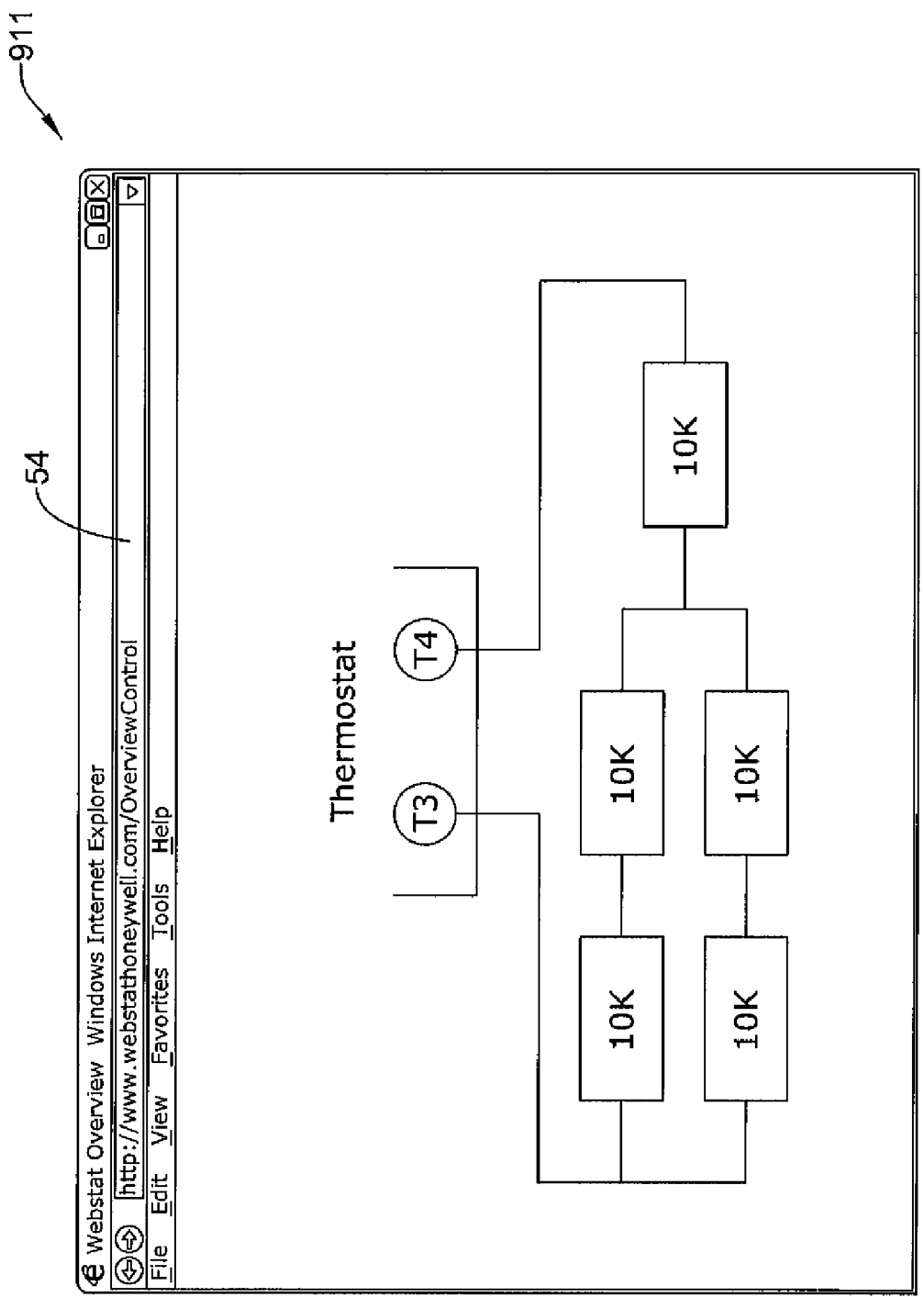
Figure 9R:
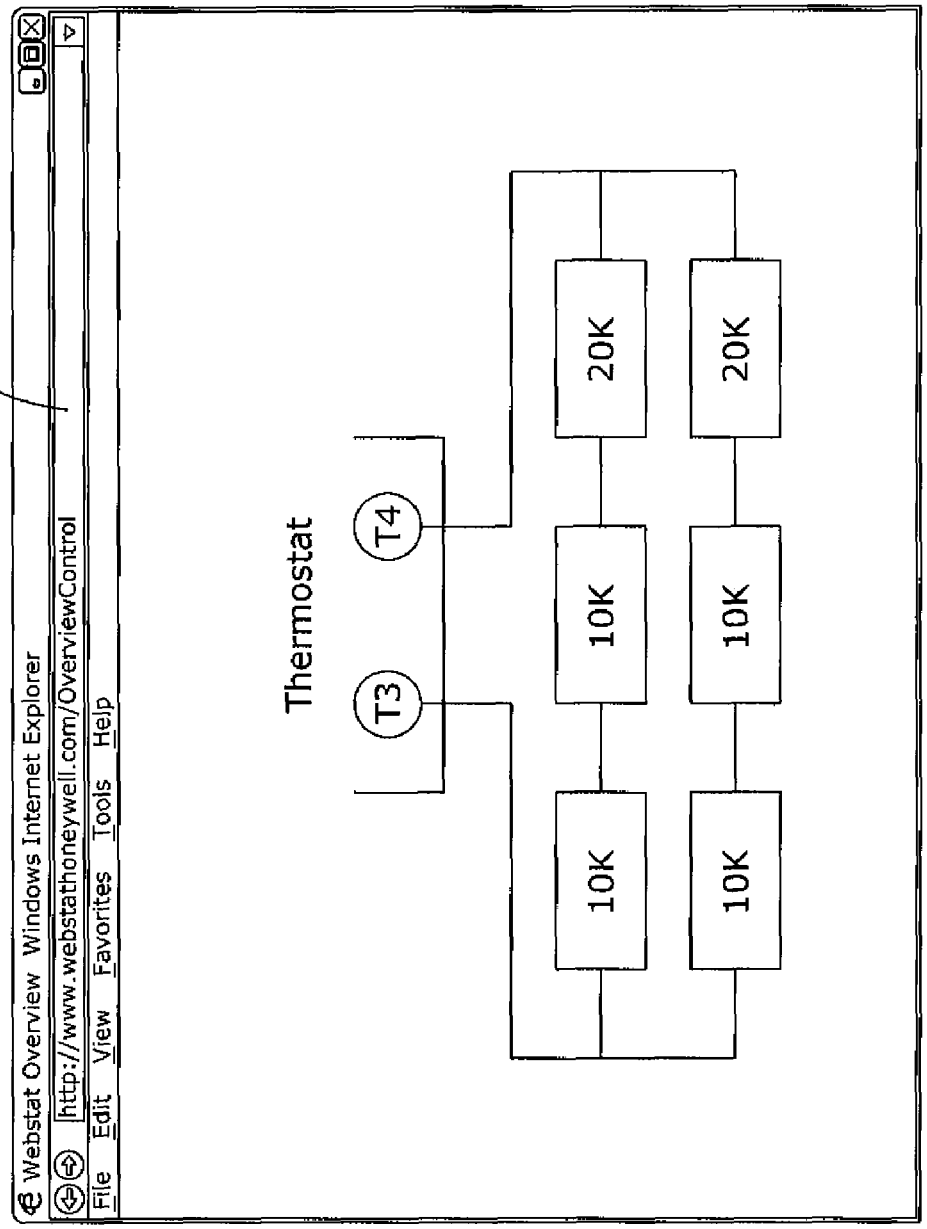
Figure 9S:
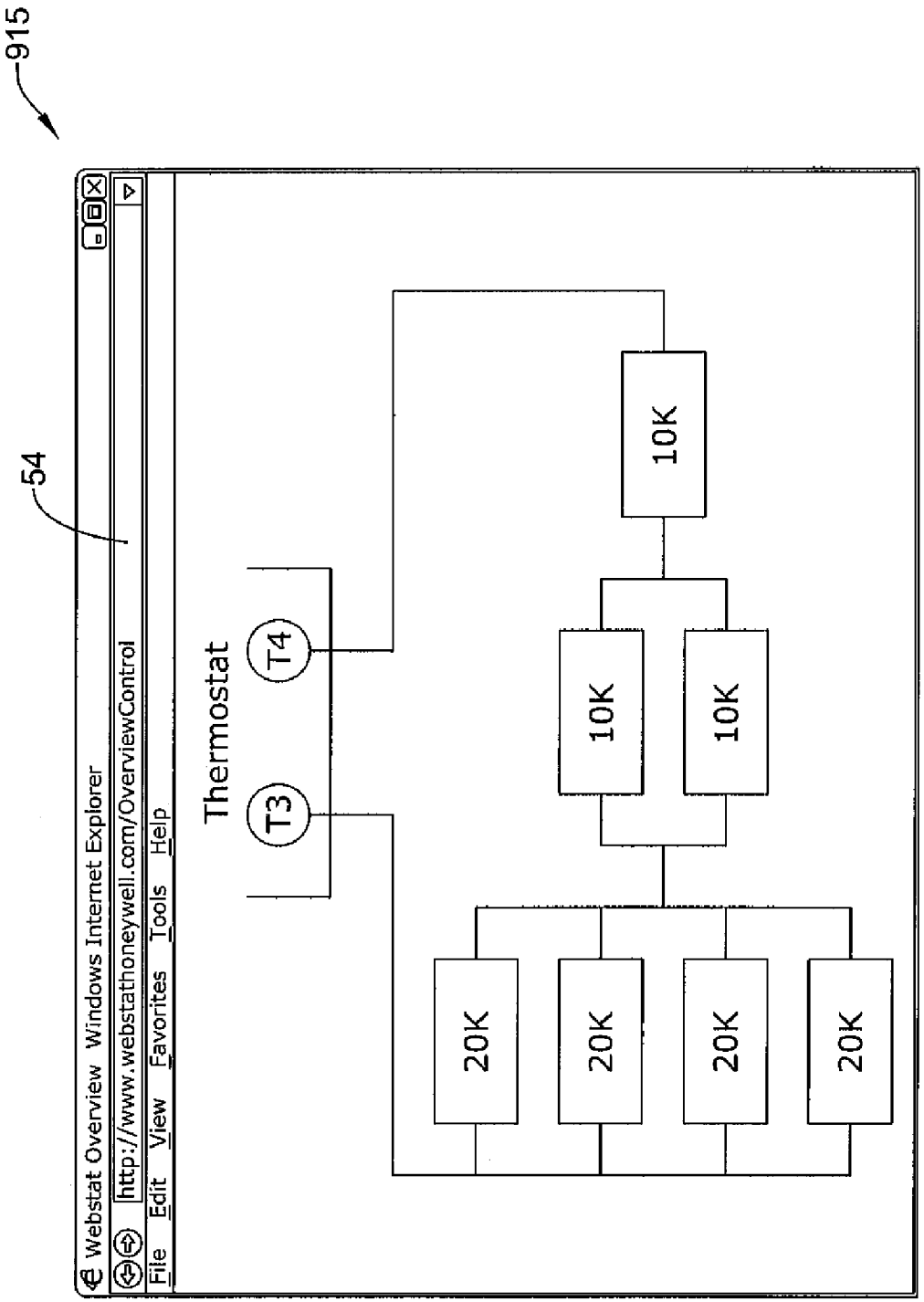
Figure 9T:
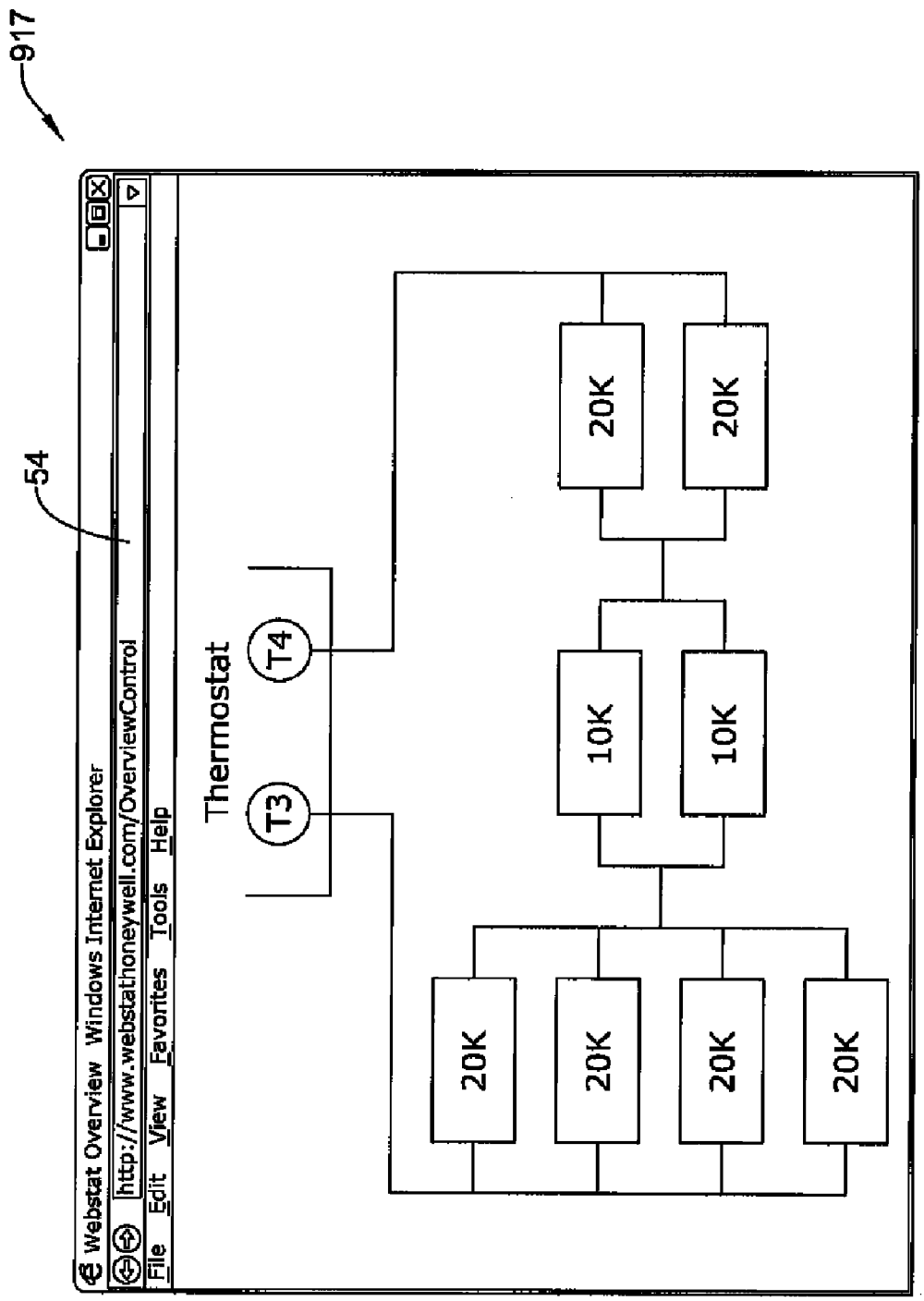
Figure 9U:
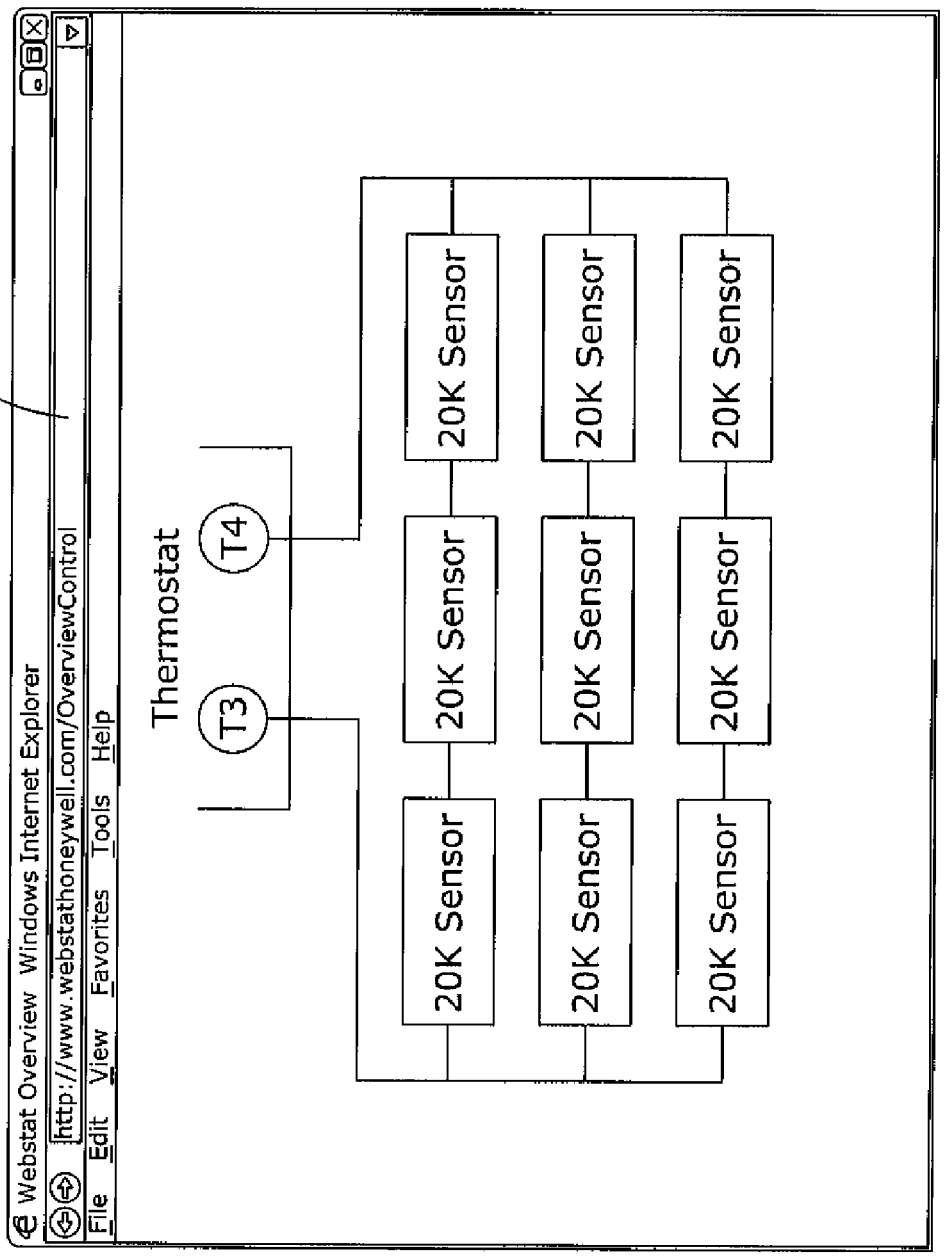

FIGS. 9A-9U provide illustrative but non-limiting examples of web page that may be served up by web server 38 (FIG. 2). In particular, FIGS. 9A-9U provide web pages pertaining to the Thermostats tab 82 and the corresponding functionality of building control appliance 12 (FIG. 1). The web pages shown in FIGS. 9A-9U may, for example, be accessed and displayed on a computer running a thin client application such as Microsoft® Internet Explorer®.

FIG. 9A shows a web page 900 that may be reached, from any or nearly any web page that may be served up by web server 38 (FIG. 2), by clicking on the Thermostats tab 82 disposed within navigation bar 58. Web page 900 may include a Thermostats column 902, a Model Type column 904, an Application Type column 906, a Neuron ID column 908, a Last Updated column 910, a Status column 912, an Edit column 916 and a Delete column 916. These are only illustrative. Thermostats column 902 provides a graphical and/or alphanumeric listing of all thermostats that are available to a particular user while the remaining columns provide information pertaining to each of the thermostats listed in Thermostats column 902. It can be seen that web page 900 includes a configuration toolbar 920 that permits a user to, if desired, copy a thermostat configuration, download or upload, discover connected thermostats and/or add a thermostat.

Thermostats column 902 includes a thermostat icon 918 (labeled as UPPERLVLMOD). Clicking on thermostat icon 918 may cause web server 38 (FIG. 2) to serve up a web page 920, which is shown in FIG. 9B. Web page 920 includes a General tab 922 and a Setpoints & Fan tab 924, and is the result of a user clicking on General tab 922. In some cases, web page 920 may include a pane 926 that provides additional information pertaining to the status and configuration of thermostat 918. An Edit Configuration button 928 may be used to edit the configuration of thermostat 918, as will be discussed subsequently.

Clicking on Setpoints & Fan tab 924 may cause web server 38 (FIG. 2) to serve up web page 930, which is shown in FIG. 9C. In some cases, web page 930 may include a pane 932 that permits a user to view and/or edit heating and cooling temperature set points for one or more of an occupied time period, an unoccupied time period and/or a standby time period. Pane 932 may also permit a user to view and/or alter an override duration parameter. Web page 930 may include a pane 934 that permits a user to view and/or alter settings for the system switch and/or the fan switch. A Save button 936 permits a user to save any changes that they have made.

Returning briefly to FIG. 9B, clicking on Edit Configuration button 928 may cause web server 38 (FIG. 2) to serve up a web page 938, which is shown in FIG. 9D. Web page 938 includes a graphical and/or alphanumeric representation 940 showing which thermostat configuration is being edited. Web page 938 may include a pane 942 that provides a list of specific thermostat configuration aspects that may be edited. A pane 944 provides a variety of parameter values and/or settings pertaining to the specific thermostat configuration aspect currently being edited. In particular, web page 938 provides a user with the opportunity to view and/or edit parameter values pertaining to Properties (as indicated by Properties being bolded within pane 942).

Web page 938 may include a Reset button 946, a Back button 948, a Next button 950, a Finish button 952 and a Cancel button 954. Because web page 938 represents the first configuration page, Back button 948 is grayed out. A user may reset the parameter values using Reset button 948 or they may simply cancel out of configuration via Cancel button 954. If a user wishes to progress sequentially through one or more of the configuration pages, they may navigate using Back button 948 and/or Next button 950. If they only wish to make changes to parameters within particular configuration pages, they may exit using Finish button 952 once they have completed all of their desired parameter value settings.

Clicking on Next button 950 may cause web server 38 (FIG. 2) to serve up web page 956, which is shown in FIG. 9E. Web page 956 includes a pane 958 that provides a variety of parameter values and/or settings pertaining to the specific thermostat configuration aspect currently being edited. In particular, web page 956 provides a user with the opportunity to view and/or edit parameter values pertaining to Inputs (as indicated by Inputs being bolded within pane 942). It can be seen that the Properties configuration has been completed, as evidenced by the check mark next to Properties within pane 942.

Clicking on Next button 950 may cause web server 38 (FIG. 2) to serve up web page 960, which is shown in FIG. 9F. Web page 956 includes a pane 962 that provides a variety of parameter values and/or settings pertaining to Cooling configuration, as indicated by Cooling Configuration being bolded and a check mark adjacent Inputs within pane 942. If a user chooses to, they may view and/or alter advanced settings by clicking on check box 964. If so, web page 960 may provide a pane 966 that permits a user to view and/or alter the advanced settings.

Clicking on Next button 950 may cause web server 38 (FIG. 2) to serve up web page 968, which is shown in FIG. 9G. Web page 968 includes a pane 970 that provides a variety of parameter values and/or settings pertaining to Heating configuration, as indicated by Heating Configuration being bolded and a check mark adjacent Cooling Configuration within pane 942. If a user chooses to, they may view and/or alter advanced settings by clicking on check box 972. If so, web page 968 may provide a pane 974 that permits a user to view and/or alter the advanced settings.

Clicking on Next button 950 may cause web server 38 (FIG. 2) to serve up web page 976, which is shown in FIG. 9H. Web page 976 includes a pane 978 that provides a variety of parameter values and/or settings pertaining to Outputs configuration, as indicated by Outputs being bolded and a check mark adjacent Heating Configuration within pane 942. If a user chooses to, they may view and/or alter advanced settings by clicking on check box 980. If so, web page 976 may provide a pane 982 that permits a user to view and/or alter the advanced settings. The illustrative advanced settings include a throttle range, integral time, derivative time and anticipatory authority for use by the control algorithm to control the associated HVAC equipment.

Clicking on Next button 950 may cause web server 38 (FIG. 2) to serve up web page 984, which is shown in FIG. 9I. Web page 984 includes a pane 986 that provides a variety of parameter values and/or settings pertaining to Setpoints configuration, as indicated by Setpoints being bolded and a check mark adjacent Outputs within pane 942. If a user chooses to, they may view and/or alter advanced settings by clicking on check box 988. If so, web page 986 may provide a pane 990 that permits a user to view and/or alter the advanced settings.

Clicking on Next button 950 may cause web server 38 (FIG. 2) to serve up web page 992, which is shown in FIG. 9J. Web page 992 includes a pane 994 that provides a variety of parameter values and/or settings pertaining to Dehumidification configuration, as indicated by Dehumidification being bolded and a check mark adjacent Setpoints Configuration within pane 942.

Clicking on Next button 950 may cause web server 38 (FIG. 2) to serve up web page 996, which is shown in FIG. 9K. Web page 996 includes a pane 997 that provides a variety of parameter values and/or settings pertaining to Wiring Configuration, as indicated by Wiring Configuration being bolded and a check mark adjacent Dehumidification Configuration within pane 942. Web page 996 includes a View Wiring button 998 and a View Sensors button 999. It can be seen that as this is the last configuration page, Next button 950 is grayed out.

Clicking on View Wiring button 998 may cause web server 38 (FIG. 2) to serve up web page 901, which is shown in FIG. 9L. The wiring diagram provided within web page 901 may assist an installer in property wiring a particular thermostat. Web page 901 may be a pop-up web page that floats atop web page 996 (FIG. 9K).

In use, a thermostat may employ one or more external sensors such as temperature sensors. In many cases, the external temperature sensors are provided having a particular resistance. An installer typically needs to know how to connect the external temperature sensors (which sensors should be used, and which sensors should be connected in series and/or which sensors should be connected in parallel) in order to provide the thermostat with an expected resistance. In some illustrative embodiments, web server 38 may serve up one or more web pages that prompt a user (installer or the like) to provide information pertaining to the external temperature sensors (if any) that will be used with the particular thermostat, and in some cases, the number of remote sensors that will be used.

Web server 38 may then, for example, serve up one or more web pages that provide the installer with a wiring diagram illustrating how a particular combination of external temperature sensors should be combined to form a remote sensing network for the thermostat. In some cases, web server 38 may serve up a web page that includes or otherwise provides a predetermined wiring diagram that is based, at least in part, upon the information pertaining to the one or more remote sensors received, including the number of remote sensors and the type of one or more of the remote sensors. In some instances, controller 36 may be adapted to look up a predetermined wiring diagram based upon the information pertaining to the one or more remote sensors.

In the illustrative embodiment, clicking on View Sensors button 999 (FIG. 9K) may cause web server 38 (FIG. 2) to serve up one or more of web page 903 (FIG. 9M), web page 905 (FIG. 9N), web page 907 (FIG. 9O), web page 909 (FIG. 9P), web page 911 (FIG. 9Q), web page 913 (FIG. 9R), web page 915 (FIG. 9S), web page 917 (FIG. 9T), and/or web page 919 (FIG. 9U). Although not required, each of these web pages may be pop-up web pages that float atop web page 996 (FIG. 9K). These web pages provide the installer with information pertaining to how to wire remote temperature sensors to provide the thermostat with a predetermined resistance.

In particular, web page 903 (FIG. 9M) provides information regarding how to wire a single 20 Kohm temperature sensor to the selected thermostat. Web page 905 (FIG. 9N) provides information regarding how to wire a pair of 10 Kohm temperature sensors. Web page 907 (FIG. 9O) provides information regarding how to wire a pair of 20 Kohm temperature sensors and a 10 Kohm temperature sensor. Web page 909 (FIG. 9P) provides information regarding how to wire a total of four 20 Kohm temperature sensors. Web page 911 (FIG. 9Q) provides information regarding how to wire a total of five 10 Kohm temperature sensors. Web page 913 (FIG. 9R) provides information regarding how to wire four 10 Kohm temperature sensors and two 20 Kohm temperature sensors. Web page 915 (FIG. 9S) provides information regarding how to wire four 20 Kohm temperature sensors and three 10 Kohm temperature sensors. Web page 917 (FIG. 9T) provides information regarding how to wire a total of six 20 Kohm temperature sensors and two 10 Kohm sensors. Web page 919 (FIG. 9U) provides information regarding how to wire a total of nine 20 Kohm temperature sensors.

FIGS. 10A-10D provide illustrative but non-limiting examples of web page that may be served up by web server 38 (FIG. 2). In particular, FIGS. 10A-10D provide web pages pertaining to the Systems tab 84 (FIG. 3B) and the corresponding functionality of building control appliance 12 (FIG. 1). The web pages shown in FIGS. 10A-10D may, for example, be accessed and displayed on a computer running a thin client application such as Microsoft® Internet Explorer®.

Figure 10A:
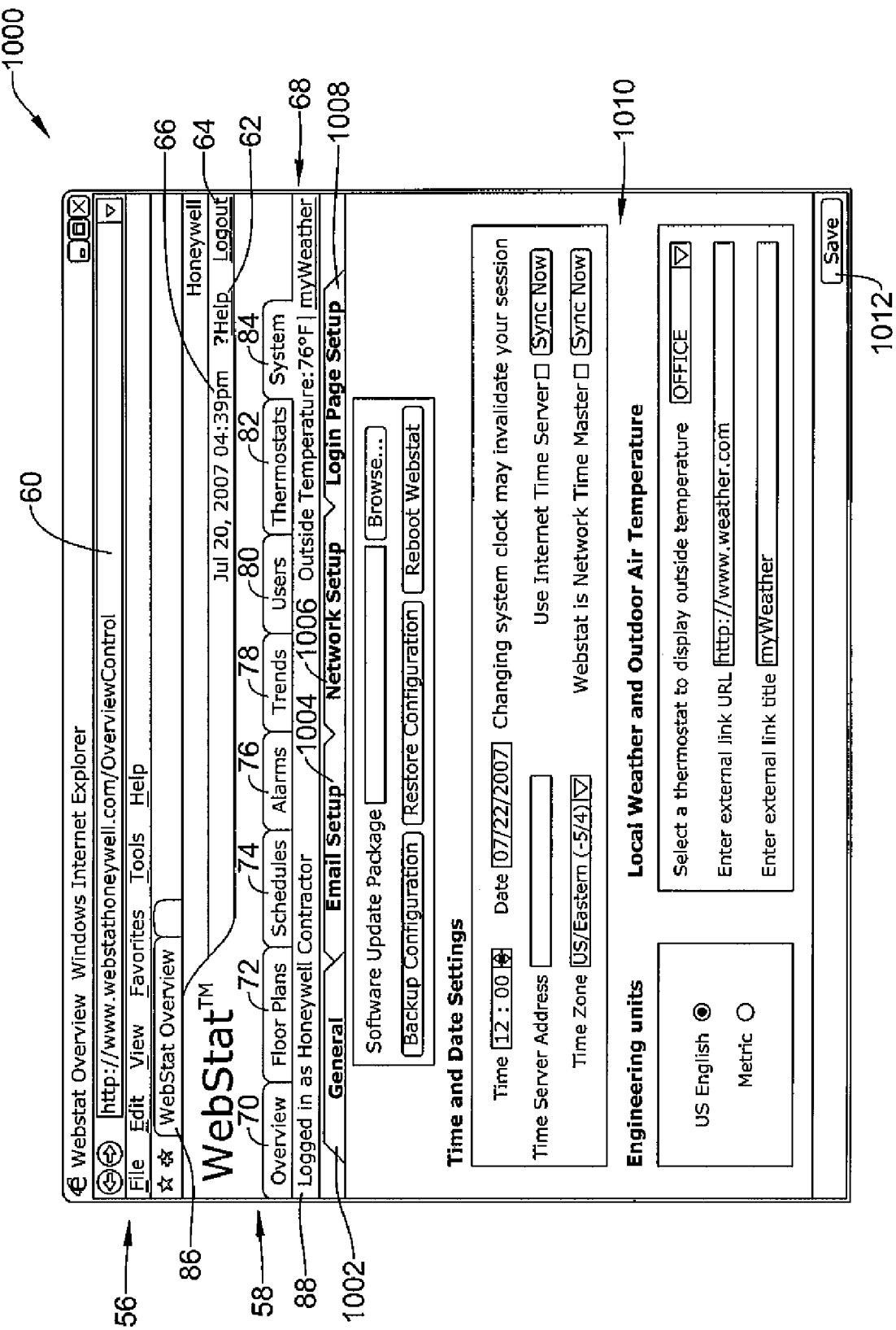
FIGS. 10A-10D are illustrative but non-limiting examples of web pages that may be generated by the HVAC control system of FIG. 1, pertaining to a system configuration functionality thereof.

FIG. 10A shows a web page 1000 that may be reached, from any or nearly any web page that may be served up by web server 38 (FIG. 2), by clicking on the System tab 84 disposed within navigation bar 58. Web page 1000 may include a General tab 1002, an Email Setup tab 1004, a Network Setup tab 1006 and a Login Page Setup tab 1008. Web page 1000 may be the result of clicking on General tab 1002. Web page 1000 includes a pane 1010 that permits an authorized user to view and/or edit various general parameters. Examples of such parameters may include software updates, time and date settings, engineering units, local weather, and the like. A Save button 1012 permits a user to save any changes they may have made.

Figure 10B:
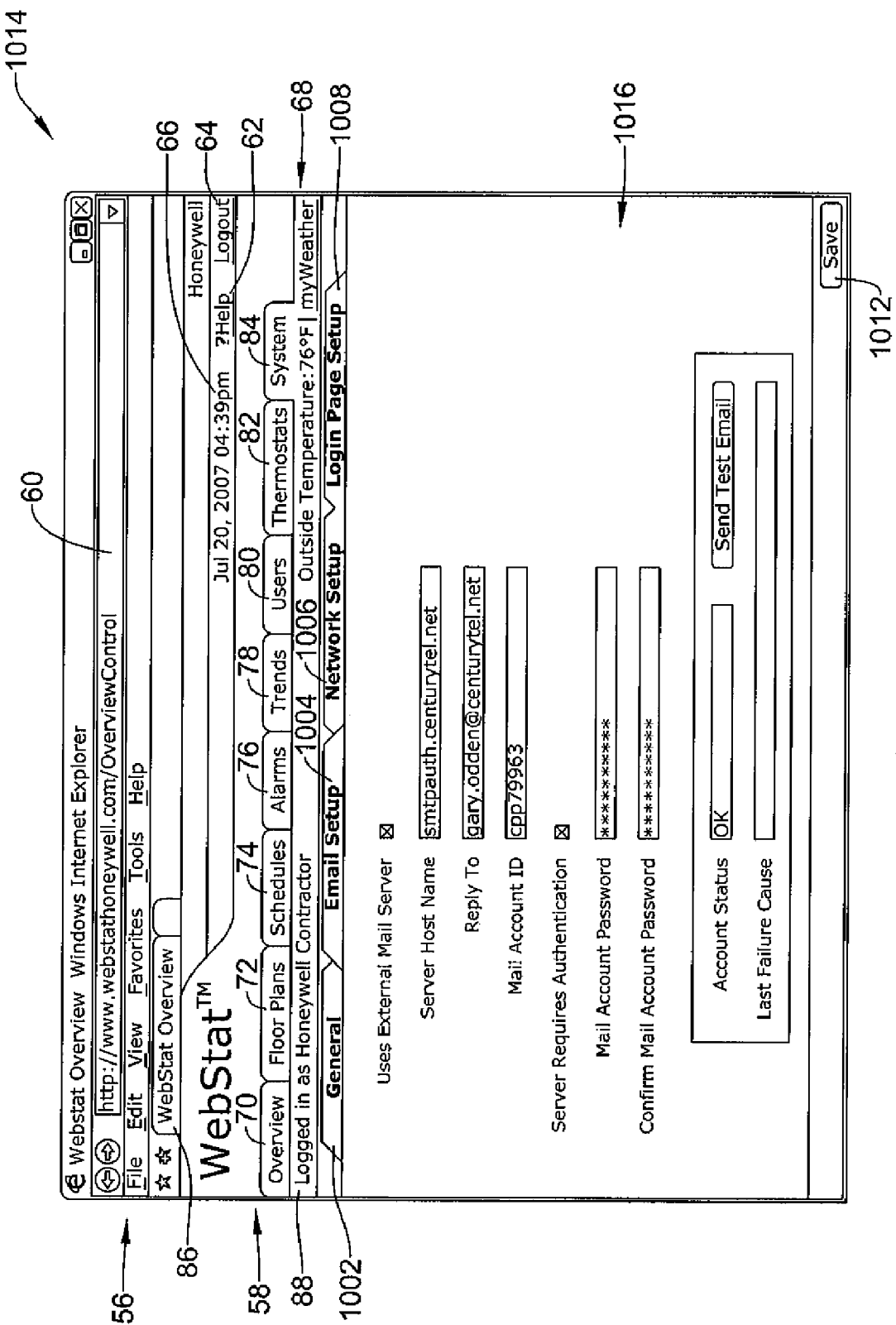

Clicking on Email Setup tab 1004 may cause web server 38 (FIG. 2) to serve up web page 1014, which is shown in FIG. 10B. Web page 1014 includes a pane 1016 that permits an authorized user to view and/or edit various parameters such as user email addresses and the like.

Figure 10C:
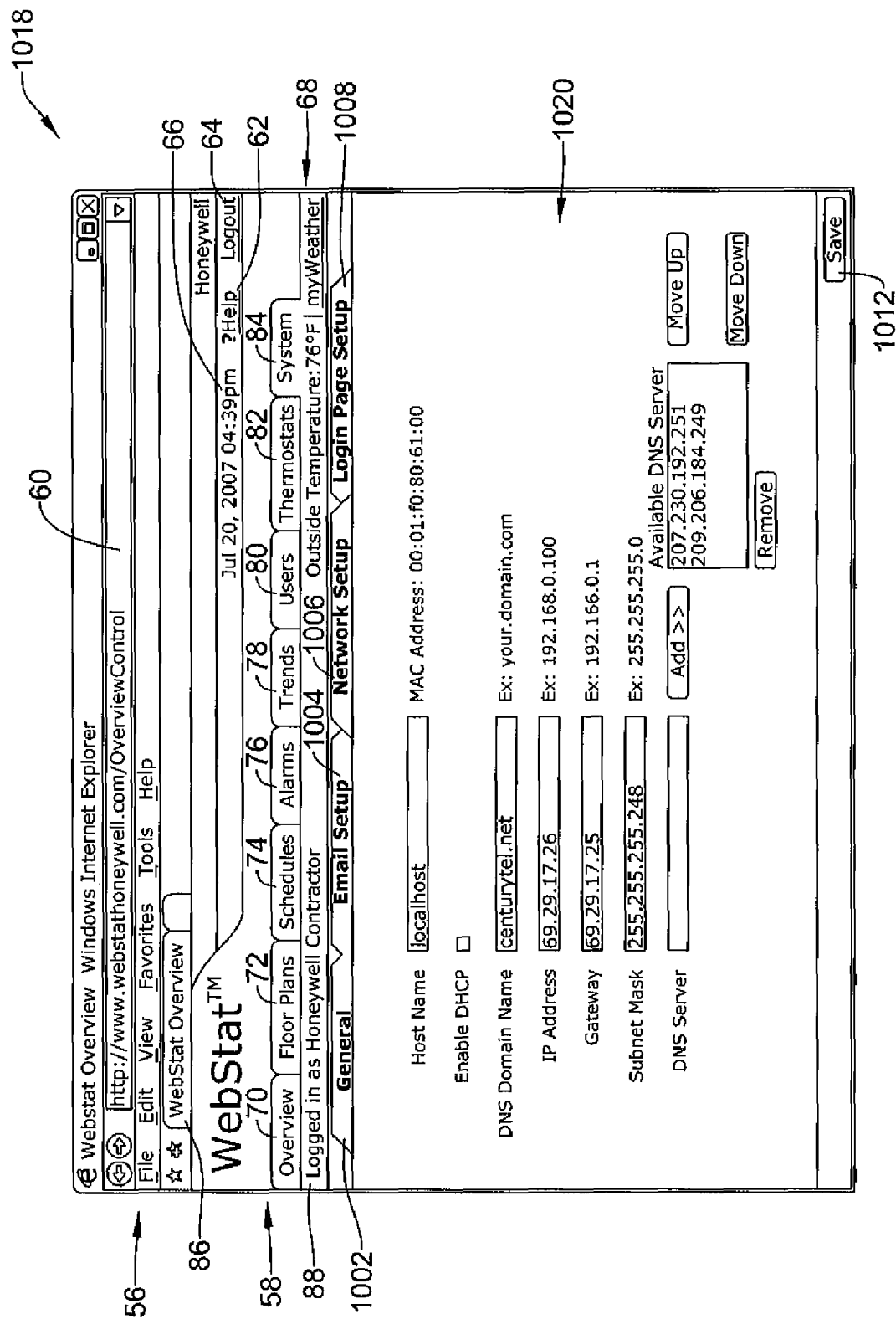

Clicking on Network Setup tab 1006 may cause web server 38 (FIG. 2) to serve up web page 1018, which is shown in FIG. 10C. Web page 1018 includes a pane 1020 that permits an authorized user to view and/or edit various parameters relating to network settings.

Figure 10D:
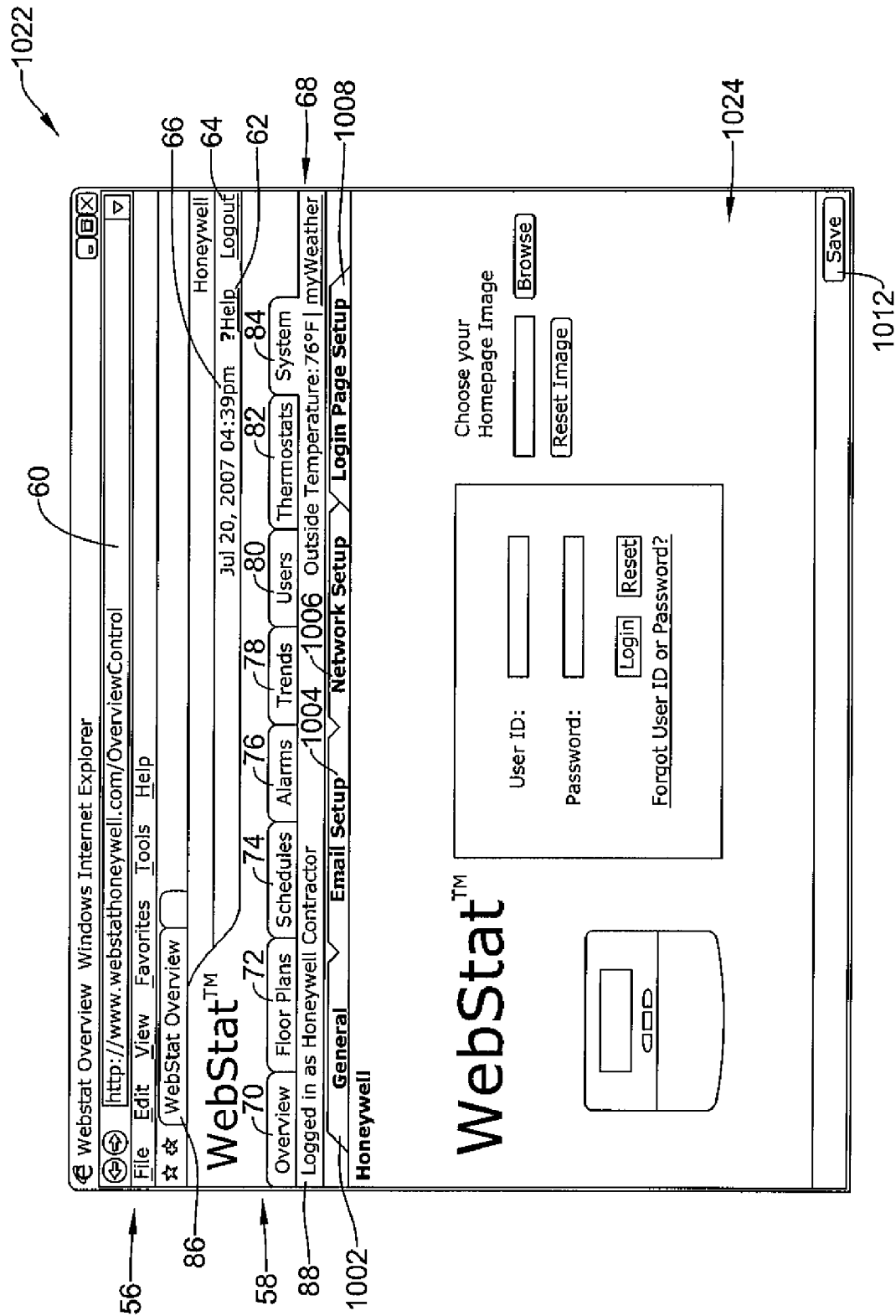

Clicking on Login Page Setup tab 1008 may cause web server 38 (FIG. 2) to serve up web page 1022, which is shown in FIG. 10D. Web page 1022 includes a pane 1024 that permits an authorized user to view and/or edit various parameters relating to the login settings.

Figure 11A:
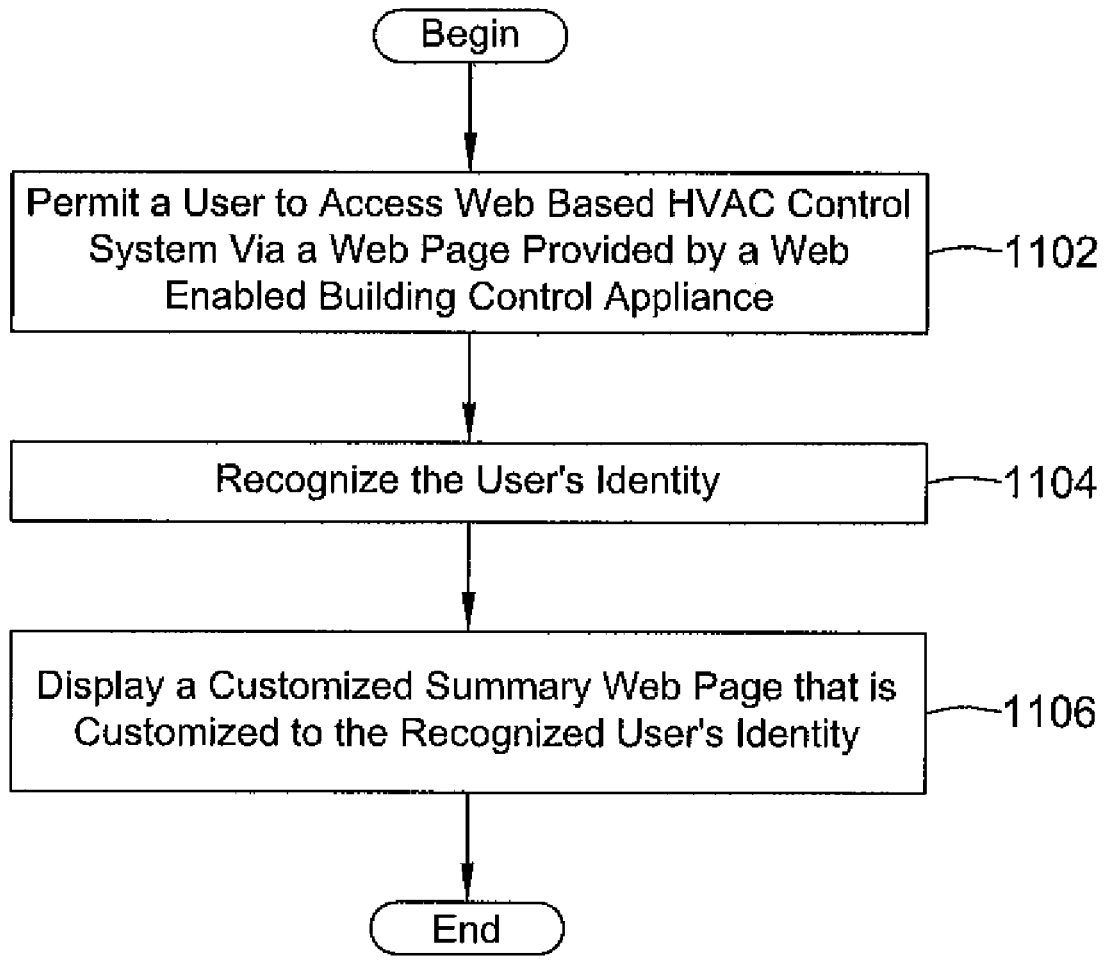
FIGS. 11A-11C are flow diagrams providing illustrative but non-limiting examples of methods that may be carried out using the HVAC control system of FIG. 1.
Figure 11B:
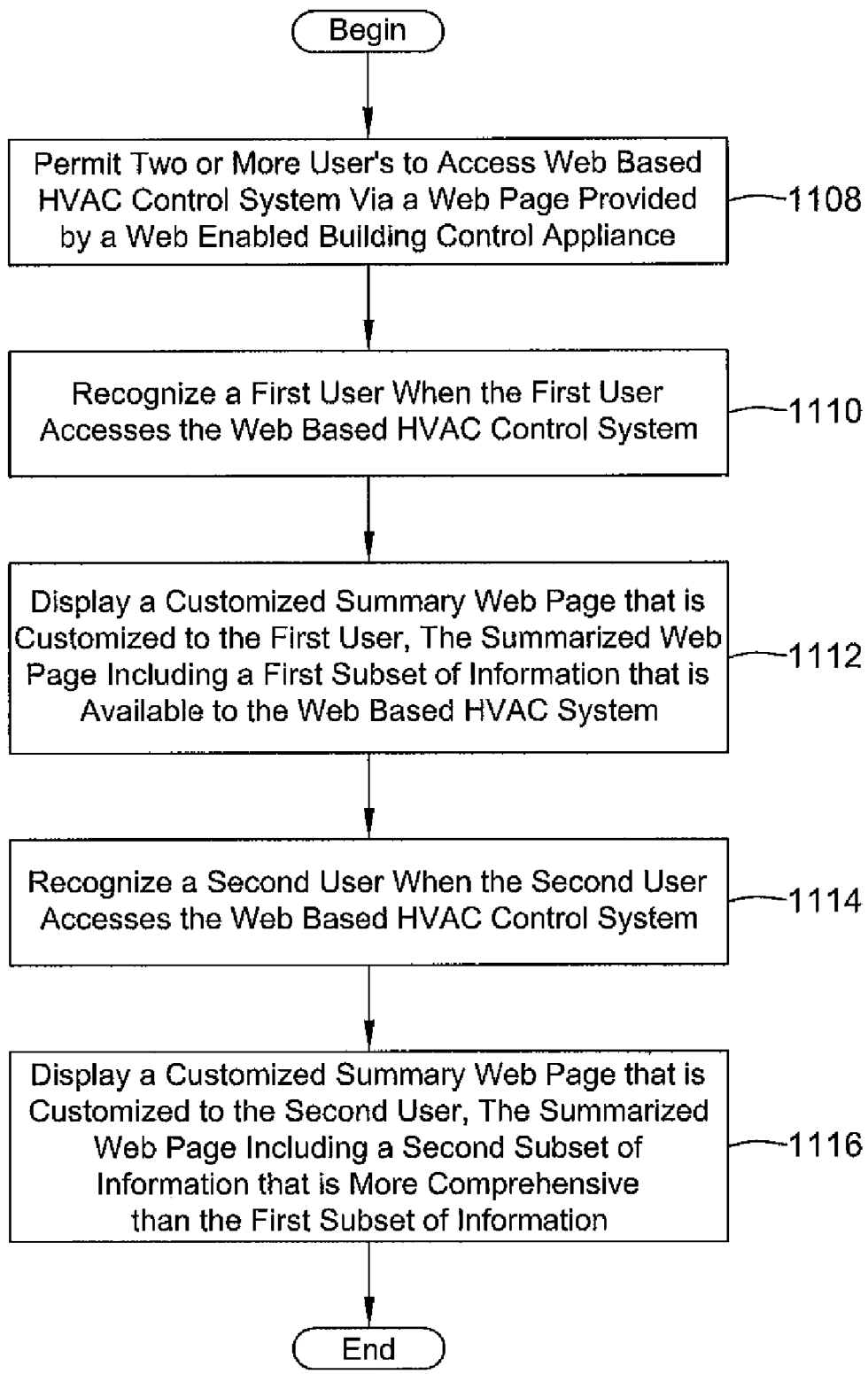
Figure 11C:
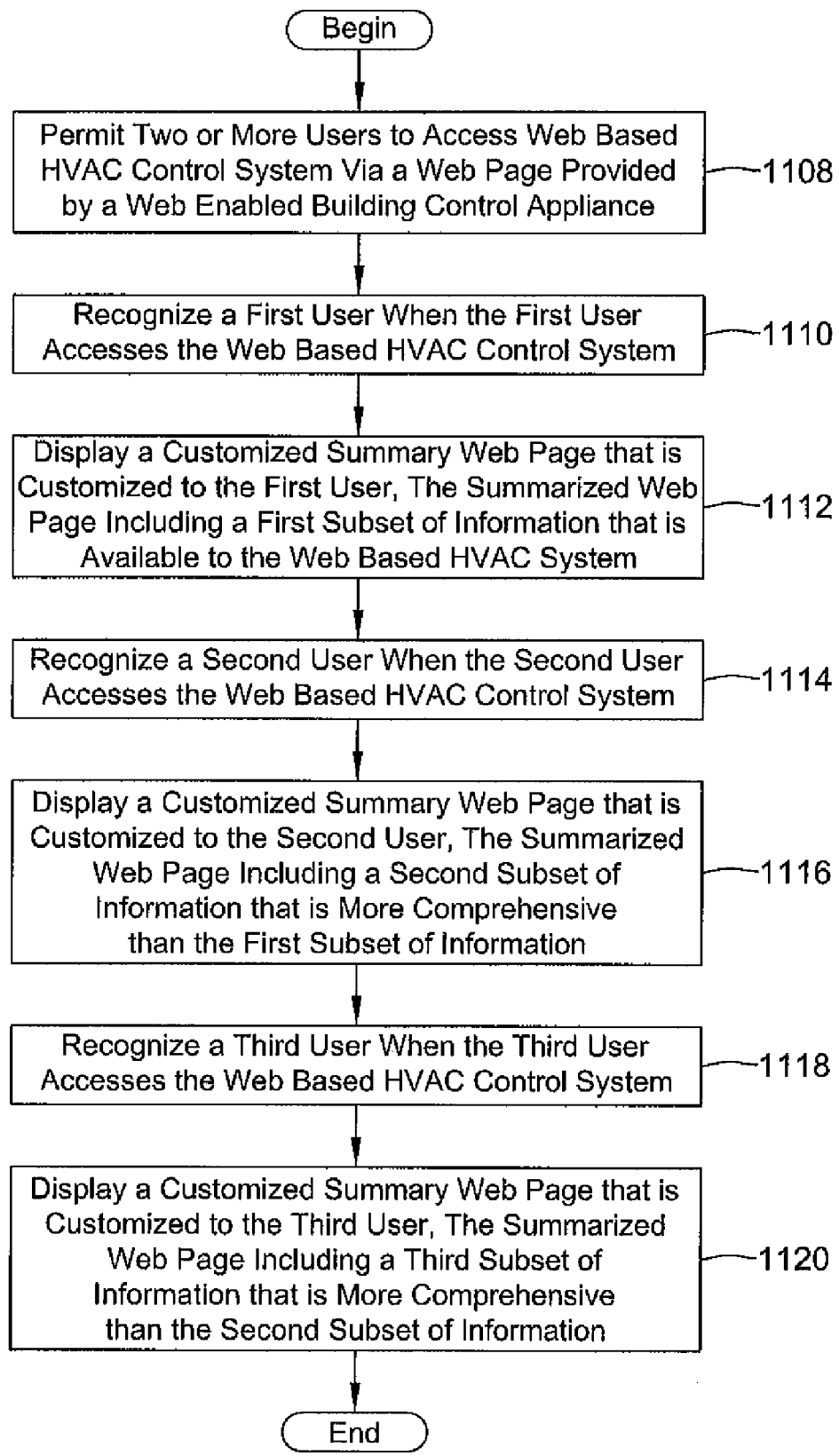
Figure 12A:
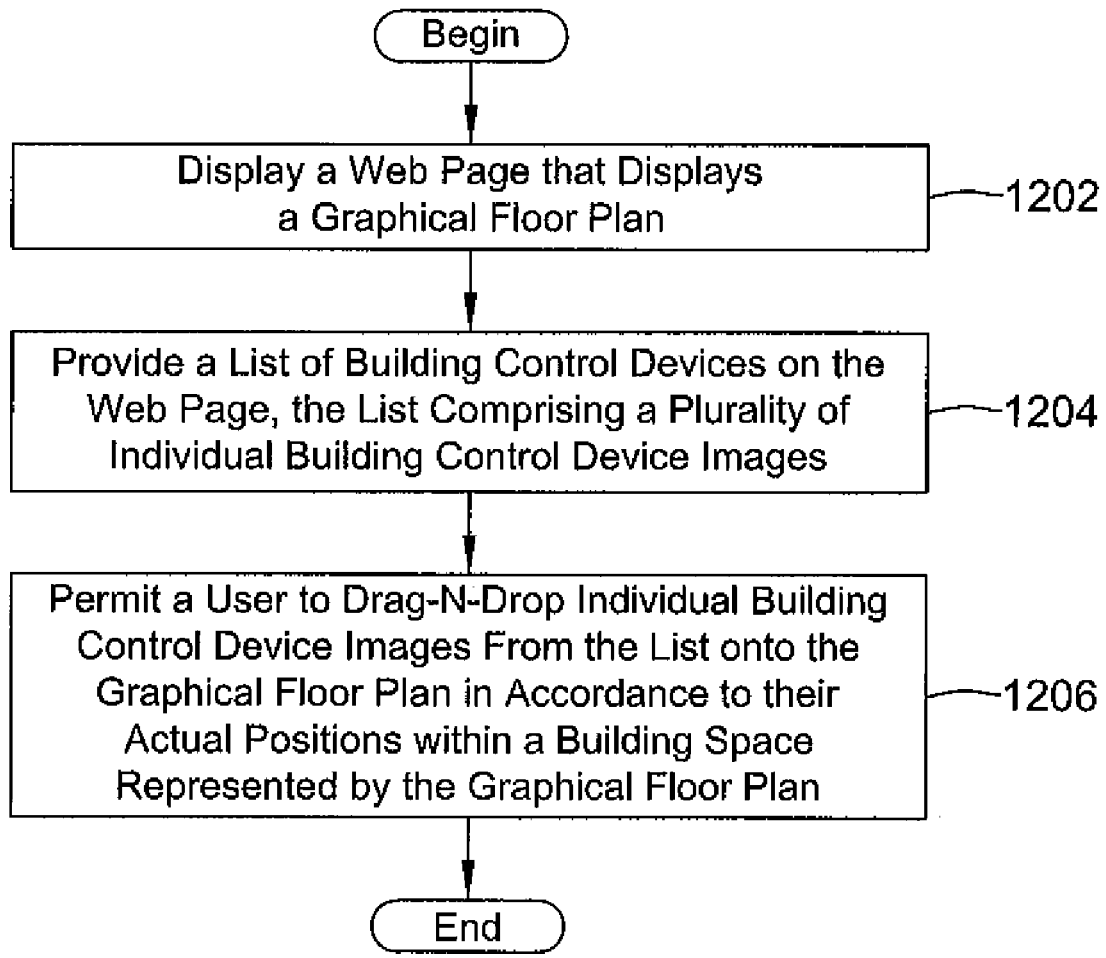
FIGS. 12A-12C are flow diagrams providing illustrative but non-limiting examples of methods that may be carried out using the HVAC control system of FIG. 1.
Figure 12B:
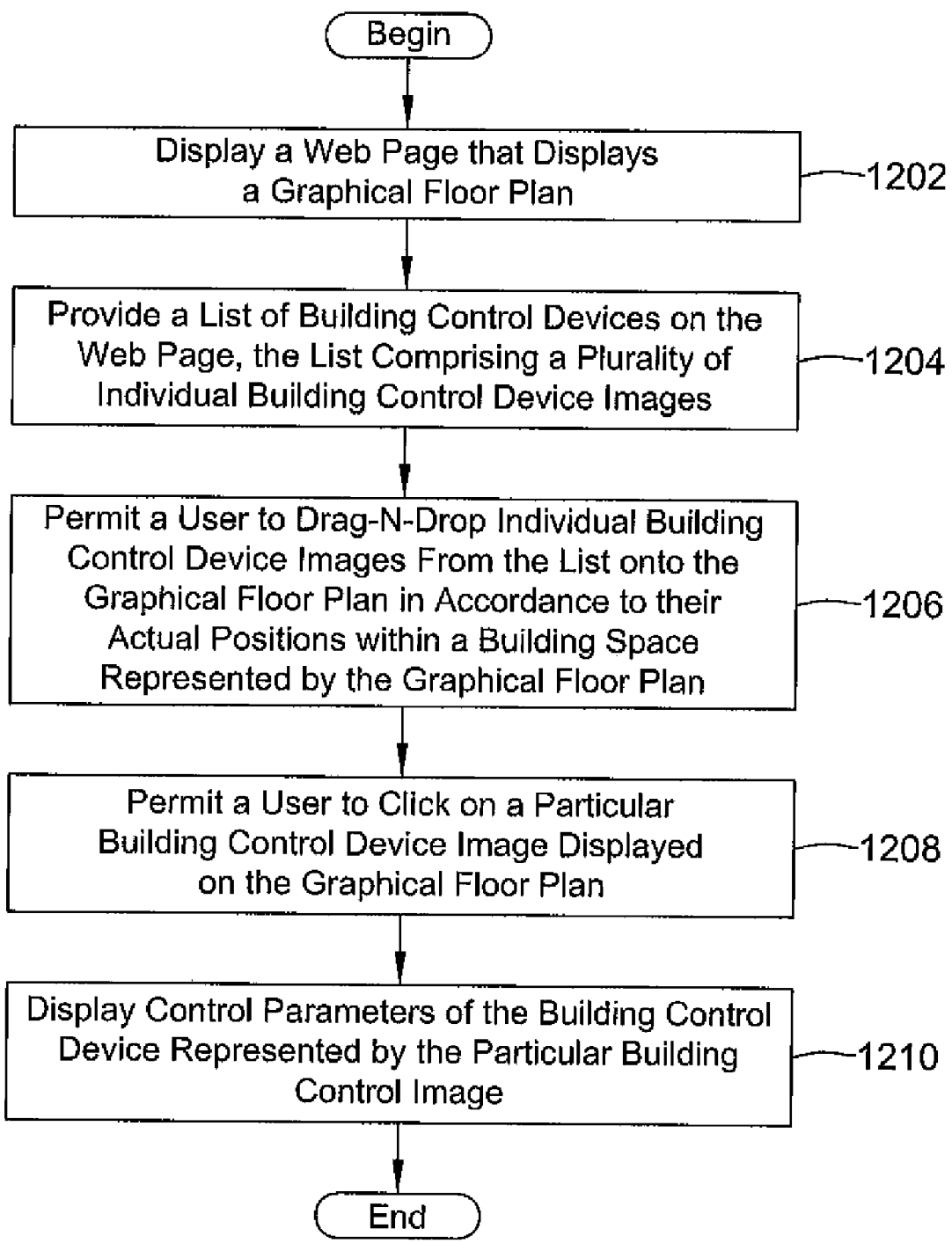
Figure 12C:
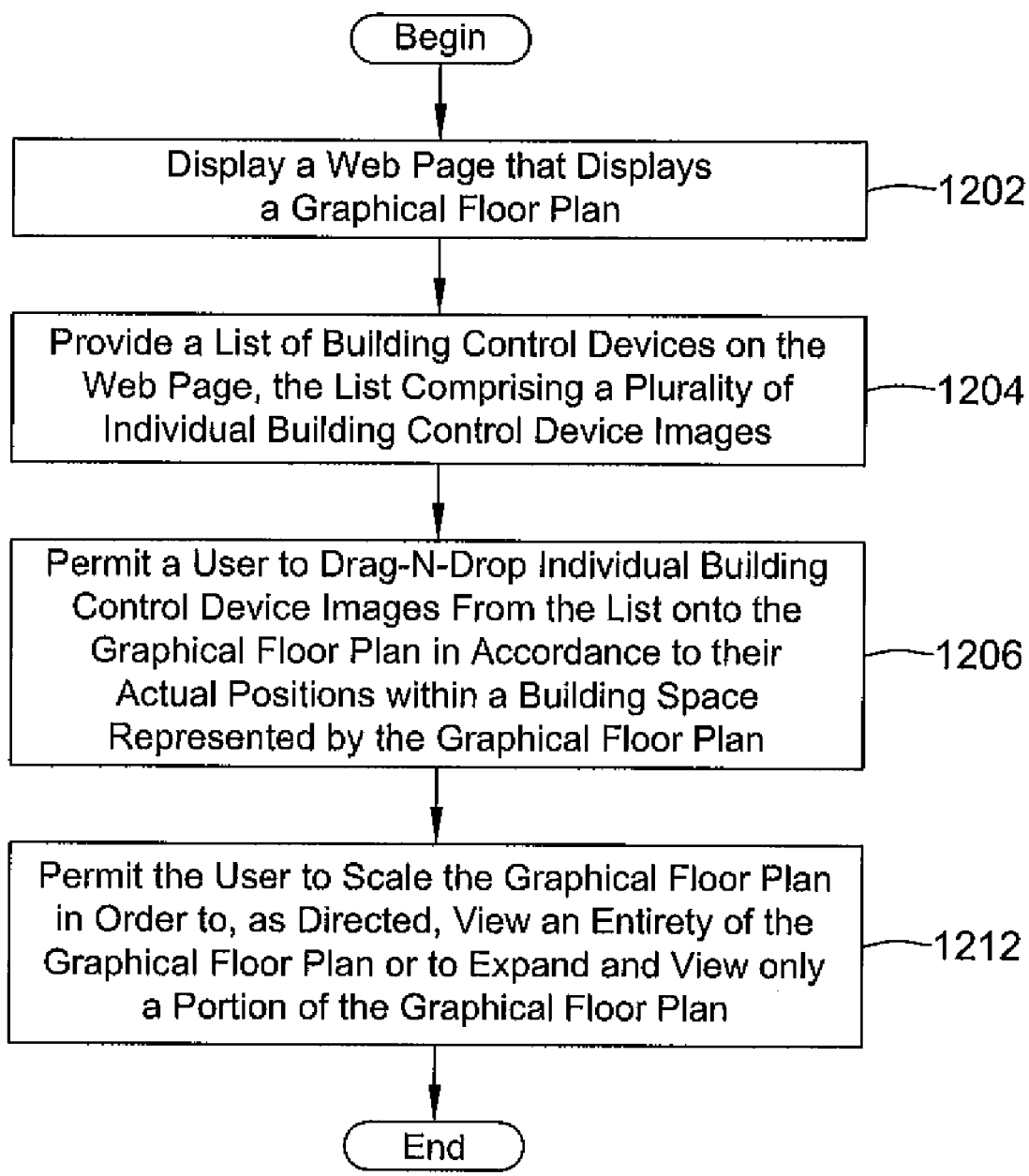
Figure 13A:
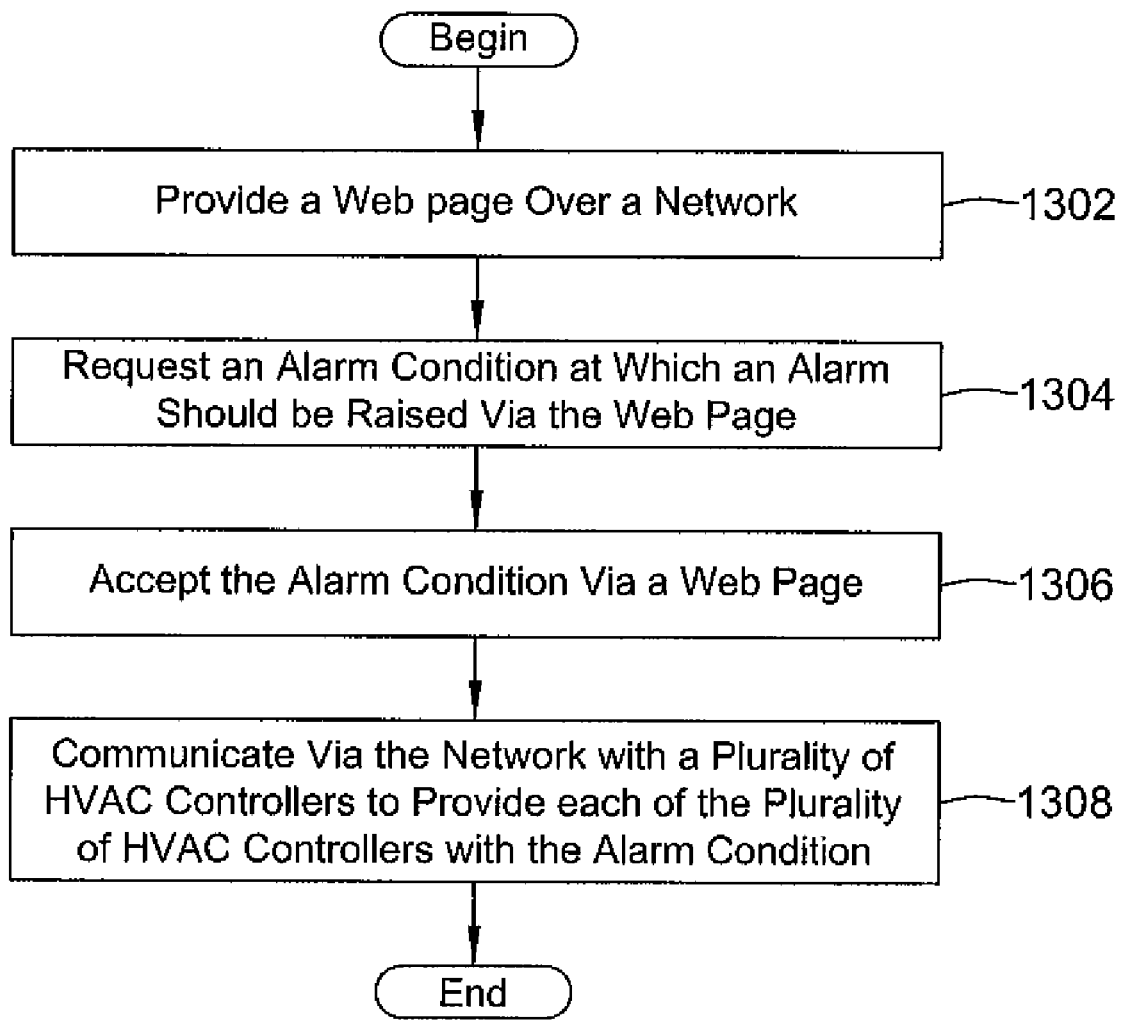
FIGS. 13A-13C are flow diagrams providing illustrative but non-limiting examples of methods that may be carried out using the HVAC control system of FIG. 1.
Figure 13B:
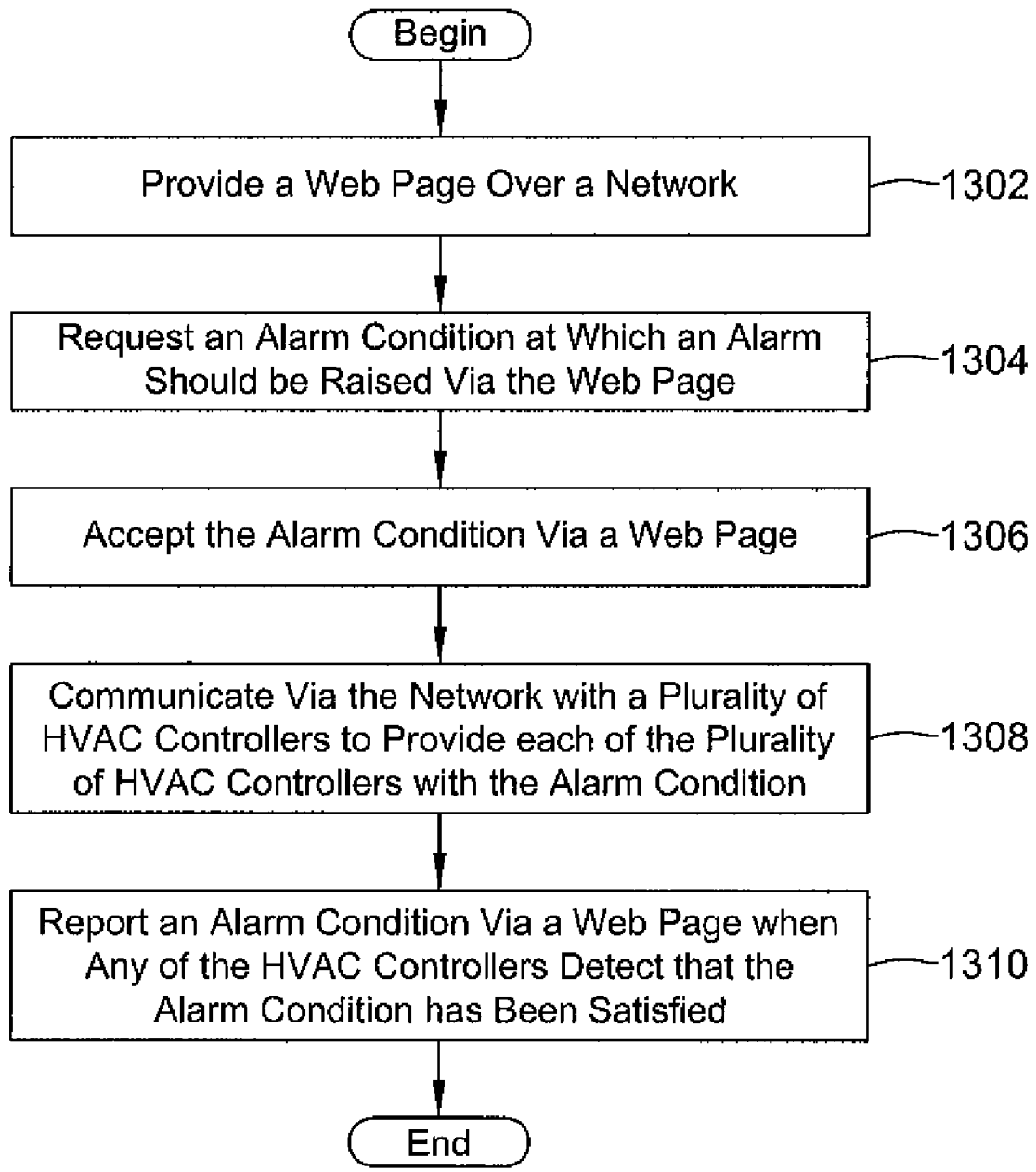
Figure 13C:
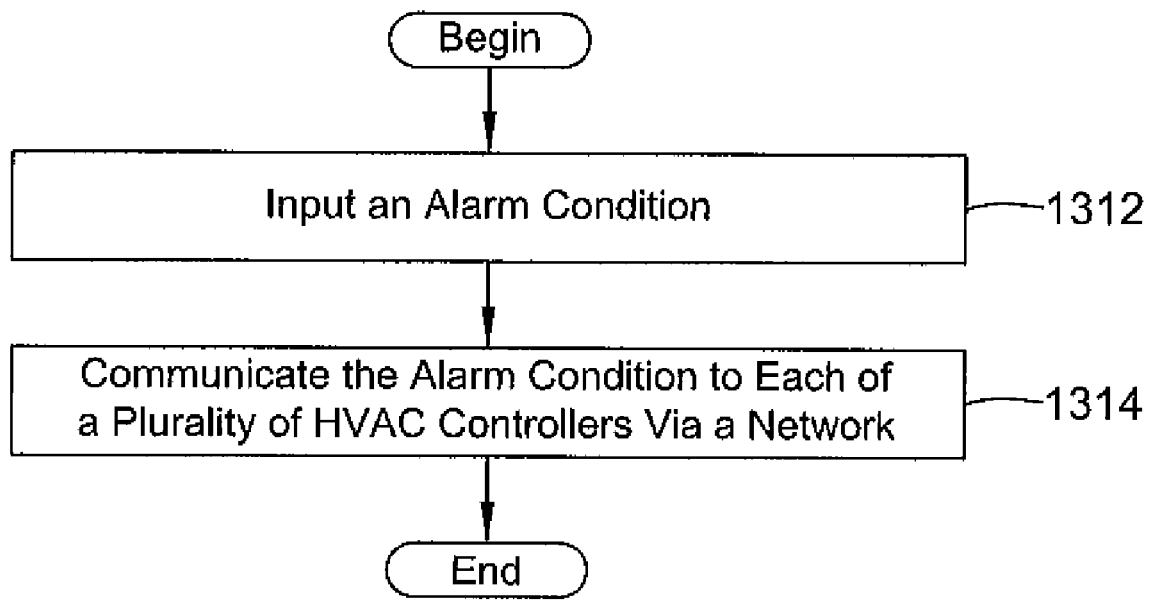

The following Figures provide illustrative but non-limiting examples of methods that may be carried out using HVAC control system 10 (FIG. 1). FIGS. 11A-11C, for example, provide examples of methods pertaining to providing a summary web page. FIGS. 12A-12C provide examples of methods pertaining to arranging and/or configuring thermostats on a floor plan. FIGS. 13A-13C provide examples of methods pertaining to batch alarms. FIGS. 14A-14F provide examples of methods pertaining to configuring user roles. FIGS. 15A-15C provide examples of methods pertaining to providing sensor wiring diagrams.

FIG. 11A describes a method of providing a summary web page for HVAC control system 10 (FIG. 1). At block 1102, building control appliance 12 (FIG. 2) permits a user to access HVAC control system 10 via one or more web pages that may be provided, for example, by web server 38 (FIG. 2). At block 1104, the user's identity is recognized. Control pass to block 1106, where web server 38 displays a customized summary web page. The customized summary web page may be customized in accordance with the recognized identity of the user.

In some cases, the user's identity includes assigned user privileges and the customized summary web page may display information that corresponds to the user's assigned privileges. The displayed information may, for example, correspond to only certain HVAC control devices. If the user is identified as a tenant of a space of a building, the summary web page may, if desired, only include information related to any HVAC control devices pertaining to the tenant's space within the building. If the user is identified as a facility manager of a building, the summary web page may, if desired, include a selected subset of information related to operation of HVAC control devices throughout the building. If the user is identified as a contractor of a building, the summary web page may, if desired, include a selected subset of information related to operation of HVAC control devices throughout the building.

FIG. 11B describes a method of providing a summary web page for HVAC control system 10 (FIG. 1). At block 1108, building control appliance 12 (FIG. 2) permits two or more users to access HVAC control system 10 (FIG. 1) via one or more web pages that may be provided by web server 38 (FIG. 2). At block 1110, a first user may be recognized when the first user accesses HVAC control system 10. Control passes to block 1112, where web server 38 displays a customized summary web-page that is customized to the first user and that includes a first subset of information that is available to HVAC control system 10. A second user is recognized when they access HVAC control system 10, as referenced at block 1114. Control passes to block 1116, where web server 38 displays a customized summary web page that is customized to the second user and that includes a second subset of information that is available to HVAC control system 10. In some cases, the second subset of information may be more comprehensive than the first subset of information.

FIG. 11C describes a method of providing a summary web page for HVAC control system 10 (FIG. 1). At block 1108, building control appliance 12 (FIG. 2) permits two or more users to access HVAC control system 10 (FIG. 1) via one or more web pages that may be provided by web server 38 (FIG. 2). At block 1110, a first user may be recognized when the first user accesses HVAC control system 10. Control passes to block 1112, where web server 38 displays a customized summary web-page that is customized to the first user and that includes a first subset of information that is available to HVAC control system 10.

A second user is recognized when they access HVAC control system 10, as referenced at block 1114. Control passes to block 1116, where web server 38 displays a customized summary web page that is customized to the second user and that includes a second subset of information that is available to HVAC control system 10. In some cases, the second subset of information may be more comprehensive than the first subset of information.

Control passes to block 1118, where a third user is recognized when they access HVAC control system 10 (FIG. 1). At block 1120, web server 38 (FIG. 2) displays a customized summary web page that is customized to the third user and that includes a third subset of information that is available to HVAC control system 10. In some cases, the third subset of information may be more comprehensive than the second subset of information.

FIG. 12A describes a method of configuring building control devices using HVAC control system 10 (FIG. 1). At block 1202, web server 38 (FIG. 2) may serve up a web page that displays a graphical floor plan. In some cases, the web page may permit the user to upload an image file that contains a graphical floor plan. Web server 38 may provide a list of building control devices on the web page. The list may include a number of building control device images. Control passes to block 1206, where building control appliance 12 (FIG. 1) permits a user to drag and drop individual building control device images onto the graphical floor plan in accordance with their actual positions within a building space that is represented by the graphical floor plan.

In some instances, the web page may be displayed in a first computer but may be generated by a second computing device that is remotely located with respect to the first computer. The first and second computer may, in some cases, be in communication via a network such as a local area network (LAN), a wide area network (WAN), or the Internet. The building control device images may, if desire, be or include icons that identify the building control devices. In some cases, the building control devices may be HVAC controllers such as communicating thermostats.

FIG. 12B describes a method of configuring building control devices using HVAC control system 10 (FIG. 1). At block 1202, web server 38 (FIG. 2) may serve up a web page that displays a graphical floor plan. In some cases, the web page may permit the user to upload an image file that contains a graphical floor plan. Web server 38 may provide a list of building control devices on the web page. The list may include a number of building control device images. Control passes to block 1206, where building control appliance 12 (FIG. 1) permits a user to drag and drop individual building control device images onto the graphical floor plan in accordance with their actual positions within a building space that is represented by the graphical floor plan.

At block 1208, the user may be permitted to click on a particular building control device image displayed on the graphical floor plan in order to display control parameters of the building control device represented by the particular building control device image, as referenced at block 1210. Control parameters that may be displayed in this fashion include one or more of temperature data, humidity data and/or schedule data.

FIG. 12C describes a method of configuring building control devices using HVAC control system 10 (FIG. 1). At block 1202, web server 38 (FIG. 2) may serve up a web page that displays a graphical floor plan. In some cases, the web page may permit the user to upload an image file that contains a graphical floor plan. Web server 38 may provide a list of building control devices on the web page. The list may include a number of building control device images. Control passes to block 1206, where building control appliance 12 (FIG. 1) permits a user to drag and drop individual building control device images onto the graphical floor plan in accordance with their actual positions within a building space that is represented by the graphical floor plan. At block 1212, web server 38 (FIG. 2) may permit the user to scale the graphical floor plan in order to, as desired, view an entirety of the graphical floor plan or to expand and view only a portion of the graphical floor plan. In some instances, the user may instead scale or resize the graphical floor plan prior to uploading the image file.

FIG. 13A describes a method of configuring an alarm for one or more HVAC controllers that are connected to a network using HVAC control system 10 (FIG. 1). In some instances, there may be a number of HVAC controllers. The network may include one or more of a local area network (LAN), a wide area network (WAN) or the Internet. At block 1302, web server 38 (FIG. 2) may provide a web page over a network. At block 1304, web server 38 may solicit via the web page an alarm condition at which an alarm should be raised. At block 1306, web server 38 accepts the inputted alarm condition via the web page and at block 1308, the alarm condition is communicated over the network to the number of HVAC controllers.

The alarm condition may be any suitable parameter. In some cases, an alarm condition may be a temperature parameter. An alarm may be sounded, for example, if an HVAC controller registers a temperature that exceeds the temperature parameter. In some cases, an alarm may be sounded if an HVAC controller registers a temperature that falls below the temperature parameter. A pressure parameter may be a suitable alarm condition. In some cases, an alarm may be sounded if an HVAC controller registers a pressure that exceeds the pressure parameter In some instances, an alarm may be sounded if an HVAC controller registers a pressure that falls below the pressure parameter. Another illustrative but non-limiting example of a suitable alarm condition includes an online status of one or more HVAC controllers. For example, an alarm may sound if one of the HVAC controllers goes offline.

FIG. 13B describes a method of configuring an alarm for a number of HVAC controllers that are connected to a network such as a LAN or a WAN using HVAC control system 10 (FIG. 1). At block 1302, web server 38 (FIG. 2) may provide a web page over a network. At block 1304, web server 38 may solicit via the web page an alarm condition at which an alarm should be raised. In some instances, building control appliance 12 (FIG. 2) may itself generate one or more alarm conditions. At block 1306, web server 38 accepts the inputted alarm condition via the web page and at block 1308, the alarm condition is communicated over the network to the number of HVAC controllers. The alarm condition may be any suitable parameter as discussed with respect to FIG. 13A. At block 1310, an alarm condition may be reported via a web page when an HVAC controller detects that the alarm condition has been satisfied.

FIG. 13C describes a method of configuring an alarm for a number of HVAC controllers using HVAC control system 10 (FIG. 1). At block 1312, an alarm condition may be inputted. The alarm condition may be communicated to each of the number of HVAC controllers via a network, as referenced at block 1314. In some cases, the alarm condition is not communicated to each of the number of HVAC controllers, but rather building control appliance 12 (FIG. 2) monitors signals from each of the HVAC controllers to ascertain if an alarm condition has been reached by any of the HVAC controllers. One or more of the HVAC controllers may be communicating thermostats, but this is not required. In some cases, a web page that is accessed via the network solicits the alarm condition and may in some cases permit a user to enter the alarm condition or perhaps permit the user to select the alarm condition from a list or pull-down menu of predetermined alarm conditions. In some cases, the alarm condition may be one or more of a temperature parameter, a pressure parameter or an online status parameter.

Figure 14A:
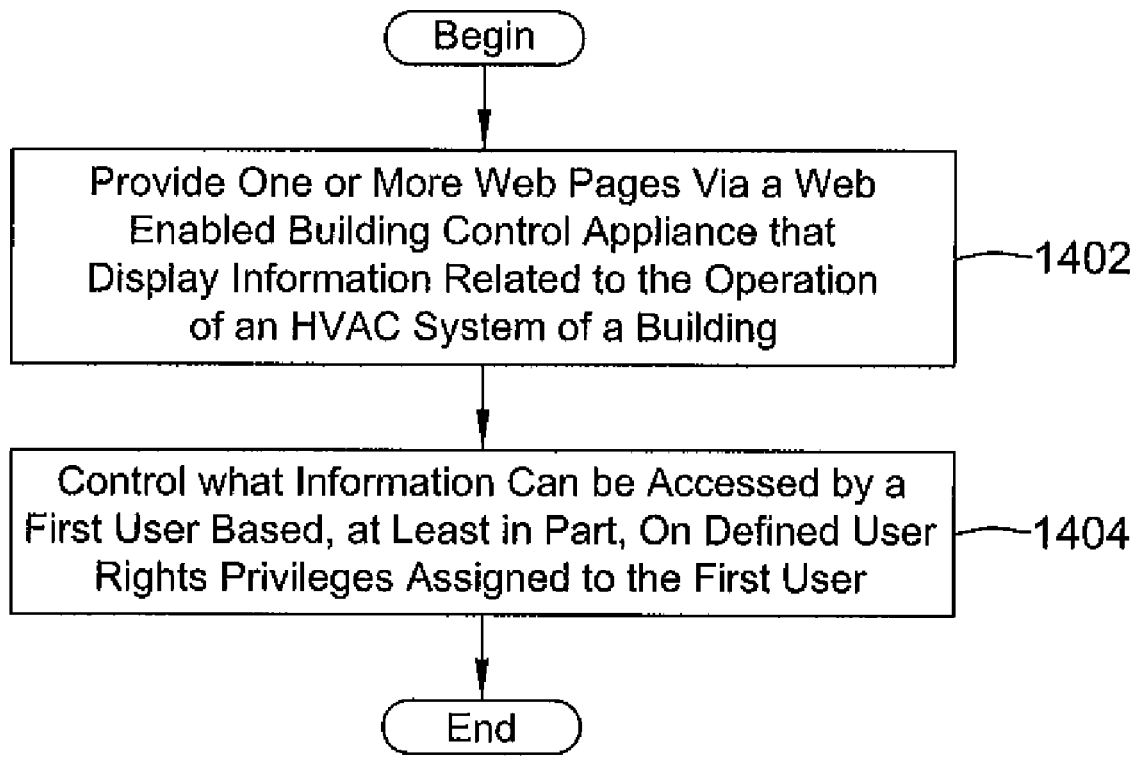
FIGS. 14A-14F are flow diagrams providing illustrative but non-limiting examples of methods that may be carried out using the HVAC control system of FIG. 1.
Figure 15A:
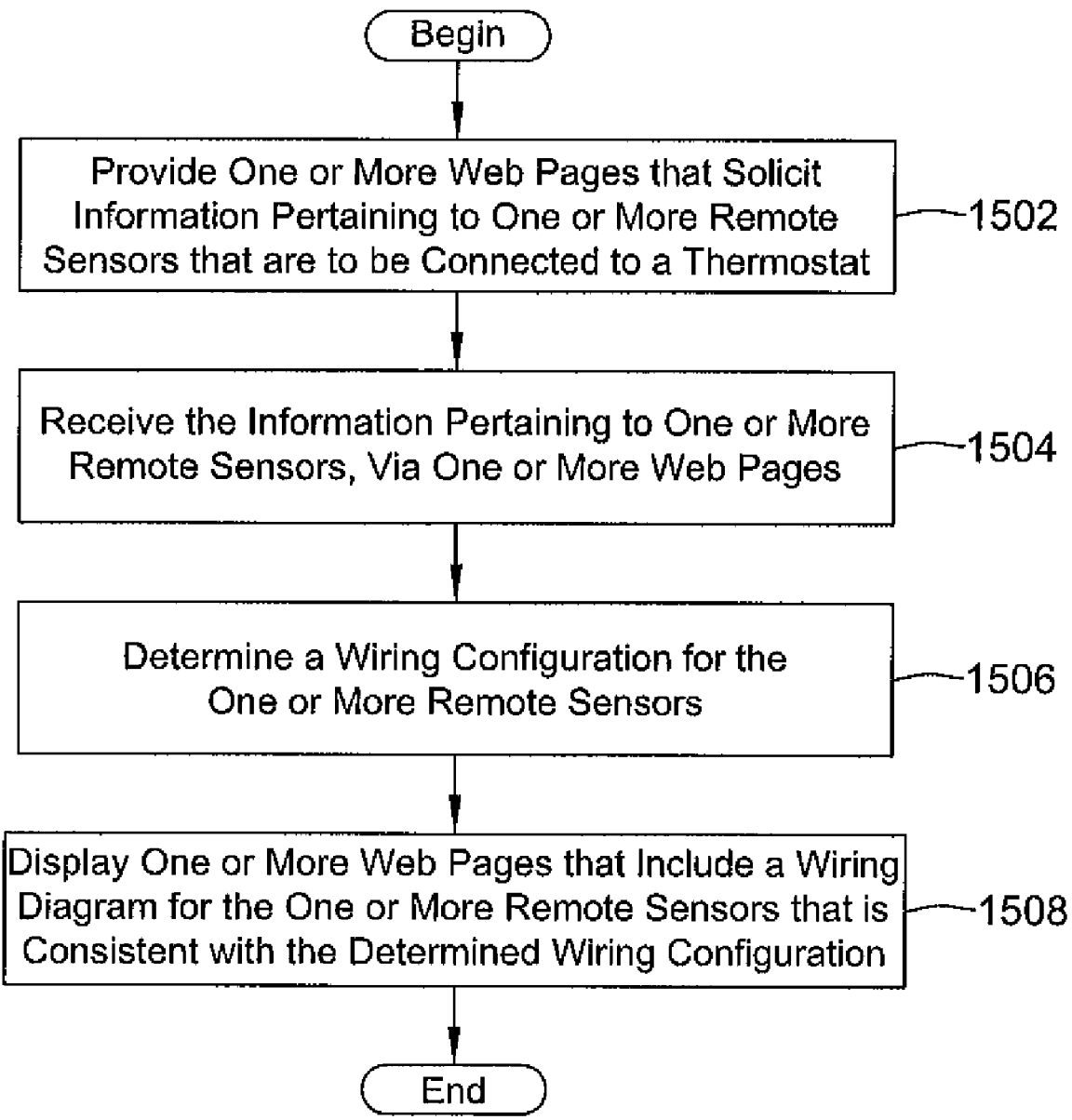
FIGS. 15A-15C are flow diagrams providing illustrative but non-limiting examples of methods that may be carried out using the HVAC control system of FIG. 1.
Figure 15B:
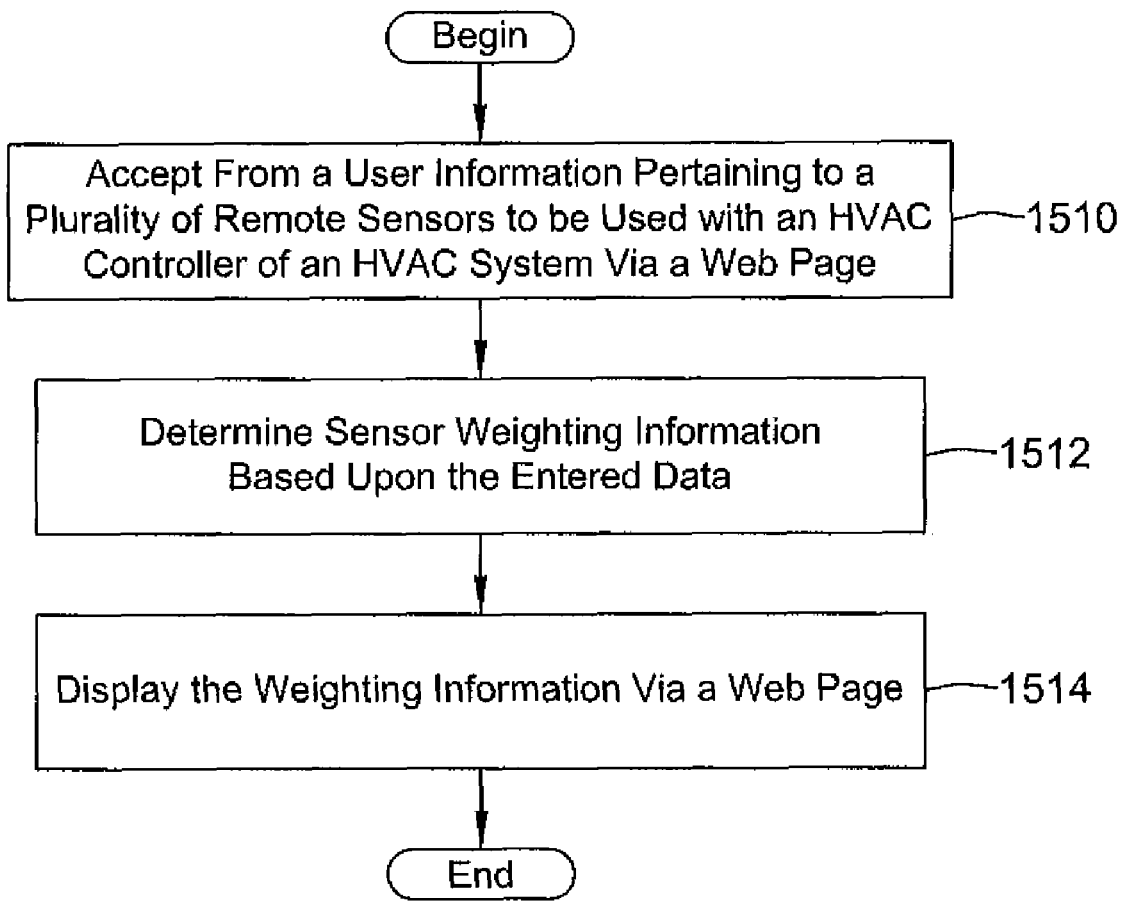
Figure 15C:
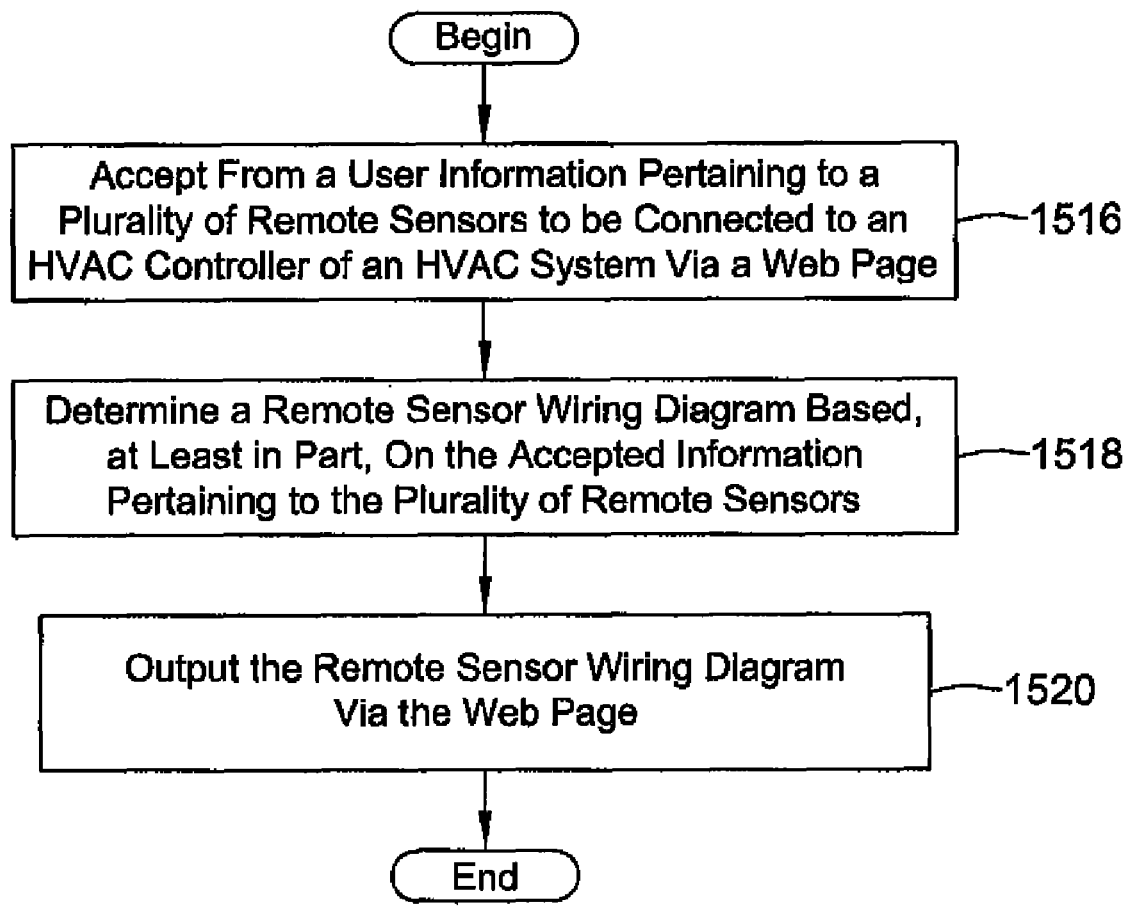

FIG. 14A describes a method of configuring privileges for a building control appliance 12 (FIG. 1) that is either directly or indirectly coupled to an HVAC system of a building for a number of HVAC controllers. At block 1402, web enabled building control appliance 12 may provide one or more web pages that display information related to the operation of the HVAC system of the building. Control passes to block 1404, where building control appliance 12 may control what information may be accessed by a first user, based at least in part upon the defined user rights privileges that are assigned to the first user. In some cases, the user rights privileges define one or more of viewing privileges and/or changing privileges.

Figure 14B:
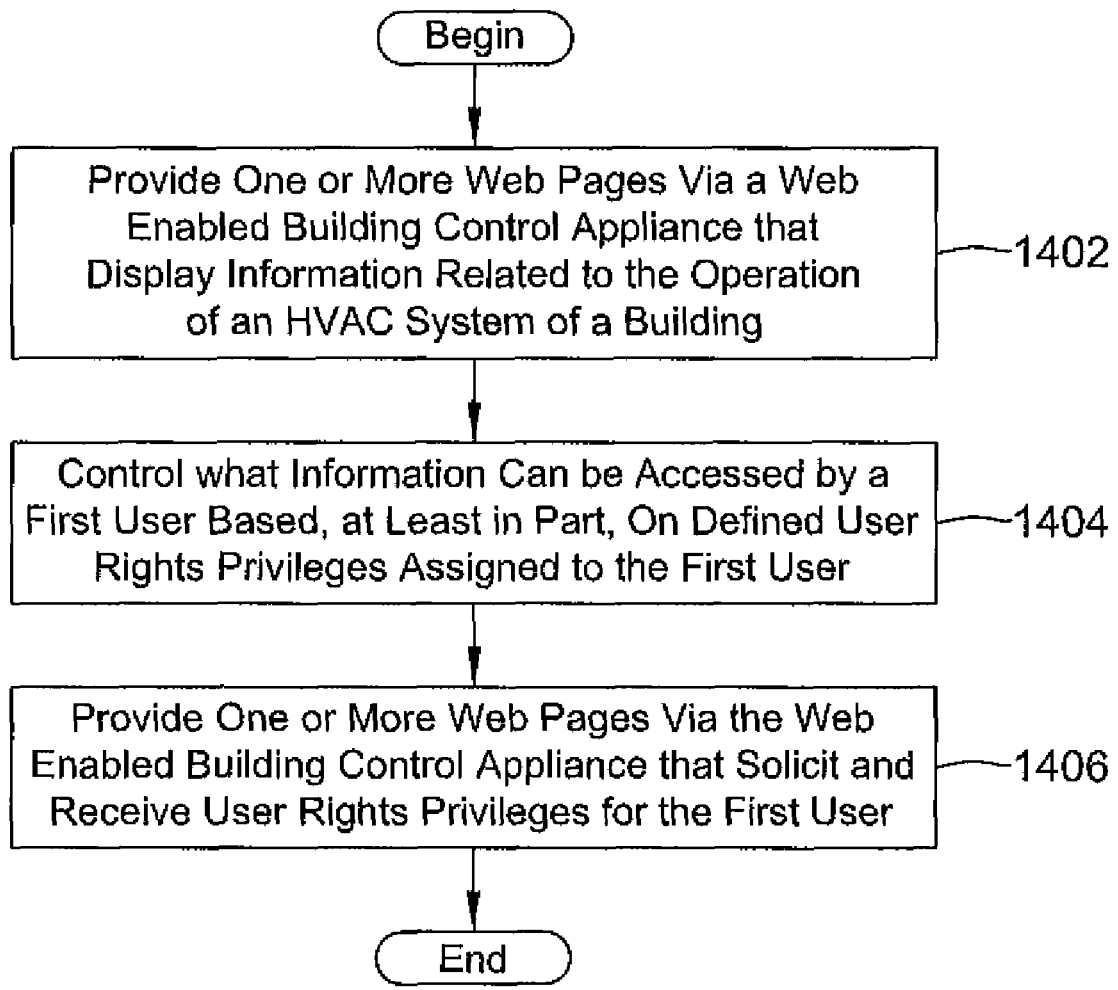

FIG. 14B describes a method of configuring privileges for a building control appliance 12 (FIG. 1) that is either directly or indirectly coupled to an HVAC system of a building for a number of HVAC controllers. At block 1402, web enabled building control appliance 12 may provide one or more web pages that display information related to the operation of the HVAC system of the building. Control passes to block 1404, where building control appliance 12 may control what information may be accessed by a first user, based at least in part upon the defined user rights privileges that are assigned to the first user. At block 1406, one or more web pages are provided by building control appliance 12 that solicit and/or receive information pertaining to user rights privileges for the first user.

Figure 14C:
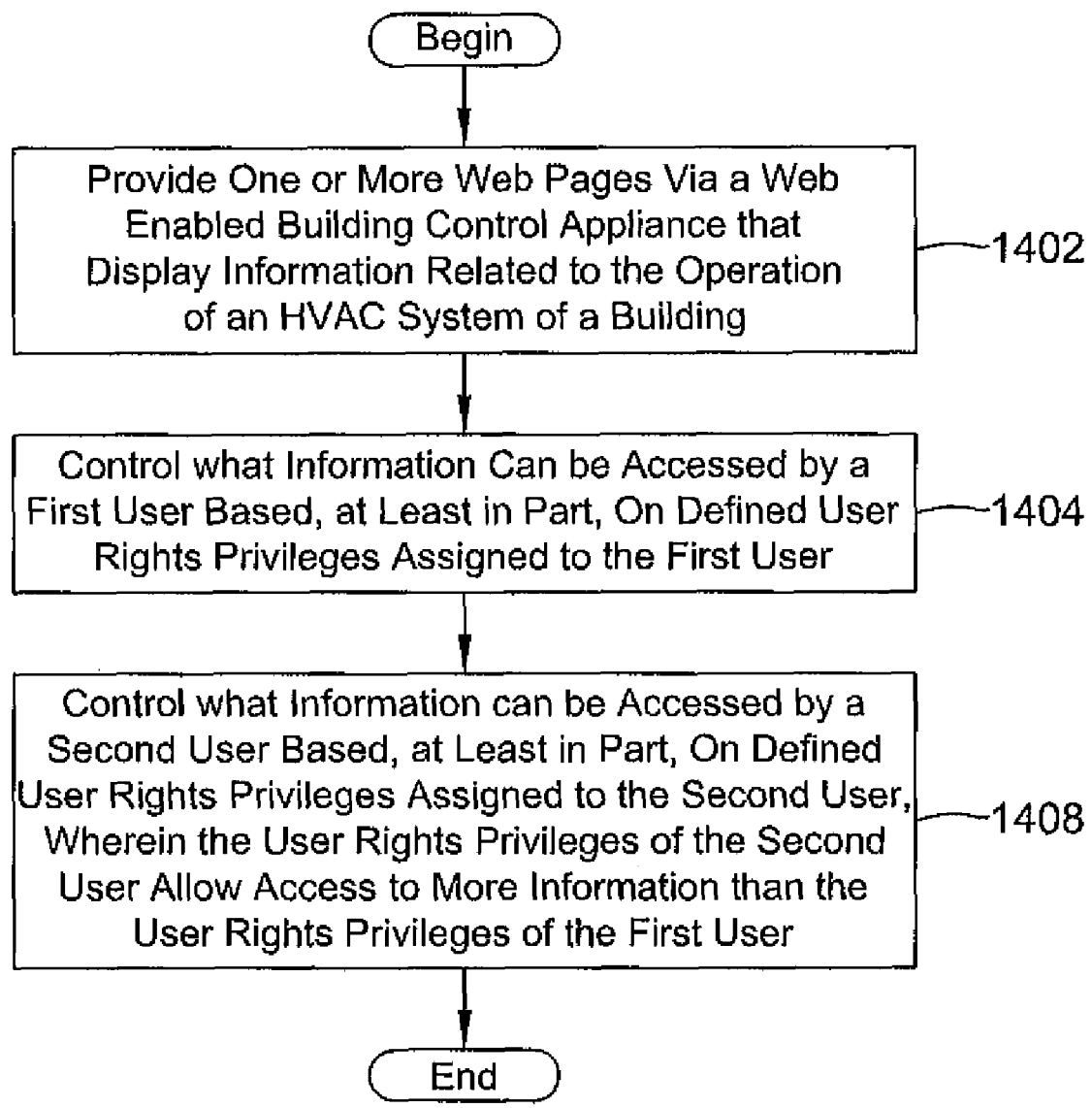

FIG. 14C describes a method of configuring privileges for a building control appliance 12 (FIG. 1) that is either directly or indirectly coupled to an HVAC system of a building for a number of HVAC controllers. At block 1402, web enabled building control appliance 12 may provide one or more web pages that display information related to the operation of the HVAC system of the building. Control passes to block 1404, where building control appliance 12 may control what information may be accessed by a first user, based at least in part upon the defined user rights privileges that are assigned to the first user. At block 1408, building control appliance 12 may control what information can be accessed by a second user based, at least in part, on defined user rights privileges that are assigned to the second user. In some cases, the user rights privileges of the second user allow access to more information than the user rights privileges of the first user.

Figure 14D:
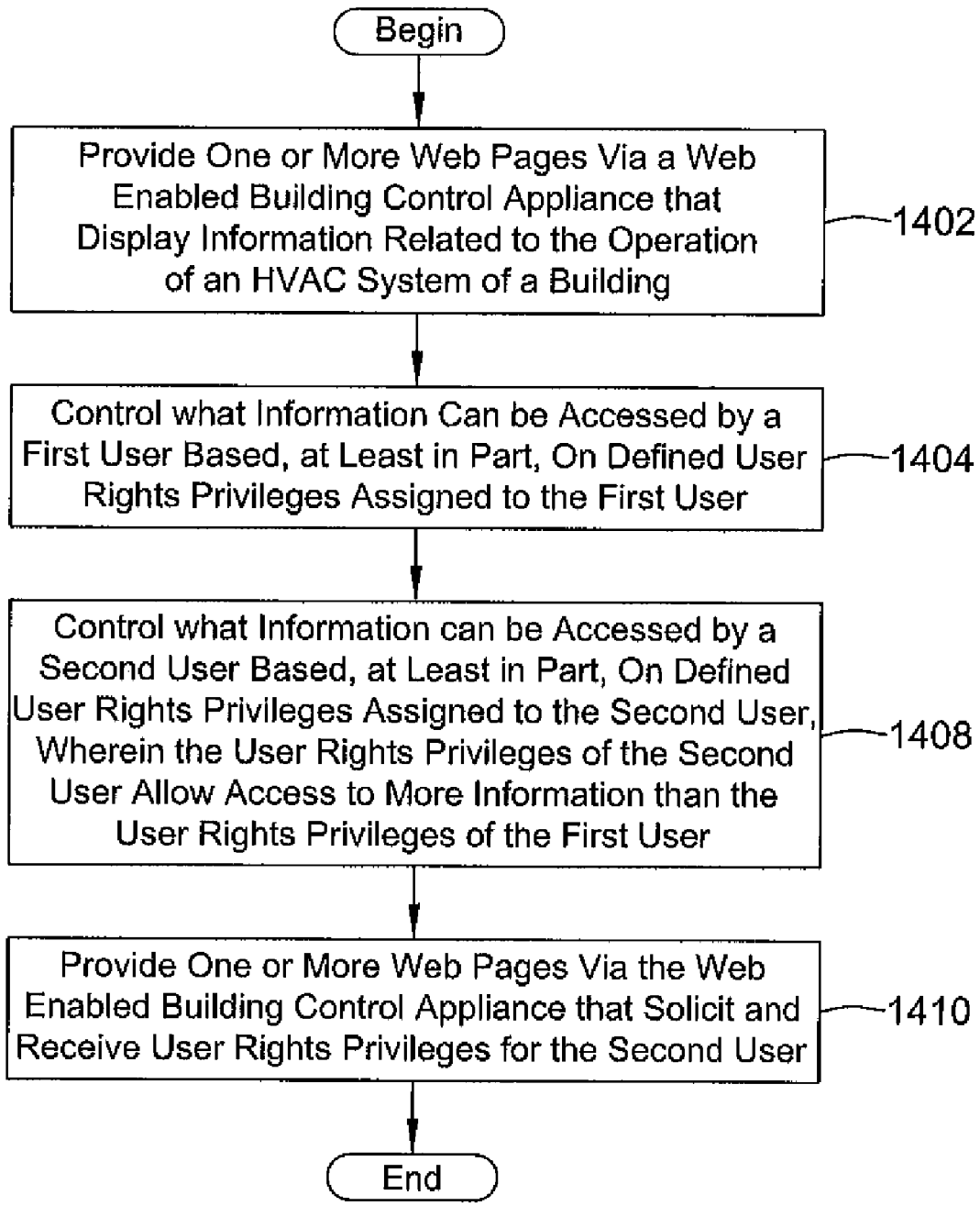

FIG. 14D describes a method of configuring privileges for a building control appliance 12 (FIG. 1) that is either directly or indirectly coupled to an HVAC system of a building for a number of HVAC controllers. At block 1402, web enabled building control appliance 12 may provide one or more web pages that display information related to the operation of the HVAC system of the building. Control passes to block 1404, where building control appliance 12 may control what information may be accessed by a first user, based at least in part upon the defined user rights privileges that are assigned to the first user.

At block 1408, building control appliance 12 may control what information can be accessed by a second user based, at least in part, on defined user rights privileges that are assigned to the second user. In some cases, the user rights privileges of the second user allow access to more information than the user rights privileges of the first user. Control passes to block 1410, where one or more web pages are provided by building control appliance 12 that solicit and/or receive information pertaining to user rights privileges for the second user.

Figure 14E:
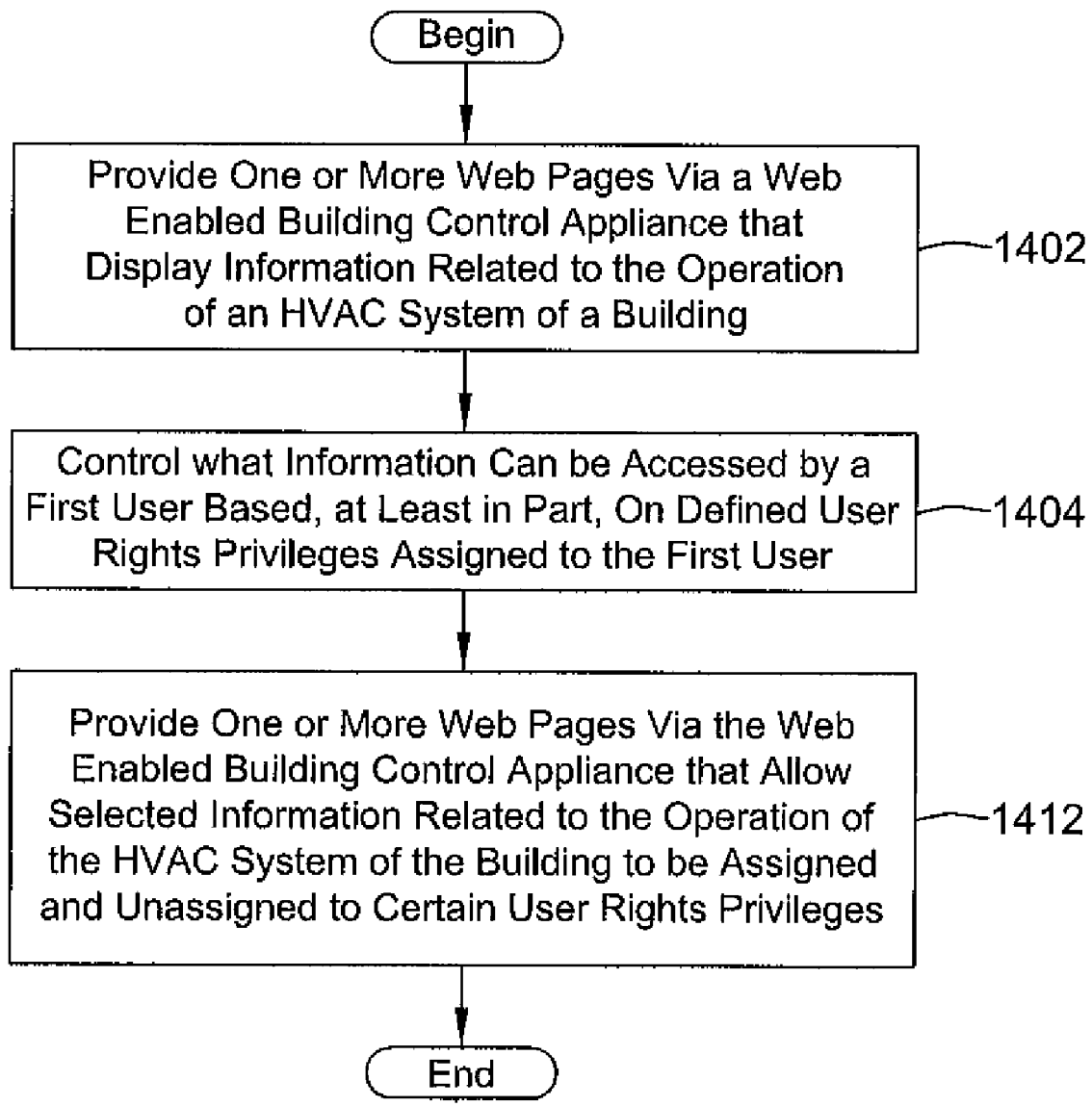

FIG. 14E describes a method of configuring privileges for a building control appliance 12 (FIG. 1) that is either directly or indirectly coupled to an HVAC system of a building for a number of HVAC controllers. At block 1402, web enabled building control appliance 12 may provide one or more web pages that display information related to the operation of the HVAC system of the building. Control passes to block 1404, where building control appliance 12 may control what information may be accessed by a first user, based at least in part upon the defined user rights privileges that are assigned to the first user. At block 1412, one or more web pages are provided by building control appliance 12 that allow selected information related to the operation of the HVAC system of the building to be assigned and unassigned to certain user rights privileges.

Figure 14F:
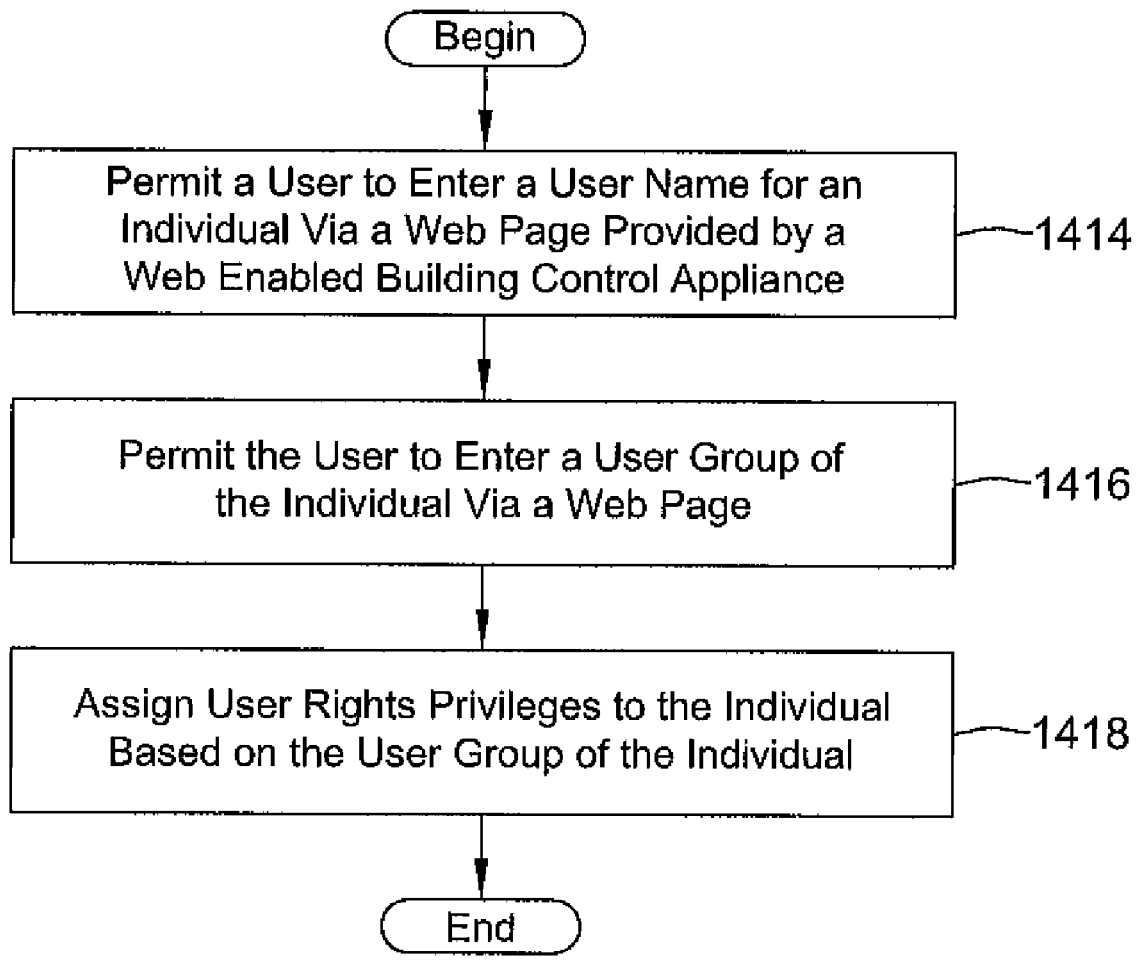

FIG. 14F describes a method of configuring privileges for a building control appliance 12 (FIG. 1) that is coupled to one or more HVAC control devices. At block 1414, a user is permitted to enter a user name for an individual via a web page that is provided by building control appliance 12. The user is permitted to enter a user group for the individual via the web page, as referenced at block 1416. Control passes to block 1418, where user rights privileges may be assigned to the individual as a result of their user group. In some cases, the user rights privileges may include viewing privileges that dictate what information the user may view on a web page provided by building control appliance 12 and/or may include assigning feature privileges that may dictate what parameters or features a user may modify via a web page provided by building control appliance 12. In some cases, feature privileges may be selected from a list of available feature privileges.

FIG. 15A describes a method of generating a wiring diagram. At block 1502, web server 38 (FIG. 2) may serve up one or more web pages that solicit information pertaining to one or more remote sensors that are to be connected to a thermostat. At block 1504, web server 38 receives the inputted information regarding the remote sensors. Control passes to block 1506, where building control appliance 12 (FIG. 1) determines a wiring configuration for the remote sensors. At block 1508, web server 38 serves up one or more web pages that include a wiring diagram for the remote sensors that is consistent with the determined wiring configuration. In some instances, the wiring configuration may be at least partially dependent upon the thermostat type of the thermostat. The wiring diagram may, in some cases, provide information for creating a remote sensing network to provide a desired resistance to the thermostat.

FIG. 15B describes a web based method of providing weighting information for a number of remote sensors in an HVAC system. At block 1510, web page 38 may serve up a web page that permits a user to enter information pertaining to a number of remote sensors to be used with an HVAC controller of the HVAC system. Control passes to block 1512, where building control appliance 12 (FIG. 1) determines sensor weighting information that is based, at least partially, upon the entered information. At block 1514, web server 38 serves up a web page that displays the weighting information.

In some cases, the number of remote sensors may include wireless sensors, and the weighting information may be programmed or otherwise inputted into the HVAC controller. The number of remote sensors may include hard-wired sensors, and the weighting information may include a graphical representation of a remote sensor wiring diagram. In some instances, the user may be at a first location, with a first data processor that displays web pages, and a second data processor that determines the weighting information may be at a second location remote from the first location. In some cases, the HVAC controller may be at the second location. The first data processor and the second data processor may be connected via a network that may include the Internet.

FIG. 15C describes a web based method of providing a remote sensor wiring diagram for a number of remote sensors in an HVAC system. At block 1516, web page 38 may serve up a web page that permits a user to enter information pertaining to a number of remote sensors to be used with an HVAC controller of the HVAC system. Control passes to block 1518, where building control appliance 12 (FIG. 1) determines a remote sensor wiring diagram that is based, at least partially, upon the entered information pertaining to the number of remote sensors. At block 1520, web server 38 outputs a web page that includes the remote sensor wiring diagram.

In some instances, the remote sensor wiring diagram may include or be a graphical representation. The remote sensor wiring diagram may be configured, for example, to provide a predetermined resistance to the HVAC controller and/or to provide an installer with information regarding which of the remote sensors, if any, to wire in series and which of the remote sensors, if any, to wire in parallel. In some cases, determining a remote sensor wiring diagram may include looking up a predetermined wiring diagram based on the accepted information pertaining to the number of remote sensors.

The present disclosure should not be considered limited to the particular examples described above, but rather should be understood to cover all aspects of the disclosure as fairly set out in the attached claims. Various modifications, equivalent processes, as well as numerous structures to which the present disclosure can be applicable will be readily apparent to those of skill in the art to which the present disclosure is directed upon review of the instant specification.

We claim:

1. A web enabled building control appliance, comprising:
a controller;
a first port coupled to the controller, the first port configured to communicate over a first network;
a web server implemented by the controller and coupled to the first port for serving up one or more web-pages on the first network via the first port;
a second port coupled to the controller, the second port configured to be coupled to one or more thermostats via a second network, wherein each of the one or more thermostats are configured to communicate with the controller over the second network;
the web server is configured to provide one or more web-pages via the first port that allow a user to log into the web enabled building control appliance; and
once the user is logged into the web enabled building control appliance, the web server is configured to provide one or more web-pages via the first port that solicit and receive user rights privileges for each of at least two users, wherein once the user rights privileges are set, the user rights privileges are used by the web enabled building control appliance to control what information can be changed via the web server and/or what information can be displayed via the web server for each of the at least two users when each of the at least two users are logged into the web enabled building control appliance.

2. The web enabled building control appliance of claim 1, wherein the second port is configured to be coupled to two or more thermostats via the second network.

3. The web enabled building control appliance of claim 1, wherein the controller maintains monitoring information, status information, set point information, alarming information, trending information and/or configuration information, and the user rights privileges control, at least in part, what information can be displayed and/or changed via the web server.

4. The web enabled building control appliance of claim 3, wherein the web enabled building control appliance is configured to be coupled, either directly or indirectly, to an HVAC system, and the web server is configured to provide one or more web-pages via the first port that allow information related to the HVAC system to be assigned and unassigned to the user rights privileges.

5. The web enabled building control appliance of claim 1, wherein at least some of the users of the web enabled building control appliance are assigned user rights privileges.

6. The web enabled building control appliance of claim 5, wherein each of the at least two users are allowed to log into the web enabled building control appliance via the web server, and the web server is configured to only displays information on the one or more web-pages that corresponds to the user rights privileges assigned to the particular user.

7. The web enabled building control appliance of claim 6, wherein each user of the web enabled building control appliance is assigned to one of two or more user groups, and wherein each user group has the same assigned user rights privileges.

8. The web enabled building control appliance of claim 7, wherein the web server is configured to provide one or more web-pages via the first port that allow one or more types of information to be assigned and unassigned to the user rights privileges of each user group.

9. The web enabled building control appliance of claim 8, wherein the user rights privileges define one or more of viewing privileges or changing privileges.

10. The web enabled building control appliance of claim 7, wherein one of the user groups corresponds to a tenant group, another one of the user groups corresponds to a facility manager group, and yet another one of the user groups corresponds to a contractor group.

11. A web enabled building control appliance, comprising:
a controller;
a first port coupled to the controller, the first port configured to communicate over a first network;
a web server implemented by the controller and coupled to the first port for serving up one or more web-pages on the first network via the first port;
a second port coupled to the controller, the second port configured to be coupled to two or more HVAC control devices via a second network, wherein each of the two or more HVAC control devices are configured to communicate with the controller over the second network;
the web server is configured to provide one or more web-pages via the first port that allow a user to log into the web enabled building control appliance; and
once a user is logged into the web enabled building control appliance, the web server is configured to access user rights privileges, wherein the user rights privileges control, at least in part, what information can be viewed by the logged in user via the web server.

12. The web enabled building control appliance of claim 11, wherein the user rights privileges control, at least in part, what information can be changed by the logged in user via the web server.

13. The web enabled building control appliance of claim 10, wherein the user rights privileges for the facility manager group is more expansive than for the tenant group and/or the user rights privileges for the contractor groups is more expansive than for the facility manager group.

14. The web enabled building control appliance of claim 11, wherein the web server is configured to provide one or more web-pages via the first port that allow a contractor user to assigned and unassigned certain controller information to the user rights privileges.

15. A method of configuring privileges for a web enabled building control appliance that is either directly or indirectly coupled to an HVAC system of a building, the method comprising:
providing one or more web-pages via the web enabled building control appliance that display information related to the operation of the HVAC system of the building;
controlling what information can be accessed by a first user based, at least in part, on defined user rights privileges assigned to the first user, wherein the first user can access at least some information; and
controlling what information can be accessed by a second user based, at least in part, on defined user rights privileges assigned to the second user, wherein the second user can access more information that the first user.

16. The method of claim 15, further comprising:
provide one or more web-pages via the web enabled building control appliance that solicit and receive user rights privileges for the first user.

17. The method of claim 16, further comprising:
provide one or more web-pages via the web enabled building control appliance that solicit and receive user rights privileges for the second user.

18. The method of claim 15, wherein the user rights privileges define one or more of viewing privileges or changing privileges.

19. The method of claim 15, further comprising:
providing one or more web-pages via the web enabled building control appliance that allow selected information related to the operation of the HVAC system of the building to be assigned and unassigned to certain user rights privileges.

20. A method of configuring privileges for a web enabled building control appliance that is coupled to one or more HVAC control devices, the method comprising the steps of:
permitting a user, via a web page provided by the web enabled building control appliance, to enter a user name for an individual;
permitting the user, via a web page, to enter a user group of the individual; and
assigning user rights privileges to the individual based on the user group of the individual.

21. The method of claim 20, wherein assigning user rights privileges comprises assigning viewing privileges that dictate what information the user may view on a web page provided by the web enabled building control appliance and/or dictate what HVAC control devices may be viewed on a web page provided by the web enabled building control appliance.

22. The method of claim 20, wherein assigning user rights privileges comprises assigning feature privileges that dictate what parameters or features a user may modify via a web page provided by the web enabled building control appliance.

23. The method of claim 22, wherein feature privileges can be assigned to a user by selecting particular feature privileges from a list of available feature privileges.

24. A method of operating a building control appliance that is configured to control an HVAC system of a building, the method comprising:
providing one or more web-pages via the building control appliance that display information on a user interface that is related to the operation of the HVAC system of the building, the user interface being located remotely from the building;
controlling what information can be displayed on the user interface by a first user based, at least in part, on defined user rights privileges assigned to the first user, wherein the first user has access to at least some information; and
controlling what information can be displayed on the user interface by a second user based, at least in part, on defined user rights privileges assigned to the second user, wherein the user rights privileges of the second user allow access to more information than the user rights privileges of the first user.

25. The method of claim 24, further comprising:
providing one or more web-pages that solicit and receive user rights privileges for the first user via the user interface.

26. The method of claim 25, further comprising:
prov234ing one or more web-pages that solicit and receive user rights privileges for the second user via the user interface.

27. The method of claim 24, wherein the user rights privileges define one or more of viewing privileges or changing privileges.

28. The method of claim 24, further comprising:
providing one or more web-pages that allow selected information related to the operation of the HVAC system of the building to be assigned and unassigned to certain user rights privileges via the user interface.

* * * * *